(12) United States Patent
McCrossan et al.

(10) Patent No.: US 8,000,580 B2
(45) Date of Patent: Aug. 16, 2011

(54) RECORDING MEDIUM, PLAYBACK APPARATUS AND METHOD, RECORDING METHOD, AND COMPUTER-READABLE PROGRAM

(75) Inventors: Joseph McCrossan, Simi Valley, CA (US); Tomoyuki Okada, Nara (JP); Masayuki Kozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 1466 days.

(21) Appl. No.: 10/578,584

(22) PCT Filed: Nov. 12, 2004

(86) PCT No.: PCT/JP2004/017220
§ 371 (c)(1),
(2), (4) Date: May 5, 2006

(87) PCT Pub. No.: WO2005/048592
PCT Pub. Date: May 26, 2005

(65) Prior Publication Data
US 2007/0098363 A1    May 3, 2007

(51) Int. Cl.
*H04N 9/80* (2006.01)
*H04N 5/93* (2006.01)
(52) U.S. Cl. ......................................... 386/243; 386/353
(58) Field of Classification Search ...................... 386/46
See application file for complete search history.

(56) References Cited

U.S. PATENT DOCUMENTS

| | | | |
|---|---|---|---|
| 5,664,133 A | | 9/1997 | Malamud et al. |
| 5,907,658 A | * | 5/1999 | Murase et al. ................... 386/95 |
| 5,999,225 A | | 12/1999 | Yagasaki et al. |
| 6,067,400 A | | 5/2000 | Saeki et al. |
| 6,240,555 B1 | * | 5/2001 | Shoff et al. ..................... 725/110 |
| 7,710,396 B2 | * | 5/2010 | Smith et al. ..................... 345/157 |
| 2003/0229900 A1 | | 12/2003 | Reisman |
| 2004/0047588 A1 | | 3/2004 | Okada et al. |
| 2004/0165865 A1 | | 8/2004 | Seo et al. |
| 2004/0168121 A1 | * | 8/2004 | Matz .............................. 715/513 |
| 2006/0153532 A1 | * | 7/2006 | McCrossan et al. ............ 386/95 |

FOREIGN PATENT DOCUMENTS

| | | |
|---|---|---|
| EP | 0 886 276 | 12/1998 |
| EP | 0 898 279 A2 | 2/1999 |
| EP | 0 913 822 A2 | 5/1999 |
| EP | 1 134 986 A1 | 9/2001 |
| EP | 1 465 047 | 10/2004 |
| JP | 2004-127396 | 4/2004 |
| WO | 01/30088 A1 | 4/2001 |
| WO | WO 02/079902 | 10/2002 |
| WO | WO 2004/077827 | 9/2004 |
| WO | 2005/004156 | 1/2005 |
| WO | 2005/004477 | 1/2005 |
| WO | WO 2005/004478 | 1/2005 |

\* cited by examiner

*Primary Examiner* — Peter-Anthony Pappas
*Assistant Examiner* — Asher Khan
(74) *Attorney, Agent, or Firm* — Panasonic Patent Center; Dhiren Odedra; Kerry Culpepper

(57) ABSTRACT

A BD-ROM stores a video stream and a graphics stream. The video stream represents a moving picture. The graphics stream is used for overlaying one or more menus on the moving picture, and includes interactive control information (ICS) and a plurality of pieces of graphics data (ODSs). The graphics data is used to generate both the menus and an effect for introduction or removal of a menu. The interactive control information includes (i) a reference value (window_id_ref) specifying a window within which each display composition of graphics is rendered for presenting the effect and (ii) information (effect_duration) showing a duration after which a display composition is replaced by a subsequent display composition.

4 Claims, 49 Drawing Sheets

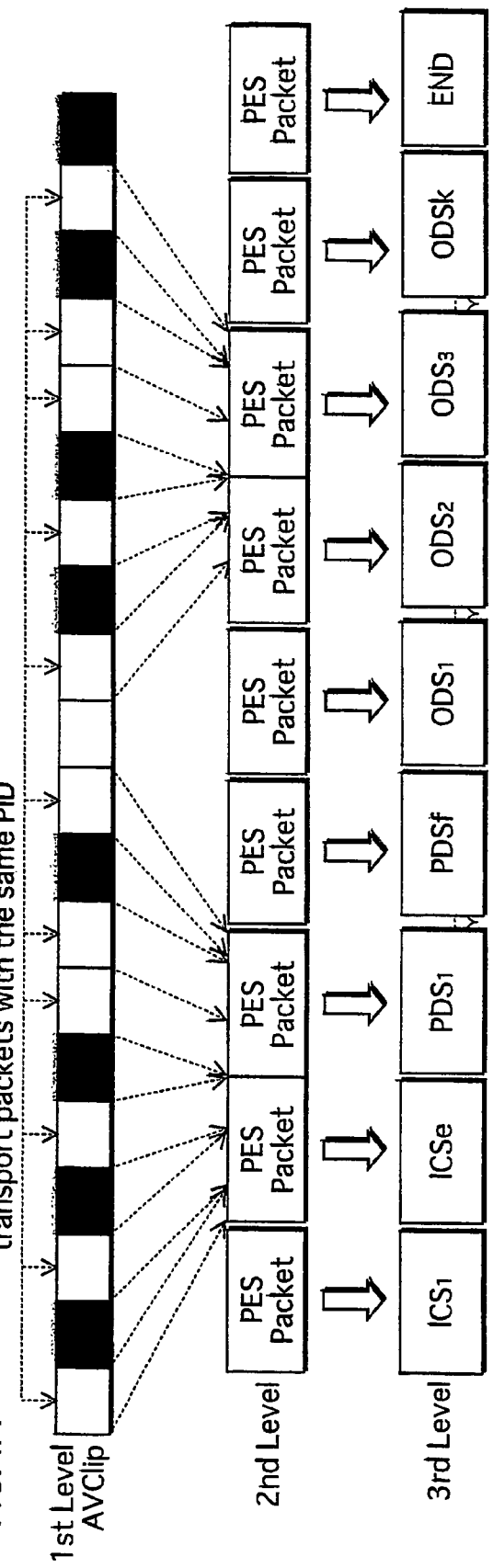
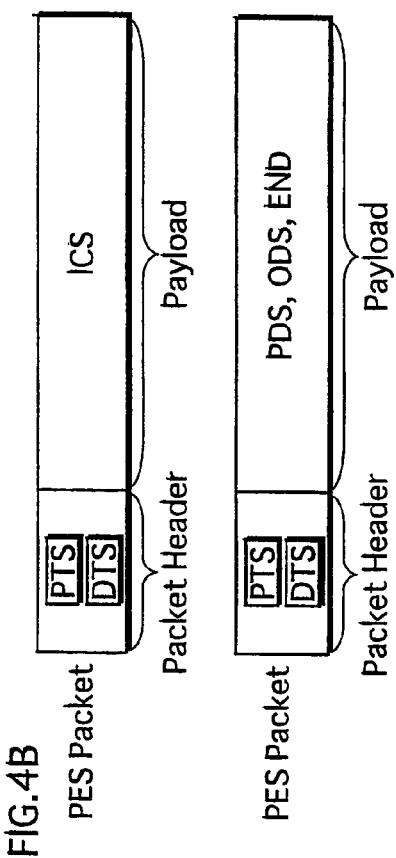

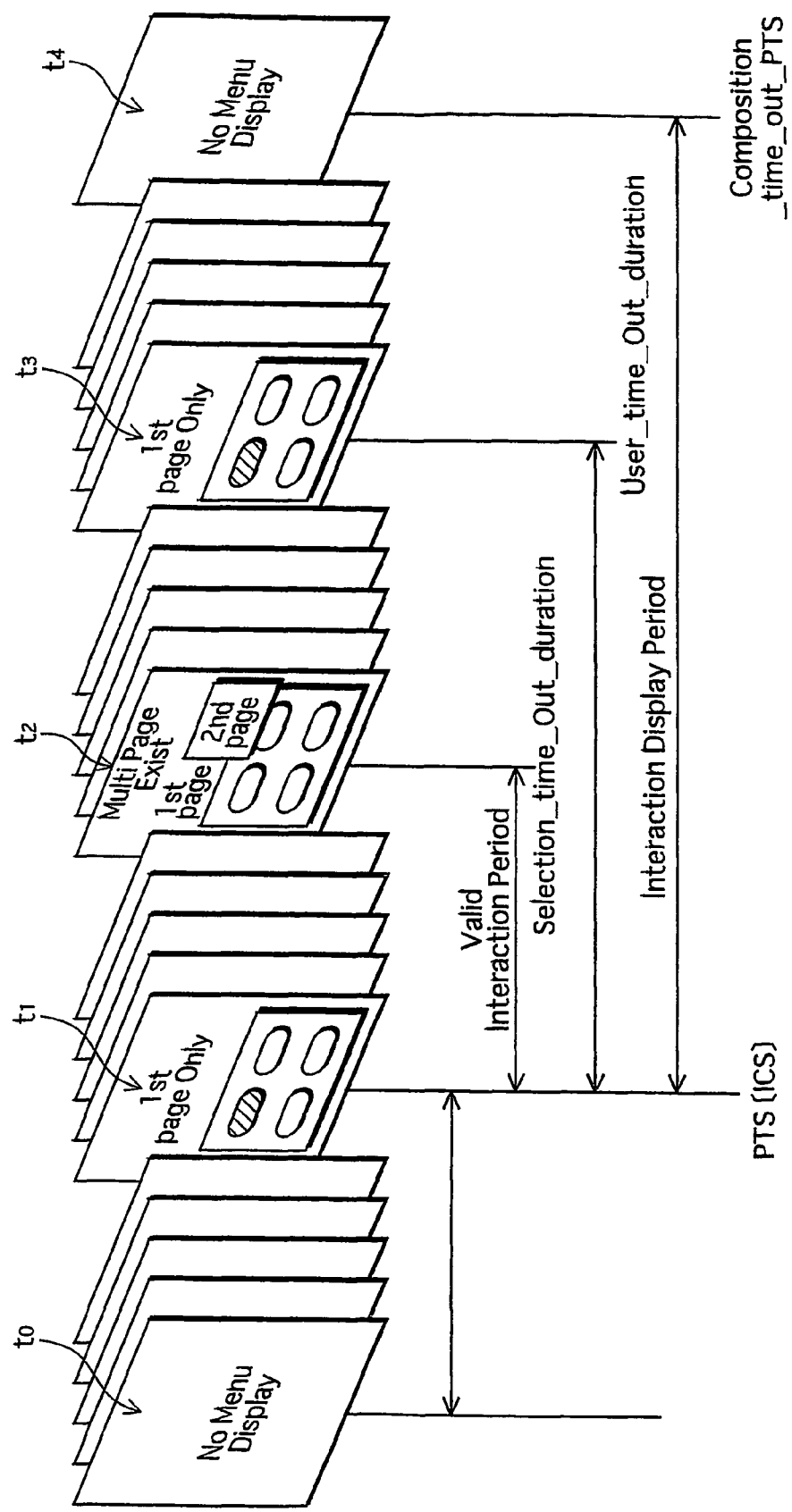

Multi-Page Exist

Next Picture

Picture is Covered by Menu Pages

Set user_time_out_duration Immediately before Presentation of Picture

Composition_Object(0) Setting

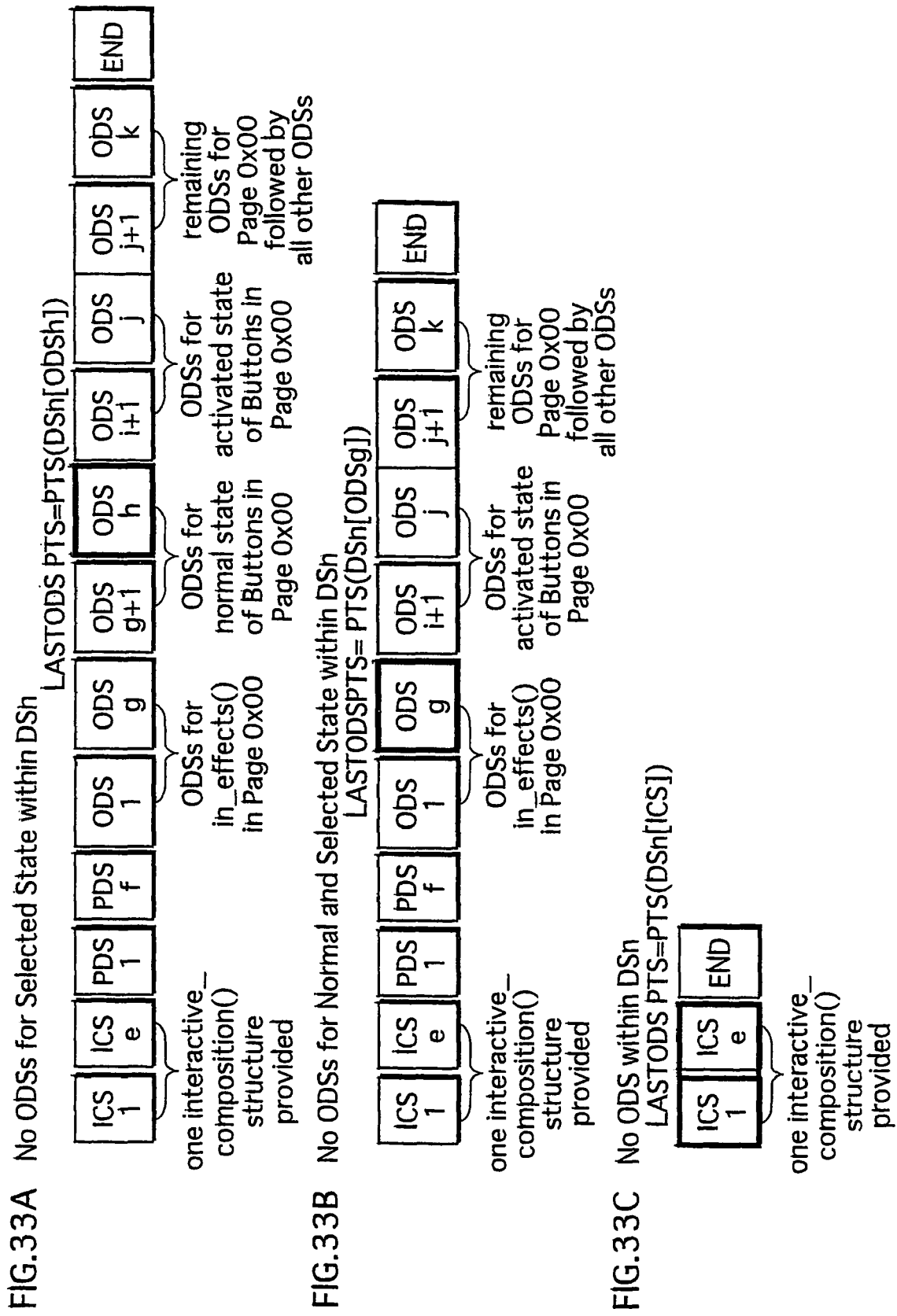

FIG. 34A  PTS(DS$_n$[ICS]) ≥ DTS(DS$_n$[ICS])+DECODEDURATION(DS$_n$)+TRANSFERDURATION(DS$_n$)

Where:
- DECODEDURATION (DS$_n$) is calculated as follows:

```
if( DSn [ICS]. composition_state == EPOCH_START )
    return(max (LASTODSPTS(DSn)−DTS(DSn [ICS]), PLANECLEARTIME(DSn))
else
    return(LASTODSPTS(DSn)−DTS(DSn [ICS])
```

FIG.35A

Where:

$$\text{EFFECTTD}(DS_n) = \text{ceil}\left(\left(90000 * \sum_{i=0}^{i<ICS.PAGE[0].IN\_EFFECTS.number\_of\_windows} \text{SIZE}(DS_n[ICS].PAGE[0].IN\_EFFECTS.WINDOW[i])\right)/(128*10^6)\right)$$

FIG.35B $$\text{PAGEDEFAULTTD}(DS_n) = \text{ceil}\left(\left(90000 * \sum_{i=0}^{i<ICS.PAGE[0].number\_of\_button} \begin{array}{l} -\text{NBSIZE}(DS_n, DS_n[ICS].PAGE[0].default\_selected\_button\_id\_ref) \\ +\text{SBSIZE}(DS_n, DS_n[ICS].PAGE[0].default\_selected\_button\_id\_ref) \end{array}\right)/(128*10^6)\right)$$

FIG.35C $$\text{PAGENODEFAULTTD}(DS_n) = \text{ceil}\left(\left(90000 * \sum_{i=0}^{i<ICS.PAGE[0].number\_of\_button} \begin{array}{l} +\text{BSIZE}(DS_n, LRG\{button : button \in DS_n[ICS].PAGE[0].button\}) \\ -\text{NBSIZE}(DS_n, LRG\{button : button \in DS_n[ICS].PAGE[0].button\}) \end{array}\right)/(128*10^6)\right)$$

FIG.36

$PTS(DS_n[ICS]) \geq DTS(DS_n[ICS]) + DECODEDURATION(DS_n) + TRANSFERDURATION(DS_n)$ Where :

- TRANSFERDURATION ($DS_n$) is calculated as follows :

```
if ( DSn[ICS]. PAGE[0]. IN_EFFECTS. number_of_effects ! =0 )
    return EFFECTTD(DSn)
else if(DSn[ICS]. PAGE[0]. default_selected_button_id_ref == 0xFFFF )
    return PAGENODEFAULTTD(DSn)
else
    return PAGEDEFAULTTD(DSn)
```

RECORDING MEDIUM, PLAYBACK APPARATUS AND METHOD, RECORDING METHOD, AND COMPUTER-READABLE PROGRAM

TECHNICAL FIELD

The present invention relates to a field of user interface control. More particularly, the present invention relates to improvements in recording mediums used for consumer movie distribution, as well as in consumer playback apparatuses having a user interface for playback of the recording mediums.

BACKGROUND ART

Generally, a user interface used in PC software supports presentation of pages, such that each page appears within a window that opens up on a display screen in response to user operations. The pages and windows are normally simple and practical and without much decoration.

For content creators, however, it counts a lot to amuse or entertain users watching their contents, so that the menus are designed to be presented with various effects. Examples of such effects include an in-effect and an out-effect which are each a sequence of graphics played back in response to a menu call by a user, as an animated introduction or removal of a menu page. An in-effect is played back immediately before a menu page is presented, whereas an out-effect is played back immediately after a menu page is removed.

Suppose, for example, an in-effect is animation in which a character appearing in a main movie transforms into a menu When a user calls a menu during playback of the main movie recorded on a disc which also stores the in-effect, the playback apparatus presents the menu immediately after playback of the in-effect. With this arrangement, it appears to the user, especially to a little child, as if the character is transformed into the menu in response to his operation. This makes the interactive control more attractive and enjoyable even to little children.

It should be noted here that effects provided by conventional disc contents require interruption of AV playback. Each time a menu is called, the AV playback is interrupted to present an effect. Although the effect may at first appear new and attractive, the playback of the same effect over and over with interruption of AV playback is likely to irritate the users.

One way to avoid the above problem is to overlay an in-effect and an out-effect onto the video image. As a result, the in-effect and out-effect are presented without interrupting AV playback, which is desirable in users' point of view. On the other hand, in order for simultaneous playback of the video image and the animated effect, the playback apparatus needs to simultaneously transfer the video stream and the graphics data used for the effect. Such simultaneous transfer requires the playback apparatus to have a large amount of bandwidth. Even for presenting effects without interaction of AV playback, it is unpractical to require a playback apparatus to have such a high bandwidth. Such playback apparatus is very unlikely to be the standard.

DISCLOSURE OF THE INVENTION

The present invention therefore aims to provide a recording medium realizing presentation of an in-effect and/or an out-effect without interrupting AV playback and without requiring a high-bandwidth playback apparatus.

To achieve the above aim, the present invention provides a recording medium having a video stream and a graphics stream recorded thereon. The video stream represents a moving picture made up of a plurality of pictures. The graphics stream is used for overlaying a menu on the moving picture, and includes interactive control information and graphics data. The graphics data is used for generating both the menu and an effect presented for introducing or removing the menu. The interactive control information includes a plurality of pieces of composition information defining a sequence of display compositions of graphics constituting the effect. Each piece of composition information shows (i) a bounding area on a graphics plane within which a respective display composition is rendered and (ii) a duration after which the display composition is replaced by a subsequent display composition to be rendered within the same bounding area.

The composition information shows a bounding area on a graphics plane within which each display composition is rendered, and also shows a duration after which the display composition is replaced by a subsequent display composition. The duration is set to be longer when the bounding area is large in size, and to be shorter when the bounding area is small in size. With such setting, seamless playback is ensured as long as the playback apparatus transfers graphics data at a fixed transfer rate. That is, any playback apparatus capable of ensuring a fixed transfer rate can present the effect without interrupting the video playback. This helps to establish widespread use of the effects which do not cause the video playback to be interrupted.

BRIEF DESCRIPTION Of THE DRAWINGS

FIG. 4A is a view showing the structure of an interactive graphics stream;

FIG. 4B is a view showing PES packets carrying functional segments;

FIG. 13 is the display scenario incorporating the Multi-Page menu;

FIG. 33A is a view showing a LASTODSPTS in the case where the DS includes no ODS associated with the selected state;

FIG. 33B is a view showing a LASTODSPTS in the case where the DS includes no ODS associated with the normal state;

FIG. 33C is a view showing a LASTODSPTS in the case where the DS includes no ODS at all;

FIG. 34A is a view showing an algorithm for obtaining the DECODEDURATION value from the value calculated by LASTODSPTS ($DS_n$)-DTS ($DS_n$[ICS]) and the value of PLANECLERATIME;

FIG. 35A is a view showing an equation for calculating the EFFECTTD;

FIG. 35B is a view showing an equation for calculating the PAGDEFAULTTD in the case where no in-effect is provided and the default selected button is statically determined;

FIG. 35C is a view showing an equation for calculating the PAGENODEFAULTTD in the case where no in-effect is provided and the default selected button is dynamically determined;

FIG. 36 is a view showing an algorithm for selectively determining one of EFFECTTD, PAGEDEFAULTTD, and PAGENODEFAULTTD as TRANSFERDURATION;

BEST MODE FOR CARRYING OUT THE INVENTION

First Embodiment

Figure 1:
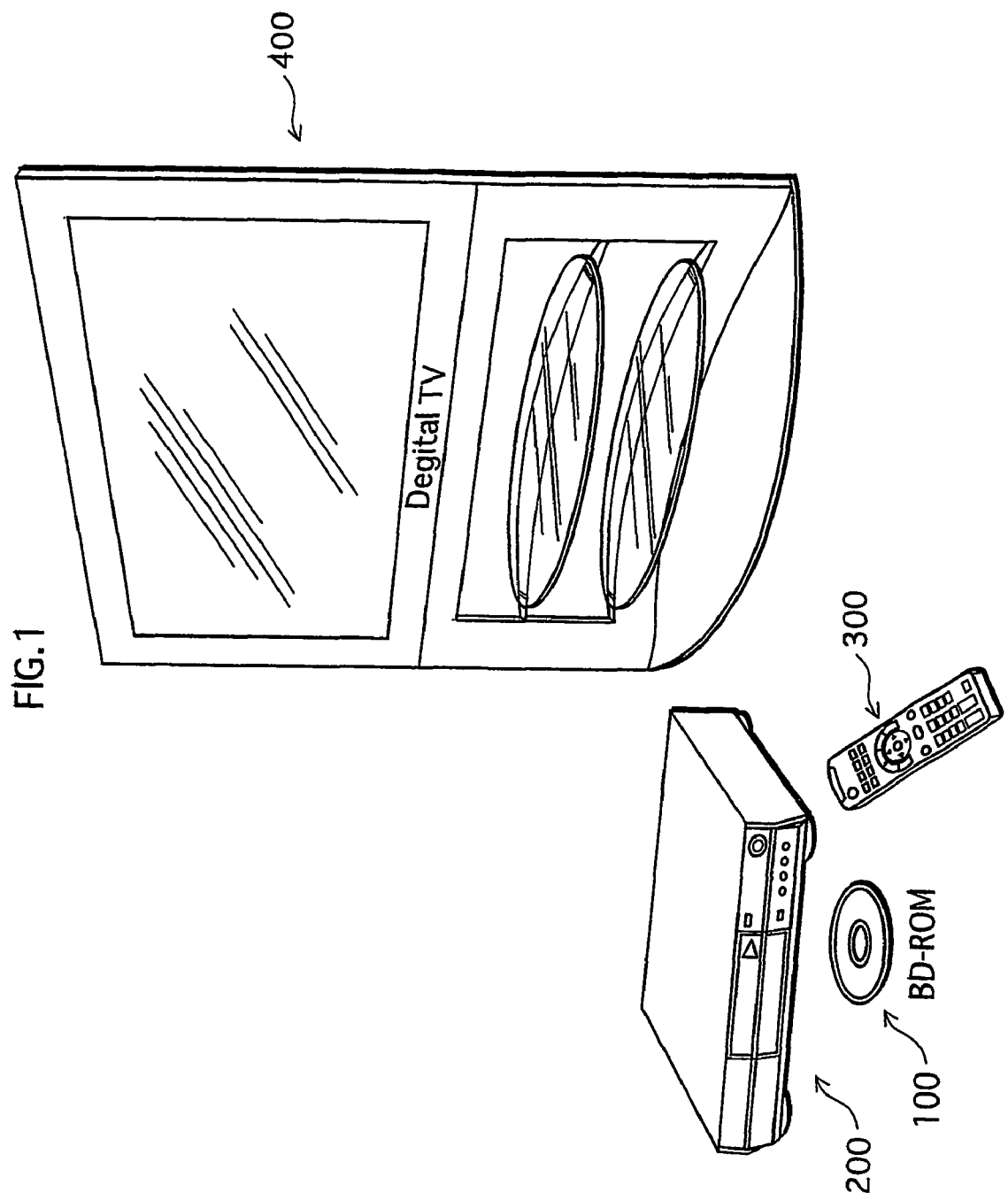
FIG. 1 is a view showing a usage pattern of a recording medium according to the present invention.

Hereinafter, a description is given to an embodiment of a recording medium according to the present invention. First of all, a description is given to usage of the recording medium, which is one form of practicing the present invention. FIG. 1 shows a usage pattern of the recording medium according to the present invention. In the figure, a BD-ROM 100 is a recording medium according to the present invention. The BD-ROM 100 is used for providing movies to a home theater system composed of a playback apparatus 200, a remote controller 300, and a television 400.

Figure 2:
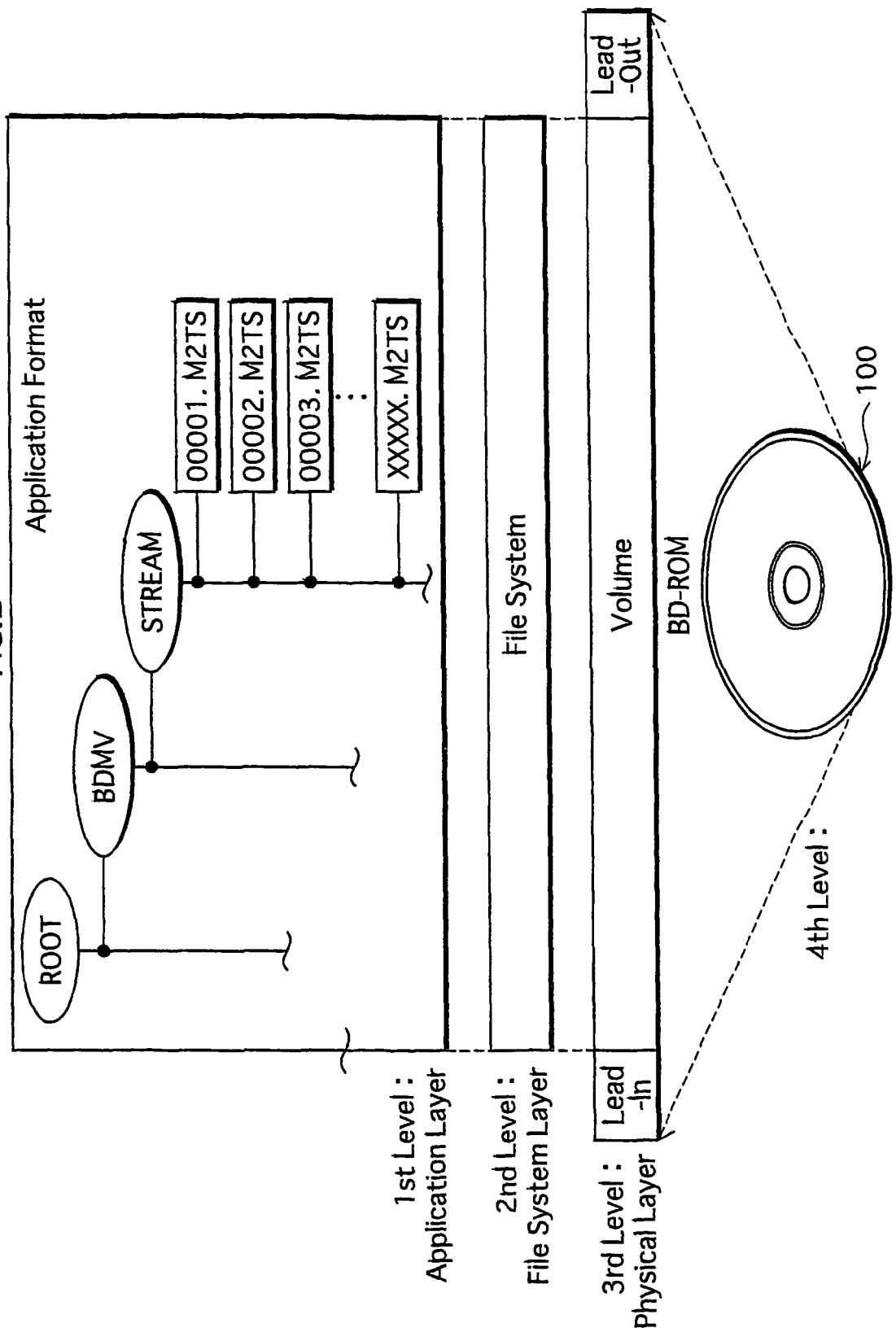
FIG. 2 is a view showing an example structure of a BD-ROM.

This concludes the description of the usage of recording medium according to the present invention. Next, a description is given to production of the recording medium, which is another form of practicing the present invention. The recording medium can be embodied by making improvements to an application layer of a BD-ROM. FIG. 2 shows an example structure of the BD-ROM 100.

In the figure, the BD-ROM 100 is shown on the fourth level, and a BD-ROM's track is shown on the third level. The track is stretched out into a straight line in the figure, although the track in practice spirals outwards from the center of the BD-ROM. The track is composed of a lead-in area, a volume area, and a lead-out area. The volume area has a layer model of a physical layer, a file system layer, and an application layer. The first level shows, in a directory structure, a format of the application layer (application format) of the BD-ROM.

The first level shows the format of the application layer (application format). In the figure, the BD-ROM has a ROOT directory, and a BDMV directory under the ROOT directory, and a STREAM directory under the BDMV directory.

The STREAM directory contains an AV clip and Sub clips. The AV clip and Sub clips are contained in files in the STREAM directory, such as "00001.m2ts", "00002.m2ts", and "00003.m2ts". Each file in the STREAM directory has a filename of a unified format, "xxxxx.m2ts" where x is an arbitrary integer.

<AV Clip Structure>

Figure 3:
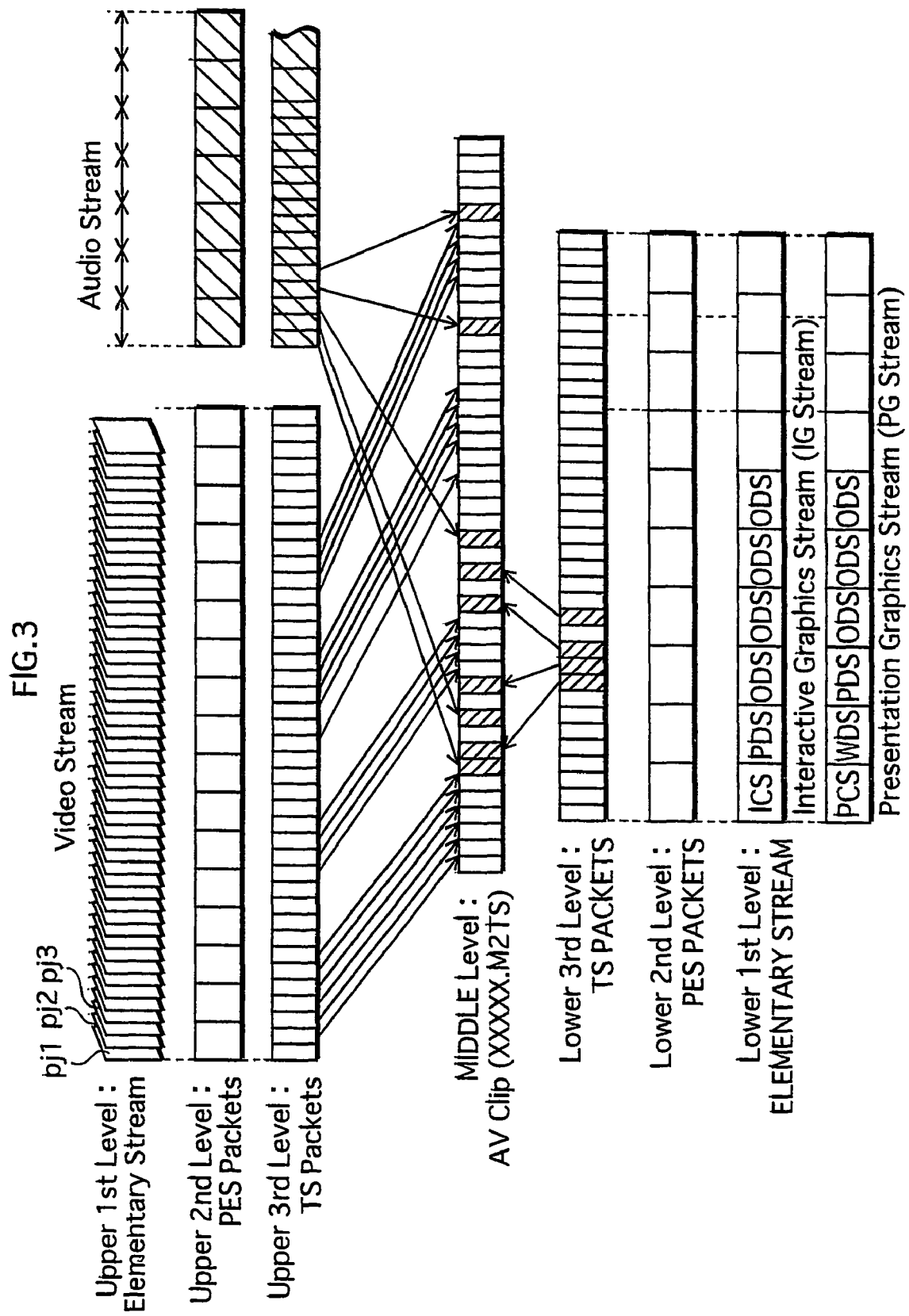
FIG. 3 is a view schematically showing the structure of an AV Clip.

Now, a description is given to the AV clip. FIG. 3 is a view schematically showing the structure of the AV Clip.

In the drawing, the middle level shows the AV clip. This AV clip can be created as follows. The video stream made up of a plurality of video frames (pictures pj1, pj2, pj3, . . . ) and the audio stream made up of a plurality of audio frames both shown on the upper first level are separately converted to PES packets shown on the upper second level, and further converted to TS packets shown on the upper third level. Likewise, the presentation graphics stream (hereinafter, "PG stream") and the interactive graphics stream (hereinafter, "IG stream") both shown on the lower first level are separately converted to PES packets shown on the lower second level, and further converted to TS packets shown on the lower third level. These TS packets of the video, audio, PG and IG streams are multiplexed to form the AV clip.

The PG and IG streams are data in stream format used for compositing graphics with each picture of the video stream. An entity of data carried by the PG and IG streams for overlaying on a picture is referred to as a "graphics object".

The PG stream is a graphics stream used for presentation of subtitles using the graphics objects.

The IG stream is a graphics stream used for interactive presentation of the graphics objects. This concludes the description of the AV clip structure. Next, a description is given to the AV clip and the Sub clips. The Sub clips are not multiplexed. Rather, the Sub clips are files exclusively containing the IG stream, audio stream, and text data. The IG stream stored as a Sub clip is loaded to a memory in advance for synchronous playback with an AV clip. This operation of loading a Sub clip to a memory in advance is referred to as "preloading".

Next, a description is given to the IG stream. FIG. 4A is a view showing the structure of the IG stream. On the first level, a string of TS packets constituting the AV clip is shown. On the second level, a string of PES packets constituting the graphics stream is shown. The PES packets shown on the second level are formed by concatenating payloads of TS packets having a predetermined PID within the TS packet string shown on the first level. Note that no further description is given to the PG stream because it is not the gist of the present invention.

On the third level, the structure of graphics stream is shown. The graphics stream is composed of functional segments that include an ICS (Interactive Composition Segment), a PDS (Palette Definition Segment), an ODS (Object Definition Segment), and an END (End of Display Set Segment). Of these functional segments, the ICS is a display composition segment, whereas the PDS, ODS, and END are definition segments. Each functional segment is either in one-to-one or one-to-multiple correspondence with PES packets. That is, one functional segment is recorded on the BD-ROM 100 after being converted to a single PES packet, or fragmented and converted to a plurality of PES packets.

Hereinafter, a description is given one by one to those functional segments.

The ICS is a functional segment used to define an interactive display composition of graphics. One example of the interactive display composition is a Multi-Page menu.

The ODS is a run-length encoded graphics object composed of a plurality of pieces of run-length data. The run-length data expresses a pixel string using a Pixel Code which shows a pixel value and a continuous length of the pixel value. The Pixel Code is an 8-bit value showing one of the values from 1 to 255. Through the use of this Pixel Code, the run-length data sets arbitrary 256 pixel colors out of full color (16,777,216 colors).

The PDS is a functional segment storing pallet data. The pallet data shows combinations of Pixel Codes of 1 to 255 and pixel values. The pixel value used herein is made up of a red color difference component (Cr value), a blue color difference component (Cb value), a luminance component (Y value), and a transparency (T value). Substituting a Pixel Code of each piece of run-length data into a pixel value shown by the palette data produces a color.

The END provides an explicit indication that the transmission of functional segments is complete. The END is inserted into the graphics stream as the last segment. This concludes the description of each functional segment.

FIG. 4B is a view showing PES packets carrying functional segments. As shown in the figure, each PES packet is composed of a packet header and a payload. The payload is an entity carrying a functional segment, and the packet header carries a DTS and a PTS associated with the functional segment. Hereinafter, a DTS and a PTS in a packet header of a PES packet carrying a functional segment are simply described as a DTS and a PTS of that functional segment.

Figure 5:
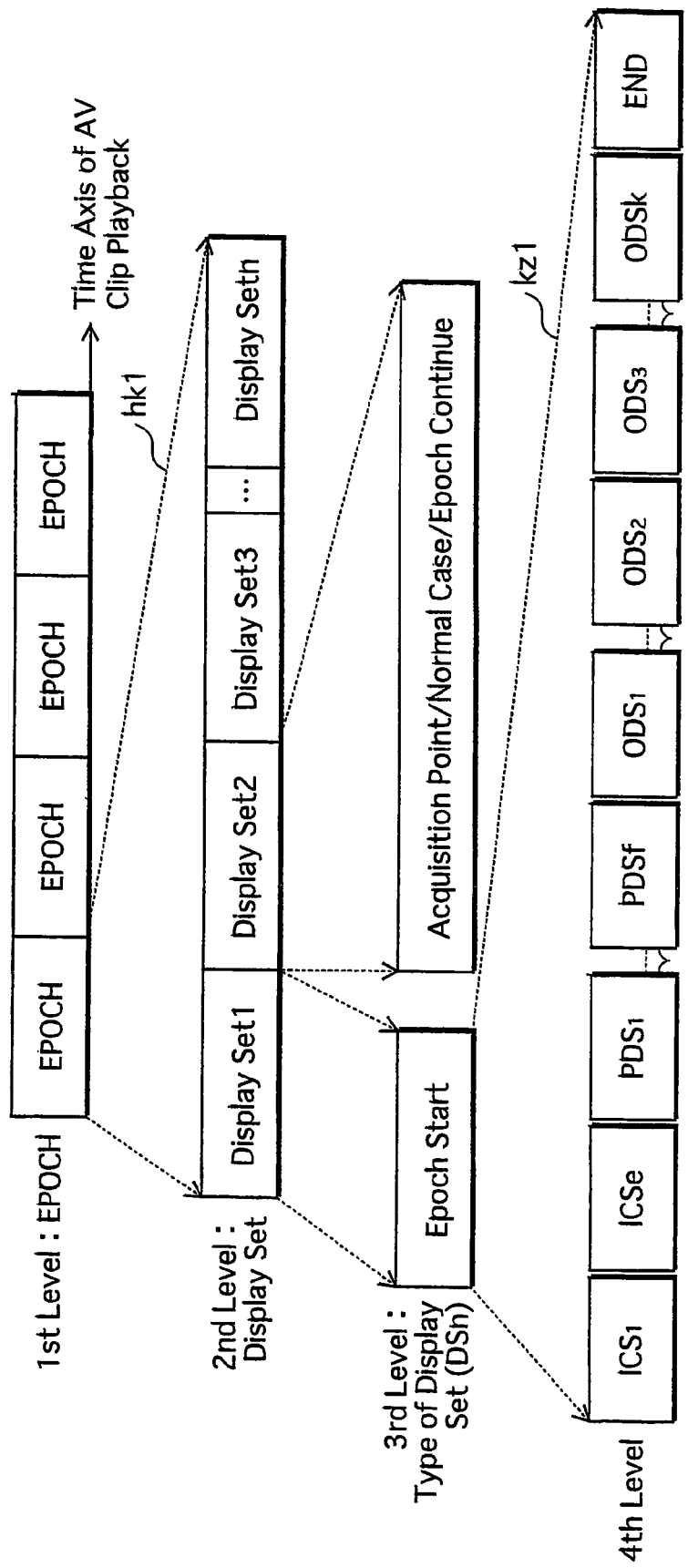
FIG. 5 is a view showing the logical structure defined by various types of functional segments.

These various types of functional segments define a logical structure such as the one shown in FIG. 5. In the drawing, the first level shows Epochs, the second level shows DSs (Display Sets), and the third level shows types of the DSs. The functional segments shown on the third level in FIG. 4A is shown on the fourth level in this figure.

An Epoch on the first level refers to one time unit of continuous memory management on a time axis of the AV clip playback, and also refers to a group of data allocated to that time unit. Memory mentioned herein includes a graphics plane for storing one screen of graphics objects and an object buffer for storing uncompressed graphics data. Continuous memory management means that neither the graphics plane nor the object buffer is flushed throughout the Epoch, and that clearing and rendering of graphics are performed only within a predetermined rectangular area on the graphics plane (to flush means to clear the entire graphics plane or the entire object buffer). The size and position of this rectangular area are fixed throughout the Epoch. As long as clearing and rendering of graphics are performed within this fixed rectangular area on the graphics plane, seamless playback is guaranteed. In other words, the Epoch is a time unit of seamless playback on the time axis of the AV clip playback. To change the graphics clearing/rendering area on the graphics plane, it is necessary to define a point on the playback time axis at which the change is effected and to set a new Epoch from the point onward. In this case, the boundary between two Epochs is not seamless.

The seamless playback mentioned herein means that the clearing and rendering of graphics are each completed with a predetermined number of video frames. In the case of IG stream, the number of video frames is four to five. The number of video frames is determined based on the ratio of the fixed rectangular area to the entire graphics plane and the transfer rate between the object buffer and the graphics plane.

A DS on the second level is a group of functional segments included in the graphics stream and provides one complete display composition. In FIG. 5, dashed lines hk1 show to which Epoch the DSs on the second level belong. The $DS_1$, $DS_2$, $DS_3$ . . . , and $DS_n$ are shown to belong to the first Epoch on the first level.

The third level shows the types of DSs. The first DS in an Epoch is an "Epoch Start" DS. Each DS other then the first one in the Epoch is either an "Acquisition Point" DS, a "Normal Case" DS, or an "Epoch Continue" DS. Though the DSs are shown in the order of Acquisition Point, Normal Case, and Epoch Continue, this order is merely an example and the DSs may be arranged in a different order.

The Epoch Start DS provides a display effect "new display", and indicates a start of a new Epoch. Thus, the Epoch Start DS contains all functional segments necessary for the next screen composition. The Epoch Start DS is provided at a point to,which a skip operation is likely to be made, such as a start of a chapter in a movie.

The Acquisition Point DS provides a display effect "display refresh", and is identical in contents to the preceding Epoch Start DS. The Acquisition Point DS is not the start of the Epoch, but contains all functional segments necessary for the next screen composition. Therefore, graphics can be displayed reliably when playback is started from the Acquisition Point DS. That is to say, the Acquisition Point DS enables a display composition to be made from a midpoint in the Epoch.

The Acquisition Point DS is provided at a point to which a skip operation maybe made, such as a point that maybe designated by a time search. The time search is an operation of locating a playback point corresponding to a time input by a user in minutes/seconds. The time input is made in a relatively large unit such as ten minutes and ten seconds. Accordingly, the Acquisition Point DS is provided at a point that can be designated by a time search made in units of 10 minutes and 10 seconds.

By providing the Acquisition Point DS at such a point that can be designated by a time search, playback of the graphics stream can be smoothly carried out when a time search is conducted.

The Normal Case DS provides a display effect "display update", and contains only a difference from the immediately preceding display composition. For example, if a $DS_v$ is identical in contents to an immediately preceding $DS_u$ but different in display composition, the $DS_v$ is a Normal Case DS which contains only an ICS or an ODS. This eliminates the need to provide overlapping ODSs in DSs, so that the amount of data stored on the BD-ROM 100 is reduced. Since the Normal Case DS contains the difference without the overlapping data, no display composition can be displayed with the Normal Case DS alone.

The Epoch Continue DS indicates at the start of an AV clip that one Epoch continues from a different AV clip. For example, a $DS_n$ contains a composition state field having a value indicating "Epoch Continue". In this case, the $DS_n$ belongs to the same Epoch as an immediately preceding $DS_{n-1}$ even if the two DSs are on different AV clips. Since the $DS_n$ and $DS_{n-1}$ belong to the same Epoch, there will be no flushing of the graphics plane and of the object buffer even if there is a boundary of AV clips between the two DSs.

In FIG. 5, dashed lines kz1 show to which DS the functional segments on the fourth level belong. Since the functional segments shown in FIGS. 4A and 5 are the same, it is known that the functional segments shown in FIG. 4A belong to the Epoch Start DS. Functional segments belonging to the Acquisition Point DS are identical to those belonging to the Epoch Start DS. In addition, functional segments belonging to the Normal Case DS are identical to those belonging to the Epoch Start DS, except that some of the functional segments are omitted in the Normal Case DS.

This concludes the description of the logical structure defined by the functional segments. Next, a description is given to the allocation of DSs having such an ICS and ODSs, to the time axis of AV clip playback. Since the Epoch is a time unit of continuous memory management and includes one or more DSs, it is important how those DSs are allocated to the time axis of the AV clip playback. Note that the "time axis of the AV clip playback" refers to the time axis used for defining the decode timing and playback, timing of individual pictures multiplexed in the AV clip. The decode timing and playback timing are expressed in the time accuracy of 90 KHz. The DTS and PTS of an ICS or of an ODS within a DS show the timing based on which the synchronous control is realized. DSs are allocated to the time axis of the AV clip playback by carrying out the synchronous control in accordance with each DTS and PTS attached to an ICS and to an ODS.

Figure 6:
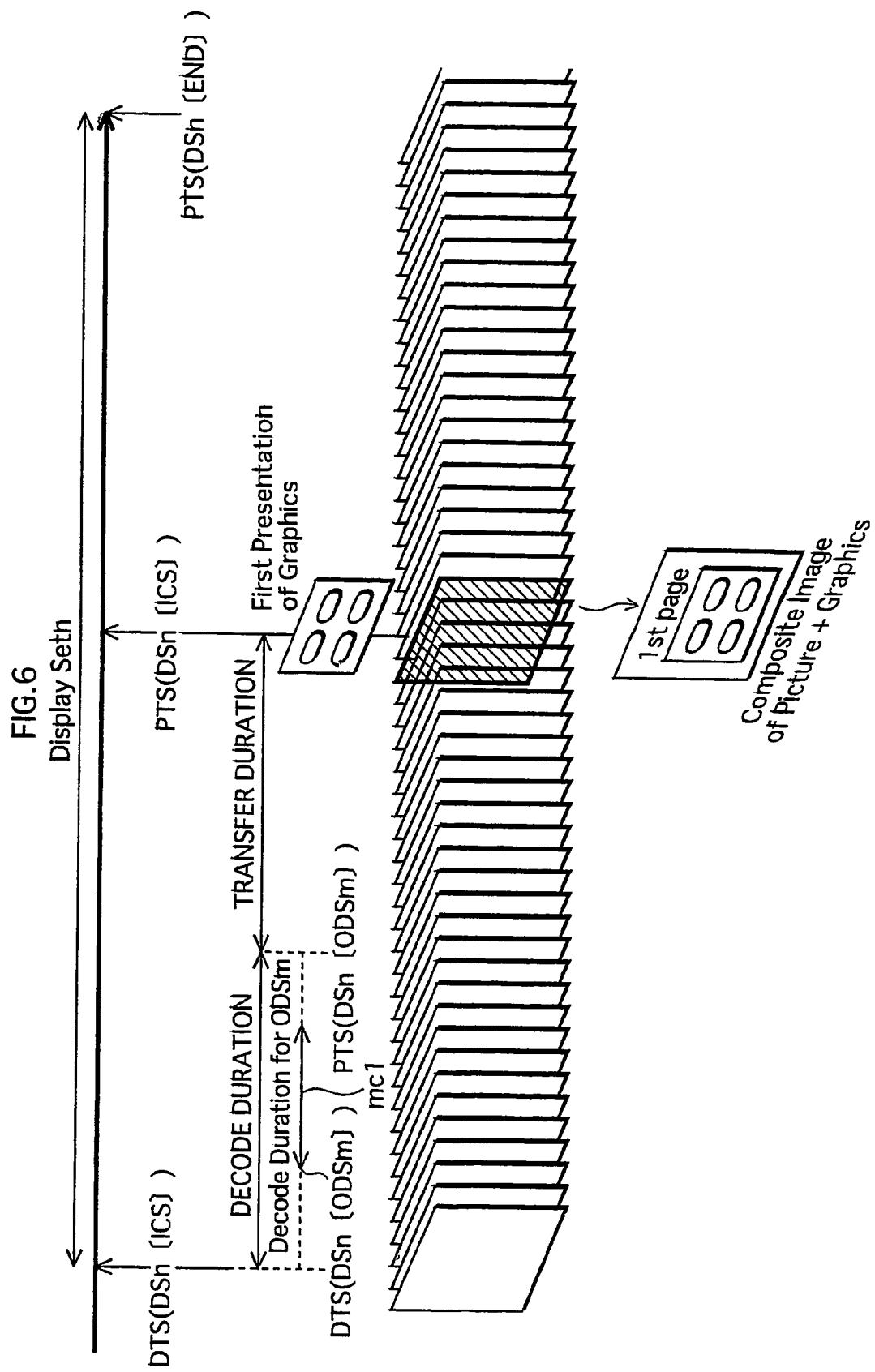
FIG. 6 is a view showing the time axis of AV clip playback to which a $DS_n$ is allocated.

Suppose an arbitrary one of DSs within an Epoch is denoted as a $DS_n$, and that the $DS_n$ is allocated to the time axis of the AV clip playback based on the DTS and PTS set as shown in FIG. 6.

FIG. 6 shows the time axis of AV clip playback to which the $DS_n$ is allocated. In the figure, the duration of $DS_n$ starts at the time shown by the value of DTS of the ICS belonging to the $DS_n$ (DTS ($DS_n$[ICS])), and ends at the time shown by the value of PTS of the END belonging to the $DS_n$ (PTS($DS_n$[ICS])). The display timing for the first presentation of the DS, is shown by the value of PTS of the ICS (PTS ($DS_n$[ICS])). By adjusting the PTS($DS_n$[ICS]) value to correspond to the display timing of a desired picture within the video stream, the first presentation of the $DS_n$ will be synchronized with the video stream.

The PTS ($DS_n$[ICS]) value is the sum of the time taken for decoding the ODS (DECODEDURATION) and the time taken for transferring the decoded graphics object (TRANSFERDURATION).

The decoding of ODS needed for the first presentation is completed within the DECODEDURATION. The duration mc1 shown in FIG. 6 is the time required for decoding an $ODS_m$, an arbitrary one of ODSs within the $DS_n$. The start of the decode duration mc1 is shown by the value of DTS ($ODS_n$ [$ODS_m$]) and the end of the decode duration mc1 is shown by the value of PTS ($ODS_n$[$ODS_m$]).

An Epoch is defined by allocating every ODS within the Epoch to the time axis AV playback as described above. This concludes the description of the allocation to the time axis of AV playback.

One feature of the first embodiment is to control the behavior of a Multi-page menu in accordance with the proceeding of AV playback. The novel structure realizing the feature resides in an interactive_composition structure provided in the ICS. Hereinafter, a description is given to the interactive_composition structure.

Figure 7A:
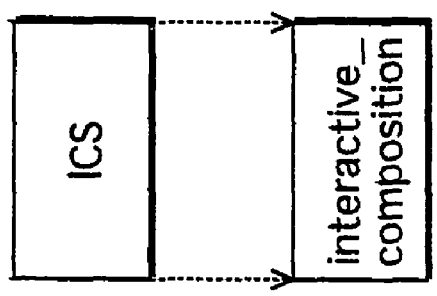
FIGS. 7A and 7B are views showing the relations between interactive_composition structures and ICSs.
Figure 7B:
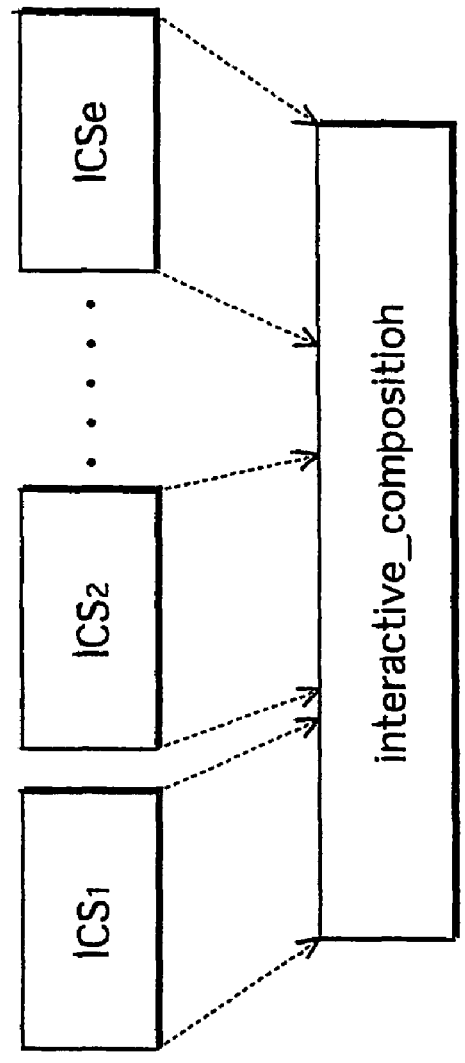

FIGS. 7A and 7B are views showing the relations between the interactive_composition structures and the ICSs. The interactive_composition structure and the ICS may be in one-to-one correspondence as shown in FIG. 7A, or one-to-multiple correspondence as shown in FIG. 7B.

The one-to-one correspondence is applicable to the case where the interactive_composition structure is small enough to be contained in one ICS.

The one-to-multiple correspondence is applicable to the case where the interactive_composition structure is too large in size to be carried by one ICS and thus fragmented to be stored in multiple ICSs. Since the interactive_composition structure can be fragmented to be stored in multiple ICSs, there is no restriction imposed on the size of interactive_composition structure. The interactive_composition structure may be as large as 512 Kbytes, 1 Mbyte, or any number of bytes. As above, one interactive_composition structure may correspond to multiple ICSs. For the simplicity sake, however, a description hereinafter is given on precondition that the ICS and interactive_composition structure is in one-to-one correspondence.

Figure 8:
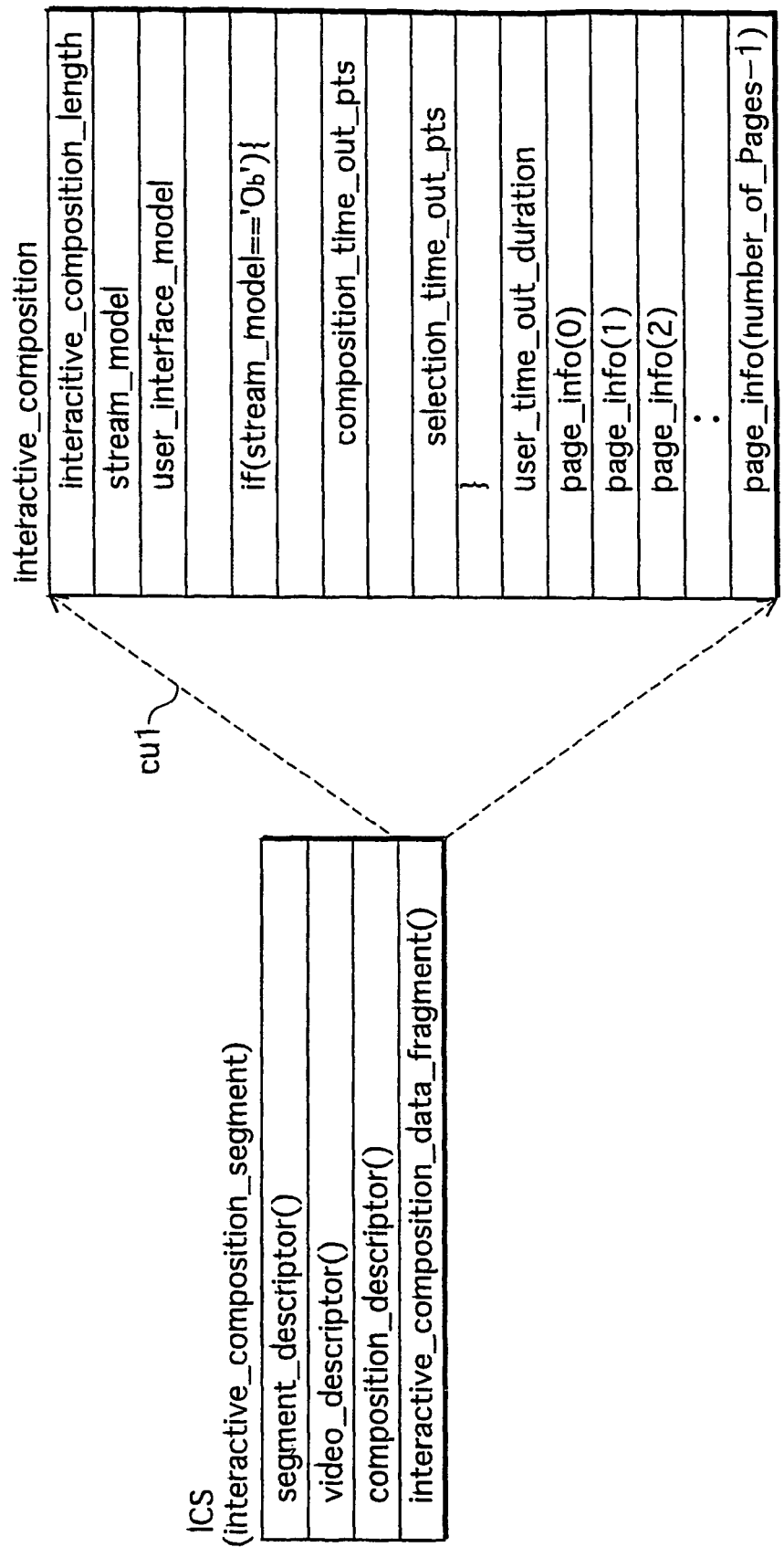
FIG. 8 is a view showing the internal structure of an ICS.

FIG. 8 is a view showing the internal structure of an ICS. The ICS contains one interactive_composition structure or a fragment of one interactive_composition structure. As shown in the left part of FIG. 8, the ICS is composed of the following fields: "segment descriptor" showing the segment type "ICS"; "video_descriptor" showing the width and height of the video plane in pixels and the frame rate of the associated video stream; "composition_descriptor" showing the composition state, which is information showing the type of DS to which the ICS belongs is whether a Normal Case DS, an Acquisition Point DS, an Epoch Start DS, or an Effect_Sequence; and "interactive_composition_data_fragment" showing that whether the ICS is carrying an entire interactive_composition structure or a fragment of interactive_composition structure.

As indicated by an arrow cu1, FIG. 8 shows the internal structure of an interactive_composition structure in detail. The interactive_composition structure is composed of the following fields: "interactive_composition_length", "stream_ model", "user_interface model", "composition_time_out_pts", "selection time_out_pts", "user_time_out_duration", "page_information (1), (2) . . . (i) . . . (number_of_page-1)" for each page of the Multi-Page menu available for presentation.

The interactive_composition_length field shows the length of the interactive_composition structure.

Figure 9:
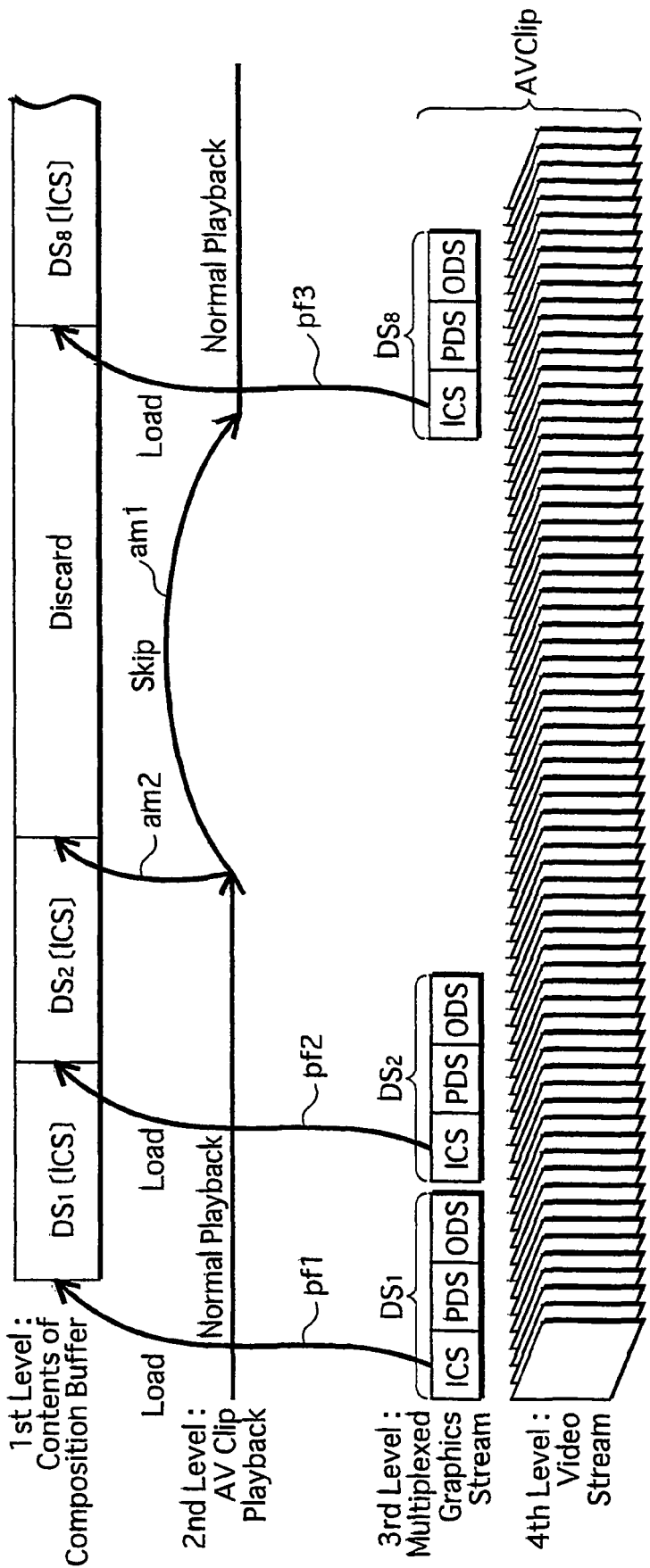
FIG. 9 is a view showing the processing performed on an ICS in the case where a stream_model field shows a "Multiplexed" type.

The "stream_model" field shows the type of stream model of the associated interactive_composition structure. The stream model shows how the interactive_composition structure is stored on the BD-ROM and how the data is to be processed by a buffer (referred to as a "composition buffer") on a playback apparatus. Specifically, the stream model shows whether (i) the graphics stream is multiplexed with an AV clip and separated to be loaded to the composition buffer or (ii) a graphics stream is stored as a Sub clip in a separate file from the AV clip and preloaded to the composition buffer. The stream_model field is provided in the interactive_composition structure because the composition buffer needs to perform different processing depending on whether the interactive_composition structure is preloaded or multiplexed. FIG. 9 is a view showing the processing performed on the "Multiplexed" ICS. In the figure, the video stream multiplexed in the AV clip is shown on the fourth level, and the graphic stream multiplexed in the AV clip is shown on the third level. The graphics stream includes three DSs, which are a $DS_1$, a $DS_2$, and $DS_8$. The second level shows the proceeding of AV playback. The first level shows contents stored in the composition buffer at different times of the AV playback. When the current playback point reaches the beginning of $DS_1$ multiplexed in the AV clip, the $DS_1$ is loaded to the composition buffer as indicated by an arrow pf1. As a result, the composition buffer stores $DS_1$[ICS]. Then, when the current playback point reaches the beginning of $DS_2$ multiplexed in the AV clip, the $DS_2$ is loaded to the composition buffer as indicated by an arrow pf2. As a result, the composition buffer stores $DS_2$[ICS]. That is, in the case where the stream_model is "Multiplexed", there are more than one interactive_composition structures. The playback apparatus discards a currently stored interactive_composition structure and newly loads another interactive_composition structure residing at the current playback point. Thus, the composition buffer stores one interactive_composition structure at a time.

This discarding and loading operation is especially effective at the time of a skip operation. When a skip operation is executed, the interactive_composition structure associated with the current playback point is no longer necessary. Thus, the playback apparatus discards the interactive_composition structure currently on the composition buffer. As shown in FIG. 9, when a skip operation am1 is executed, the composition buffer discards the stored contents at the execution timing am2 of the skip operation. Then, the $DS_8$[ICS] residing on the skip destination is loaded to the composition buffer as indicated by an arrow pf3.

Figure 10:
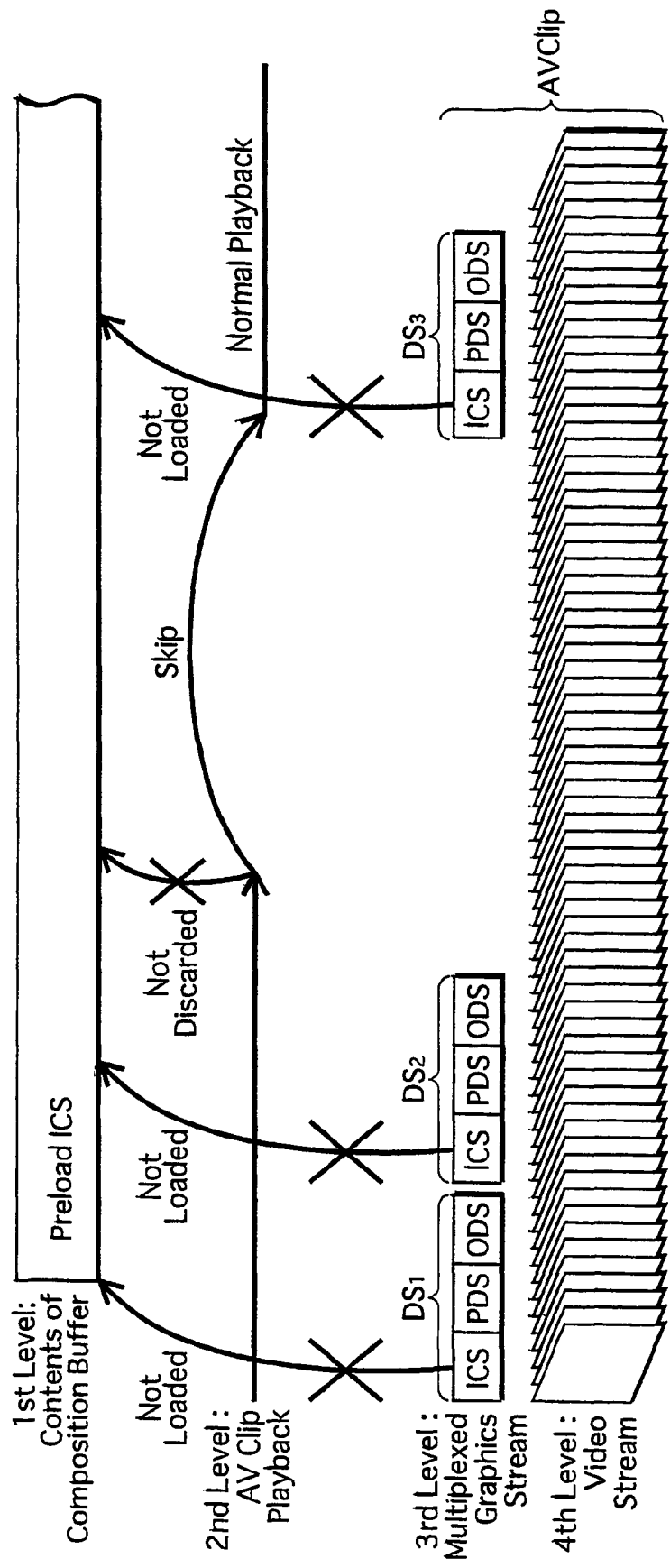
FIG. 10 is a view showing the processing performed on an ICS in the case where the stream_model field shows a "Preload" type.

As above, in the case of the "multiplexed" type stream model, the composition buffer needs to discard the stored interactive_composition structure as the AV playback proceeds. On the contrary, in the case of the "preload" type stream model, the composition buffer is not required to discard the stored interactive_composition structure at all. If the composition buffer discards the stored interactive_composition structure as the AV playback proceeds, the same interactive_composition structure as the discarded one needs to be loaded from the BD-ROM again. This useless operation of re-loading the same interactive_composition structure results in an extra burden. FIG. 10 is a view showing the contents of the composition buffer. FIG. 10 is similar to FIG. 9 with respect to what is shown in each of the first to fourth level. Yet, FIG. 10 is totally different from FIG. 9 with respect to the contents of the composition buffer stored at different times. Specifically, even if the current playback point reaches where the DS, is multiplexed, the ICS of the $DS_1$ is not loaded to the composition buffer (indicated by the mark "X" in the figure). Similarly, even if the current playback point reaches where the $DS_2$ is multiplexed, the ICS of the $DS_2$ is not loaded to the composition buffer (indicated by the mark "X" in the figure). Similarly, the content-s stored in the composition buffer are retained rather than discarded, even if a skip operation is executed. The interactive_composition structure is provided with the stream_model field for allowing a controlling subject (the graphics controller) to accurately judge whether to discard the stored interactive_composition structure as the proceeding of AV playback or to retain the stored interactive_composition structure irrespective of the proceeding of AV playback. This concludes the description of, the stream_model field.

Referring back to FIG. 8, the "user_interface_model" shows the type of user interface model to be used for the interactive_composition structure. The user_interface_model shows either "Always-On U/I" or "Pop-Up U/I". When the Always-On U/I is used, a menu appears on screen and disappears in accordance with the proceeding of AV clip playback. When the Pop-Up U/I is used, a menu appears on screen and disappears in response to a user operation.

The composition_time_out_pts field shows the end time of an Epoch (Epoch END) to which the ICS belongs. The interactive control defined by the ICS is no longer valid at the Epoch END. That is, a point of time shown by the composition_time_out_pts field is the end of valid interactive control period.

The "selection_time_out_pts" field shows the button selection termination time. At the time shown by the selection- _time_out_pts value, the button that is currently in the selected is automatically activated. Note that buttons are elements representing options in the multi-page menu. The selection_time_out_pts field defines the valid interaction period for user interaction to activate the buttons.

The IF statement (if(stream_model=='$0_b$')) shown in the figure means that the above described "composition time_out_pts" and "selection time_out_pts" fields are optional information that are provided only when the "stream_model" field shows "Multiplexed" type. In the case of ICS of which stream model is "Preloaded" type, neither of the "composition_time_out_pts" and "selection time out_pts" fields is provided.

The user_time_out_duration field shows the timeout at which on-screen pages presented in response to a user operation are removed. When the Always-On U/I is used, pages from the second page onward (referred to as sub pages) are presented in response to user operations. Thus, after the timeout defined by the user_time_out_duration, all sub pages are removed from the screen leaving the first page on-screen. When the Pop-Up I/O is used, not only the sub pages but also every page of the Multi-page menu is presented in response to user operations. Thus, after the user_time_out_duration, all on-screen pages are removed leaving no page remain presented (No Menu Display).

Next, a description is given to the meaning of the selection_time_out_pts and composition_time_out_pts fields in an Epoch.

Figure 11:
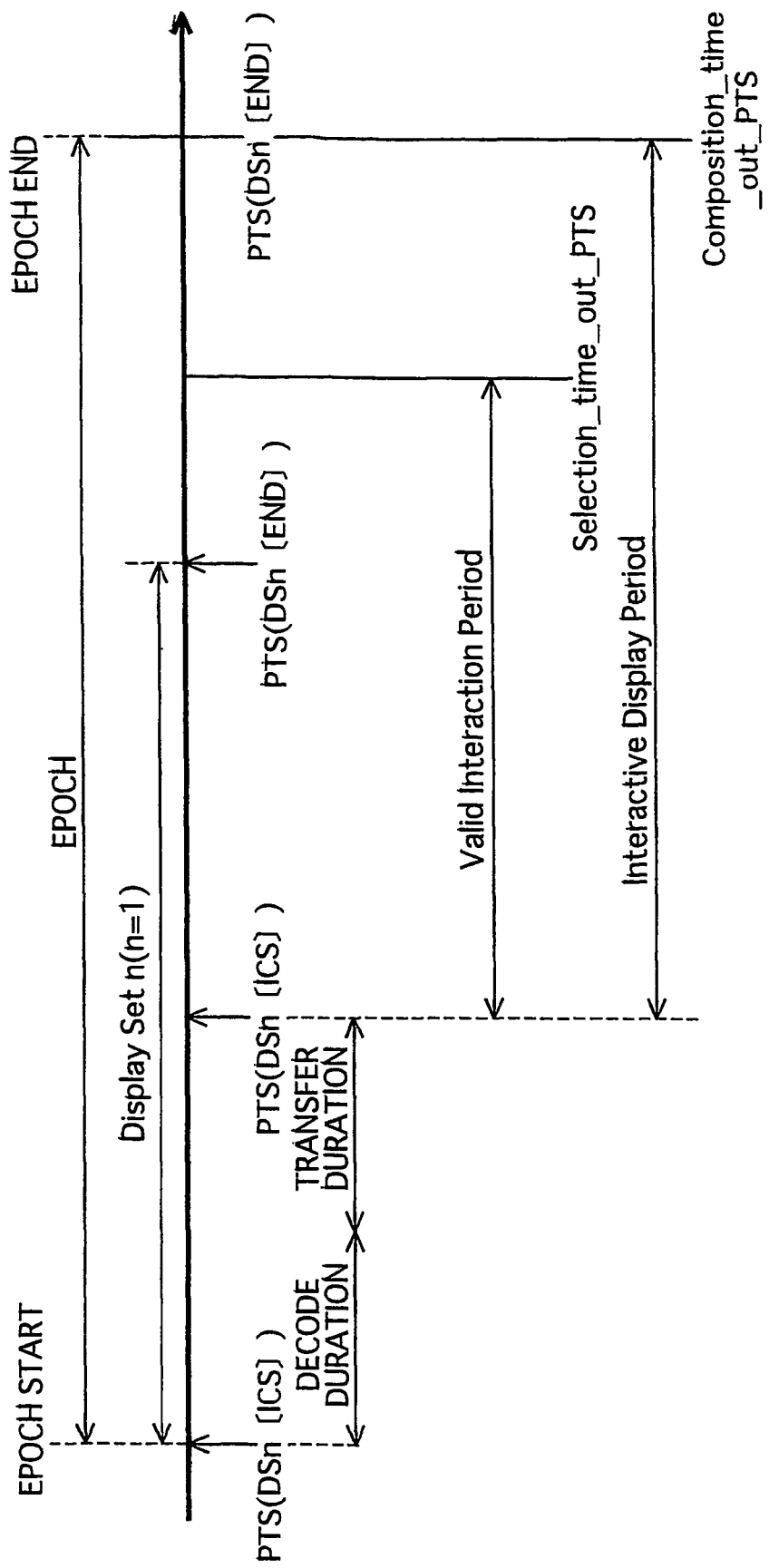
FIG. 11 is a timing chart illustrating the functions of selection_time_out_pts and composition_time_out_pts fields in an ICS belonging to the $DS_n$ in the case where the $DS_n$ is an Epoch Start DS (n=1)

FIG. 11 is a timing chart illustrating the functions of the selection_time_out_pts and composition time_out_pts fields in an ICS belonging to a $DS_n$ in the case where the $DS_n$ is an Epoch Start DS (n=1). The timing chart shows that the composition_time_out_pts value specifies the end of Epoch (Epoch END). The interactive display is valid for a period from the PTS($DS_n$[ICS]) to the Epoch END. This period is referred to as the "Interactive Display Period".

The selection_time_out_pts specifies a time preceding the Epoch End. User interaction may be made during a period from the PTS($DS_n$[ICS]) to the time specified by the selection_time_out_pts value. This period is referred to as the "valid interaction period". As above, the selection time_out_pts field defines the end time of a period which starts from the first presentation of the interactive display and during which the interactive display is available for user interaction. The composition_time_out_pts field defines a period starting from the first presentation of the interactive display during which the interactive display in an Epoch remains valid and thus presented. This concludes the description of the selection_time_out_pts and composition_time_out_pts fields. Next, a description is given to the Multi-page menu state transition defined by the selection_time_out_pts, composition-time_out_pts, and user_time_out_duration fields.

Figure 12A:
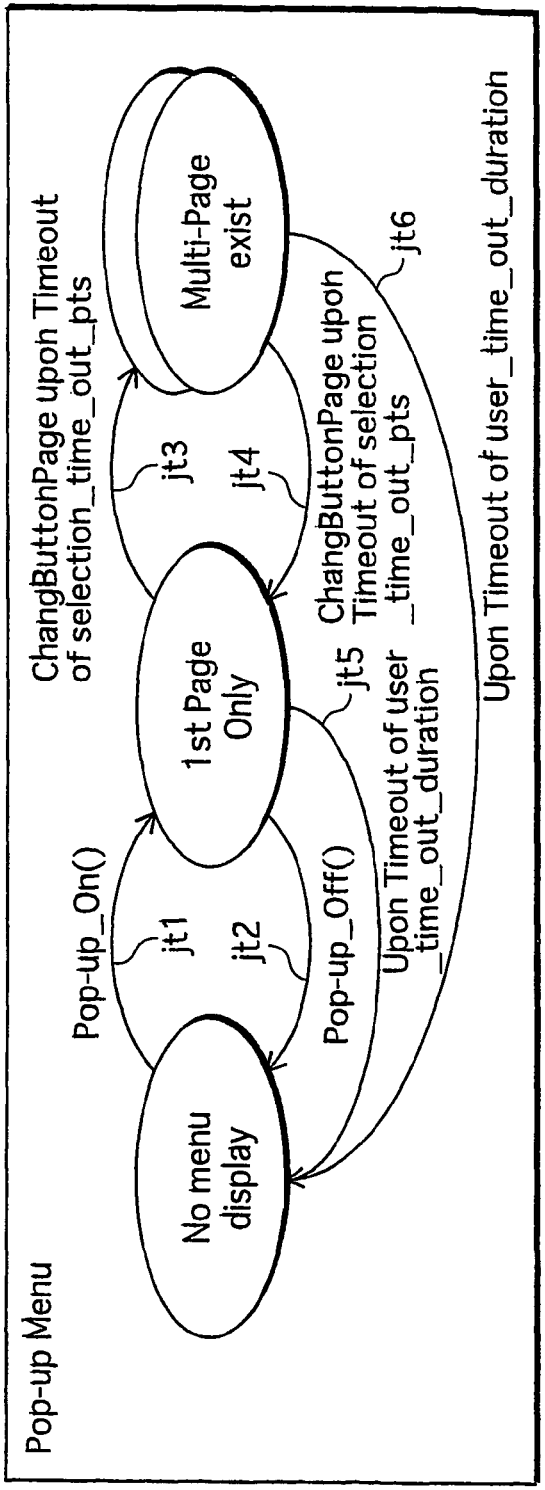
FIG. 12A is a view showing the state transition of a Multi-page menu when a Pop-Up U/I is used.

FIG. 12A is a view showing the state transition of the Multi-page menu based on the selection_time_out_pts, composition_time_out_pts, and user_time_out_duration fields. FIG. 12A is a view showing the state transition of the Multi-Page menu when the Pop-Up U/I is used. The Multi-page menu shown in the figure has the following three states: No Menu Display, 1$^{st}$ Page Only, Multi-Page Exist.

The 1$^{st}$ page only is the state where only the first page of the Multi-Page menu is presented.

The Multi-Page exist is the state where pages from the second page onward (i.e. sub pages) are presented in addition to the first page.

An arrow jt1 represents the transition from the No Menu Display state to the 1$^{st}$ Page Only state. This state transition is triggered by an event "Pop-Up_On". The "Pop-Up_On" is an event generated within the playback apparatus in response to a user operation for a menu call.

An arrow jt2 represents the transition from the 1$^{st}$ Page Only state to the No Menu Display state. This state transition is triggered by an event "Pop-Up_Off". The "Pop-Up_Off" is an event generated within the playback apparatus in response to a user operation for a menu removal.

Arrows jt3 and jt4 represent, the transition from the 1$^{st}$ Page Only state to the Multi-Page Exist state, and then from the Multi-Page Exist state to the 1$^{st}$ Page Only state. The state transition is triggered by an event "ChangeButtonPage" generated upon the timeout defined by the selection_time_out_pts. The ChangeButtonPage is an event generated within the playback apparatus in response to a user operation for switching a menu page. The event is generated on precondition that a user operation for switching a menu page is made. The selection_time_out_pts shows the time for forcefully invalidating a button for receiving a user operation for switching a menu page. Thus, the description of the selection_time_out_pts field realizes the state transition of "1$^{st}$ Page Only →Multi Page Exist→1$^{st}$ Page Only".

An arrow jt5 represents the transition from the 1$^{st}$ Page Only state to the No Menu Display state. An arrow jt6 represents the transition from the Multi-Page Exist state to the No Menu Display state. The state transition jt6 is triggered by the timeout of the user_time_out_duration.

In the figure, the state transitions to the No Menu Display state from the 1$^{st}$ Page Only state (jt5) and from the Multi-Page Exist state are defined by the user_time_out_duration field. That is to say, it is possible to define such control that on-screen menu pages are automatically removed when the AV playback reaches to a climax scene. With this control, it is avoided that the menu pages interferes with viewing the video stream playback.

Figure 12B:
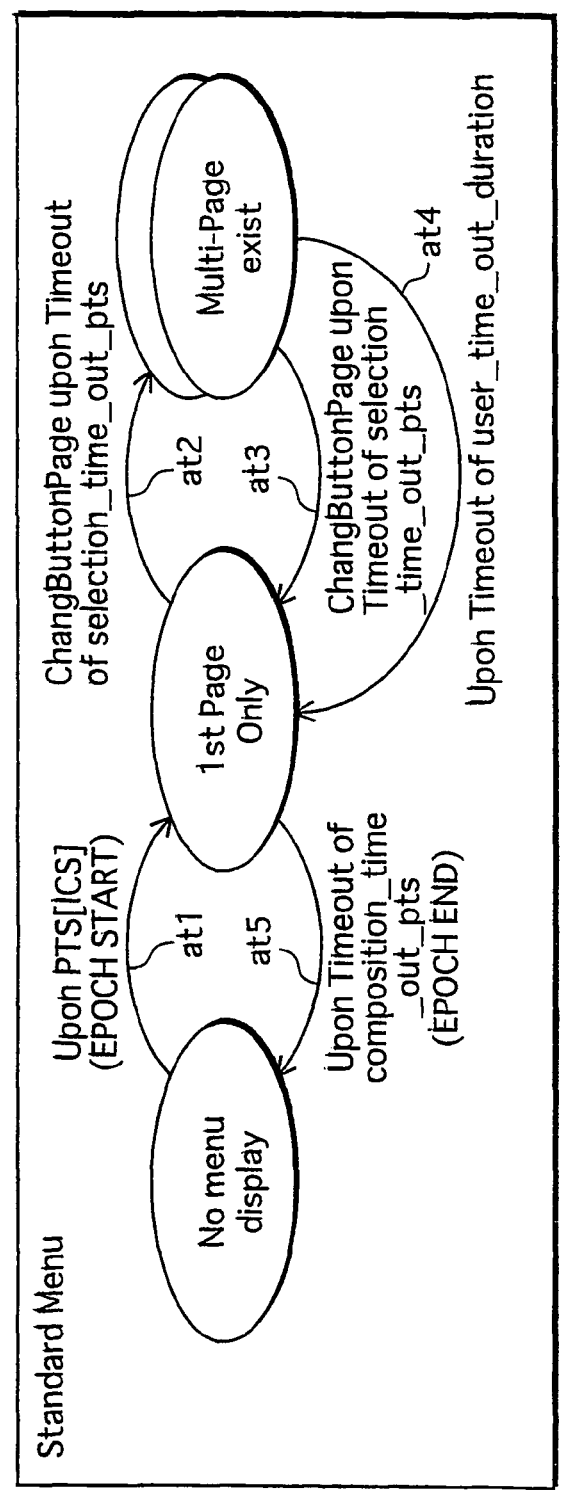
FIG. 12B is a view showing the state transition of the Multi-page menu when an Always-On U/I is used.

FIG. 12B shows the state transition of Multi-page menu when the Always-On U/I is used. An arrow at 1 represents the transition from the No Menu Display state to the 1$^{st}$ Page Only state. This state transition is triggered by an event "Epoch Start". The "Epoch Start" is an event showing that the current playback point reaches the point corresponding to the PTS associated with the interactive_composition structure. It is shown that the 1$^{st}$ page is automatically presented as the video stream playback proceeds and without waiting for any user operation.

An arrow at 2 shows the transition from the 1$^{st}$ Page Only state to the Multi-Page Exist state, and an arrow at 3 shows the transition from the Multi-Page Exist state to the 1$^{st}$ Page Only state. These state transitions are also triggered by the ChangeButtonPage event generated upon a timeout of the valid interaction period defined by the selection_time_out_pts.

An arrow at 4 represents the transition from the Multi-Page Exist state to the 1$^{st}$ Page Only state. This state transition is triggered by the timeout of the user_time_out_duration. As apparent also from this state transition, when the Always-On U/I is used, the state transition is made to the 1$^{st}$ Page Only state not to the-No Menu Display state upon the time out of the user_time_out_duration.

An arrow at 5 represents the transition from the $_1$st Page Only state to the No Menu Display state. This state transition is triggered by the time out of the composition_time_out_pts. Note that the composition_time_out_pts shows the end of Epoch (EpochEND).

As apparent from FIGS. 12A and 12B, the Multi-Page menu behavior is defined by the selection_time_out_pts, user_time_out_duration, and composition_time_out_pts fields provided in the interactive_composition structure.

FIGS. 13-15 show the screen display presented under control defined as above. FIG. 13 shows the display scenario incorporating the Multi-Page menu. In this scenario, the Multi-Page menu is not presented on screen at first. The $1^{st}$ page of the Multi-Page menu is presented when the current playback point reaches the point t1, and a Sub page is additionally presented at the point t2. When the current playback point reaches the point t3, the on-screen Sub page is removed leaving only the $1^{st}$ page on screen. The $1^{st}$ page is then removed at the point t4 leaving no menu page displayed on screen.

At the bottom of FIG. 13 is the interactive_composition structure described to achieve the above display scenario. The PTS(DS$_n$[ICS]) is set to the value corresponding to the point t1, the selection time_out_pts to the value corresponding to the point t2, the user_time_out_duration to the value corresponding to the point t3, and the composition_time_out_pts to the value corresponding to the point t4. With this setting, the Multi-Page menu undergoes the state transitions shown in FIG. 13.

Now, a description is given to the setting of selection_time_out_pts value in greater detail with reference to a specific example.

Figure 14B:
FIGS. 14A-14C show a display example defined by the selection_time_out_pts.
Figure 14A:
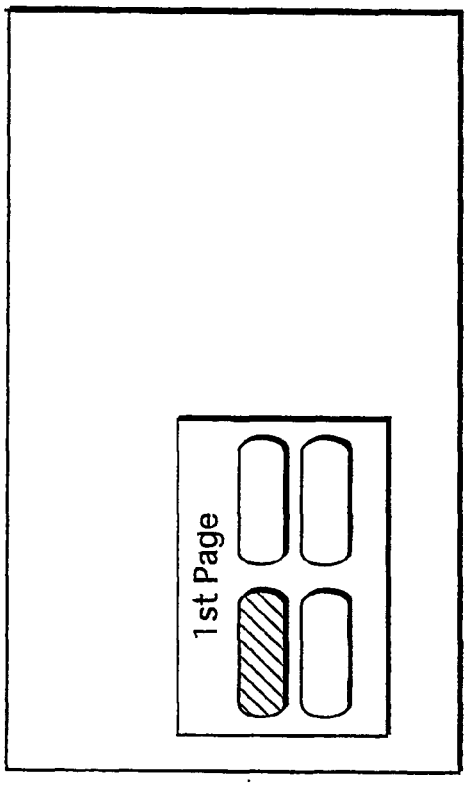
Figure 14C:
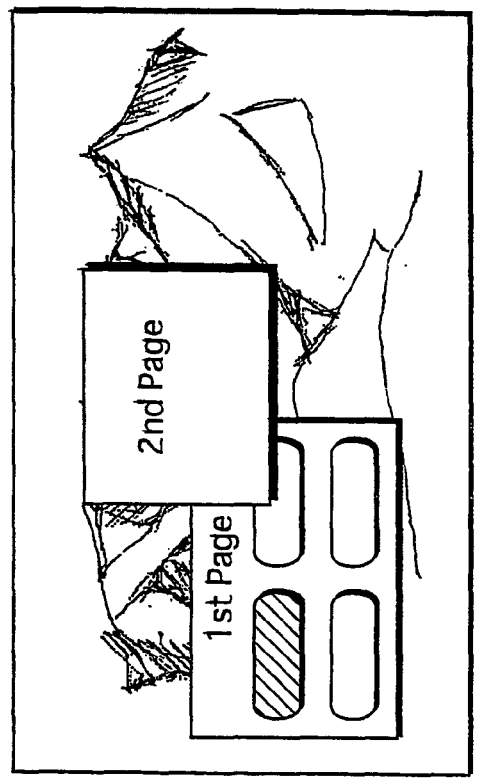

FIGS. 14A-14C show a display example defined by the selection_time_out_pts. As shown in FIG. 14A, at the point of t1, the first page of Multi-Page Menu is overlaid with a picture of the video stream. A picture presented at the point t2 is of a scenic shot and is of less importance in the story of the AV clip. Since the picture presents no valuable contents for users, the selection_time_out_pts value is set to automatically activate a button presented on the $1^{st}$ Page at the point t2. Consequently, a Sub Page is overlaid with the scenic short shown in FIG. 14B, so that a composite image as shown in FIG. 14C appears on screen.

Figure 15A:
FIGS. 15A-15D show a display example defined by the user_time_out_duration.
Figure 15B:
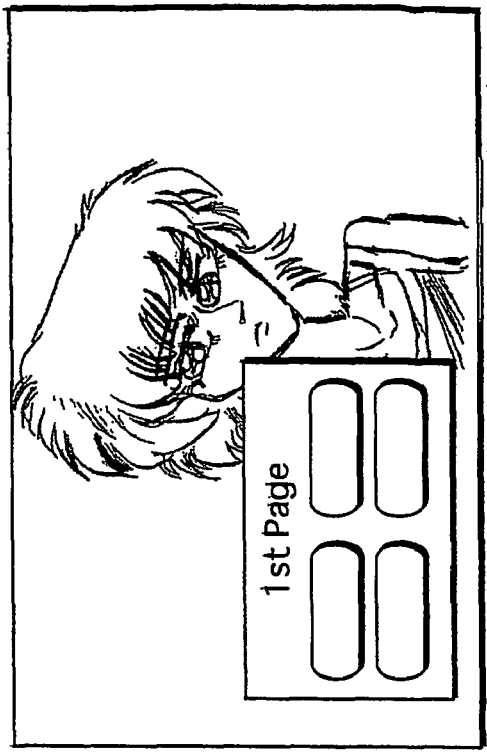
Figure 15C:
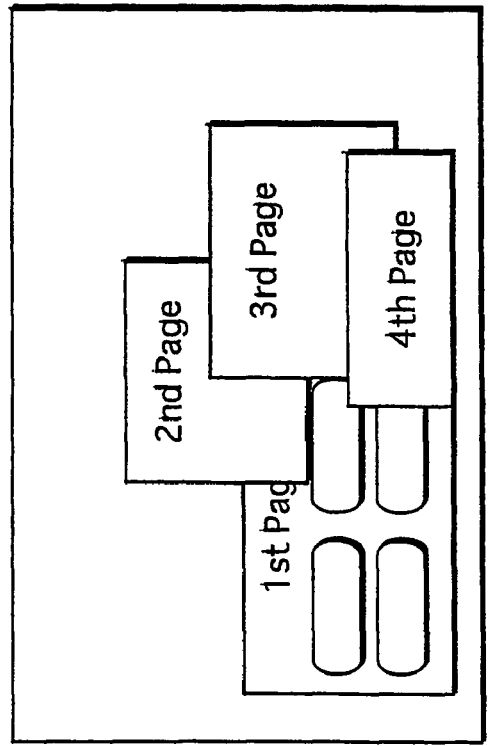
Figure 15D:
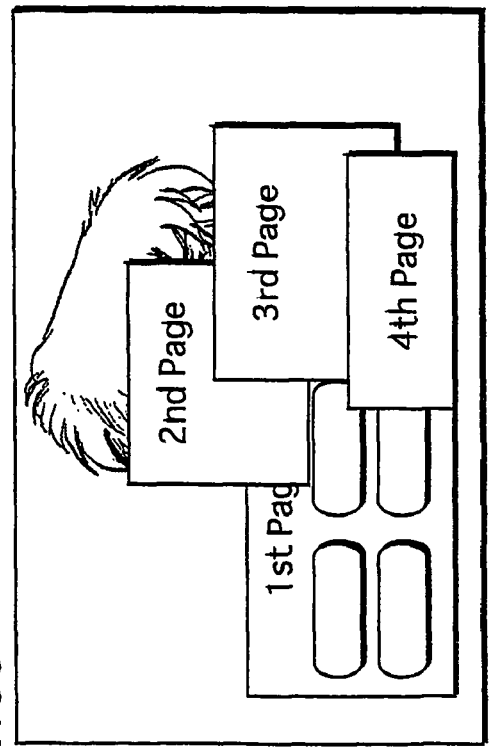

In a similar manner, a description is given to the setting of user_time_out_duration value with reference to a specific display example. FIGS. 15A-15D show a display example defined by the user_time_out_duration. In this example, the Multi-Page menu is in the Multi-Page Exist state where multiple Sub Pages ($2^{nd}$, $3^{rd}$, and $4^{th}$ pages) are presented on screen as shown in FIG. 15A. In the Multi-Page Exist state, the pages of the Multi-Page menu are overlaid with a picture included in the video stream. Here, the picture to be presented at the point t3 is a character image as shown in FIG. 15B. In this case, the multiple Sub Pages overlaid with the picture end up covering most of the character image as shown in FIG. 15C. As a result, the facial expression of the character image can not be seen. To avoid this interference, the user_time_out_ duration is set to the value corresponding to a time immediately before the point t3. With this setting, the Multi-Page menu undergoes the state transition from the Multi-Page Exist state to the $1^{st}$ Page Only state. As a result, the composite image as shown in FIG. 14D is presented at the point t3. Here, the $1^{st}$ page is solely presented on screen without blocking the character image too much. Furthermore, since the $1^{st}$ page remains on screen rather than removing every page of the Multi-Page Menu, there is no need to call the menu again.

As described above, according to the first embodiment, the ICS multiplexed in the graphics stream includes control information defining behavior of a Multi-Page Menu in accordance with the proceeding of AV playback. This makes it possible to define such control that numerous pages are presented during the playback of less important scenes, such as scenic shorts, and that on-screen pages are removed as the AV playback approaches climax scenes. With such control, the menu pages are presented without interfering with the playback of the AV clip, which is the main content. Thus, the user can concentrate on viewing the AV playback while enjoying convenience of the Multi-Page Menu functions.

Second Embodiment

A second embodiment relates to display compositions for presenting pages of a Multi-Page Menu. According to the second embodiment, a display composition is designed to present a plurality of graphical elements called button on screen. In addition, an animation effect is presented on screen before introducing and/or after removing a menu page.

Figure 16:
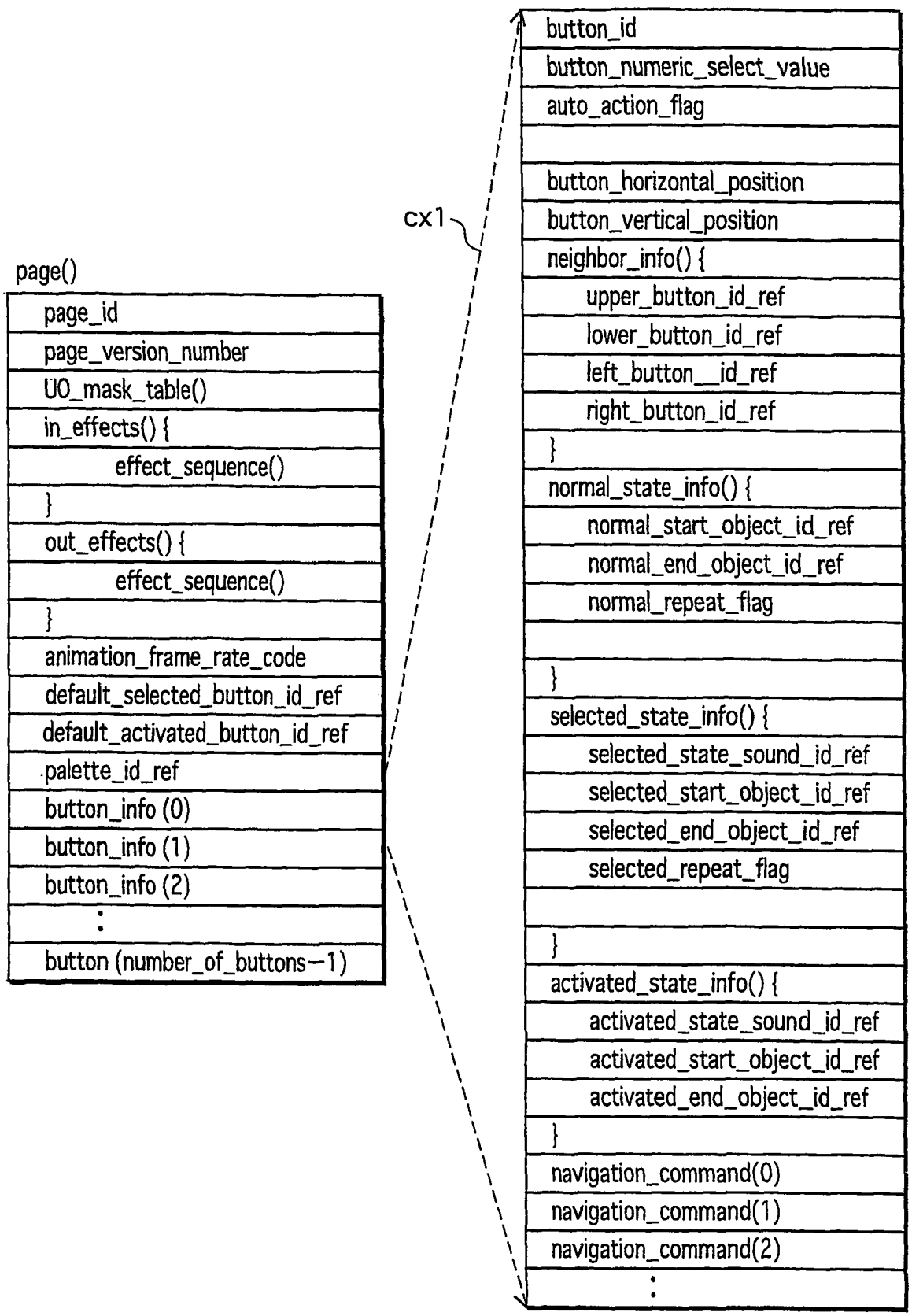
FIG. 16 is a view showing the internal structure, of page information associated with an arbitrary one of multiple pages, ($x^{th}$ page) of the Multi-Page Menu.

FIG. 16 is a view showing the internal structure of page information associated with an arbitrary one of multiple pages ($x^{th}$ page) of the Multi-Page Menu. As shown in the left part of the figure, page information (x) is composed of the following fields: "page_id" showing an identifier uniquely identifying the page (x); "UO_mask_table"; "in_effects" specifying an animation effect to be presented as introduction of the page x to the screen; "out effects" specifying an animation effect to be presented after removal of the page (x) from the screen; "animation_frame_rate code" showing an animation frame rate to be followed at the time of presenting animation effects for the page (x); "default_selected_ button_id_ref"; "default_activated_button_id_ref"; "pallet_id_ref"; and "button_info (1), (2) . . . (number_of_buttons−1)" each associated with one of the buttons presented on the page (x).

The UO_mask_table field shows permissions and prohibitions of user operations on the page (x). If this field is set to a value showing "prohibited", a corresponding user operation to the playback apparatus is invalid while the page (x) is active.

The default_selected_button_id_ref field shows whether a button to be selected as default upon starting the presentation of page (x) is determined dynamically or statically. When this field is set to "0xFF", the default selected button is determined dynamically. In such a case, the value held in a Player Status Register (PSR) of the playback apparatus is interpreted with priority, and the button shown by the PSR is put into the selected state. On the other hand, when this field is set to the value other than "0xFF", the default selected button is determined statically. In such a case, the PRS is overwritten with the default_selected_button_id_ref field value, and the button specified by this field is put into the selected state.

The default_activated_button_id_ref field shows a button to be automatically activated at the time defined by the selection_time_out_pts field value. When the default_activated_button_id_ref field value is set to "FF", the button that is in the selected state at the time of the timeout is automatically activated. On the other hand, when this field is set to "00", no button is automatically activated. When this field is set to the value that is neither "00" or "FF", the value is interpreted as a valid button number statically specifying the button to be automatically activated.

The pallet_id_ref field shows the ID associated with a pallet to be set in a CLUT unit, which will be described later.

Each button_info structure is information defining a button to be presented on the page (x). With the above fields, each page of the Multi-Page menu is defined. Next, a description is given to the internal structure of button_info structure. In the description, an arbitrary one of the buttons on the page (x) is denoted as a button (i). In FIG. 16, arrows cx1 indicate that the internal structure of button_info (i) is excerpted to be shown in detail.

Each button presented on the page has three states which are a normal state, a selected state, and an activated state. When a button is in the normal state, the button is simply displayed. When a button is in the selected stated, the button is currently focused as a result of a user operation but not yet activated. When a button is in the activated state, the button has been activated. Since each button has these three states, the button_info (i) is provided with the following information.

The button_id field shows a value uniquely identifying the button (i) in the interactive_composition structure.

The button_numeric_select_value field shows a flag indicating whether the button (i) is numerically selectable.

The auto_action_flag field shows whether the button (i) is automatically activated. When the auto_action_flag field is set to ON (bit value of "1"), the button (i) is transferred not to the selected state but directly to the activated state when selected. On the other hand, when the auto_action_flag field is set to OFF (bit value of "0"), the button (i) is transferred not to the activated state but to the selected state when selected.

The button_horizontal_position field and button_vertical_position field respectively specify the horizontal and vertical positions of the top left pixel of the button (i) on the interactive display.

The neighbor_info structure shows buttons to receive the selected state in response to user operations made to move a focus in an up, down, right, and left direction when the button (i) is in the selected state. The neighbor_info structure is composed of upper_button_id_ref, lower_button_id_ref, left_button_id_ref, and right_button_id_ref fields.

The upper_button_id_ref field specifies the button number of a button to receive the selected state if a user operation instructing to move the focus in the up direction is made while the button (i) is in the selected state. The move up operation is executed at a push of a Move Up key of the remote controller. If this field is set to the same button number as that of the button (i), the user operation to the Move Up key is ignored.

Similarly, the lower_button_id_ref field, the left_button_id_ref field, the right_button_id_ref field each specify the button numbers of a button to receive the selected state if a user operation instructing to move the focus to the down, left, or right direction is made, while the button (i) is in the selected state. The respective operations are executed at a push of the Move Down key, Move Left key, and Move Right key of the remote controller. If these fields are set to the same button number as that of the button (i), the user operations to the those keys are ignored.

The normal_state_info structure defines the normal state of the button (i), and is composed of the normal_start_object_id_ref, normal_end_object_id_ref, and normal_repeat_flag fields.

The normal_start_object id_ref field specifies the first one of the object_id values that are serially assigned to a sequence of ODSs used to present the normal state of button (i) in animation.

The normal_end_object_id_ref field specifies the last one of the object_id values that are serially assigned to the sequence of ODSs used to present the normal state of button (i) in animation. If the normal_end_object_id_ref field specifies the same ID value as that of the normal_start_object_id_ref, the static image of a graphics object identified by that ID is presented as the button (i).

The normal_repeat_flag field specifies whether the animation of the button (i) in the normal state is to be continuously repeated.

The selected_state_info structure defines the selected state of the button (i). The selected_state_info structure is composed of the selected_state_sound_id_ref, selected_start_object_id_ref, selected_end_object_id_ref, and selected_repeat_flag fields.

The selected_state_sound_id_ref field specifies sound data to be reproduced as a click sound when the button (i) is put to the selected state. The sound data is specified by the sound_id of a piece of sound data contained in the file called sound.bdmv. When this field is set to "0xFF", no sound data is associated with the selected state of the button (i) and thus no click sound is reproduced when the button (i) is changed to the selected state.

The selected_start_object_id_ref field specifies the first one of the object_id values that are serially assigned to a sequence of ODSs used to present the selected state of button (i) in animation.

The selected_end_object_id_ref field specifies the last one of the object_id values that are serially assigned to the sequence of ODSs used to present the normal state of button (i) in animation. If the selected_end_object_id_ref field specifies the same ID value as that of the selected_start_object_id_ref, the static image of a graphics object identified by the ID is presented as the button (i).

The selected_repeat_flag field specifies whether the animation of the button (i) in the selected state is to be continuously repeated. If the selected_start_object_id_ref and selected_end_object_id_ref fields have the same value, the selected_repeat_flag field is set to the value of "00".

The activated_state_info structure defines the activated state of the button (i), and is composed of the activated_state_sound_id_ref, activated_start_object_id_ref, and activated_end_object_id_ref fields.

The activated_state_sound_id_ref field specifies sound data to be reproduced as a click sound when the button (i) is put to the activated state. The sound data is specified by the sound_id of a piece of sound data contained in the sound.bdmv file. When this field is set to "0xFF", no sound data is associated with the activated state of the button (i) and thus no click sound is reproduced when the button (i) is changed to the activated state.

The activated_start_object_id_ref field specifies the first one of the object_id values that are serially assigned to a sequence of ODSs used to present the activated state of button (i) in animation.

The activated end object_id_ref field specifies the last one of the object_id values that are serially assigned to the sequence of ODSs used to present the activated state of button (i) in animation.

The "navigation_command" structure shows a navigation command to be executed when the button (i) is activated. A representative example of the navigation command is a SetButtonPage command. The SetButtonPage command instructs the playback apparatus to display a desired page of the Multi-Page menu with a desired one of buttons on the page in the selected state. With the use of such navigation commands, content creators can readily describe page transitions at the time of authoring.

Figure 17:
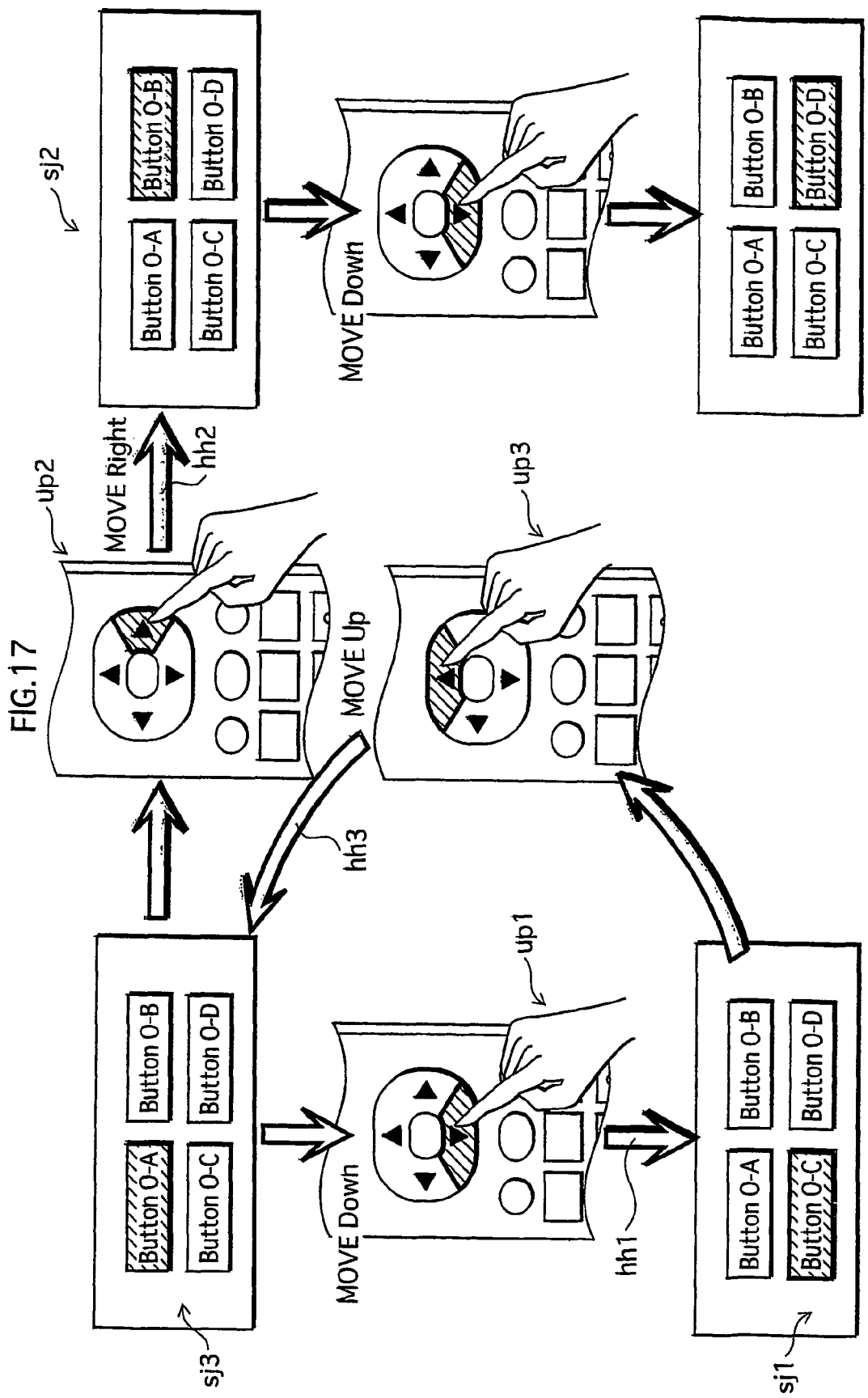
FIG. 17 is a view showing the state transition of buttons O-A, O-B, O-C, and O-D.
Figure 18:
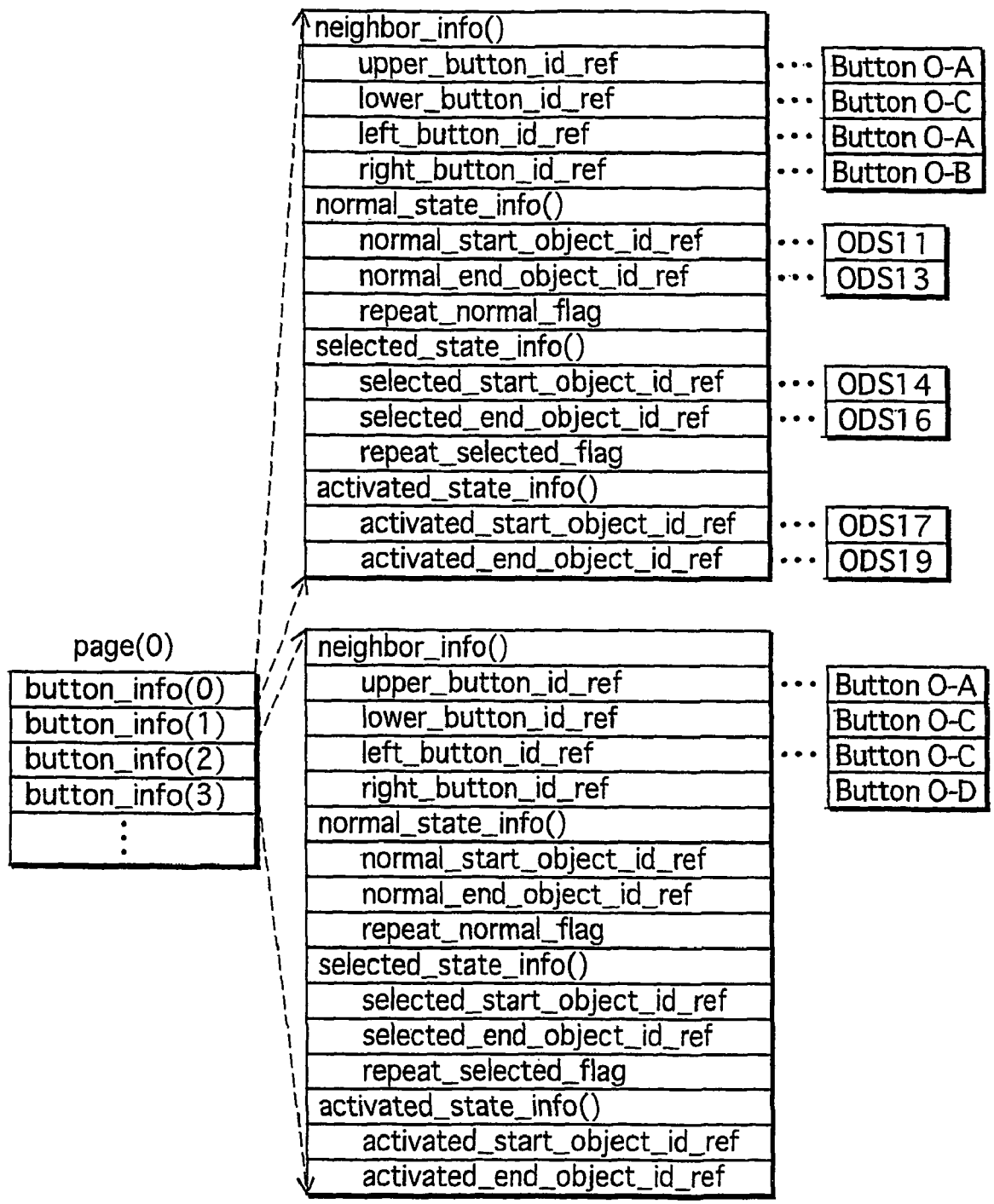
FIG. 18 is a view showing an example of the button_info description defining the button state transition shown in FIG. 17.

This concludes the description of the button_info structure. Now, a reference is made to FIG. 18 showing an example of the button_info description defining the state transition of buttons O-A to O-D, as illustrated in FIG. 17. In FIG. 17, arrows hh1 and hh2 represent the state transitions defined by the neighbor_info ( ) structure of the button info(1), which is associated with the button O-A. In the button info(1), the lower_button_id_ref field is set to the value specifying the button O-C. Thus, if a user operation is made to the Move Down key (FIG. 17, up1) while the button O-A is in the selected state, the button O-C receives the selected state (sj1). The right_button_id_ref field in the button info(1) is set to the value specifying the button O-B. Thus, if a user operation is made to the Move Right key (up2) while the button O-A is in the selected state, the button O-B receives the selected state (sj2).

An arrow hh3 in FIG. 17 represents the button state transition defined by the neighbor_info( ) structure in the button_info(2), which is associated with the button O-C. In the button_info(2), the upper_button_id_ref field is set to the value specifying the button O-A. Thus, if a user operation is made to the Move Up key (up3) while the button O-C is in the selected state, the button O-A is put back into the selected state (sj3).

Figure 19:
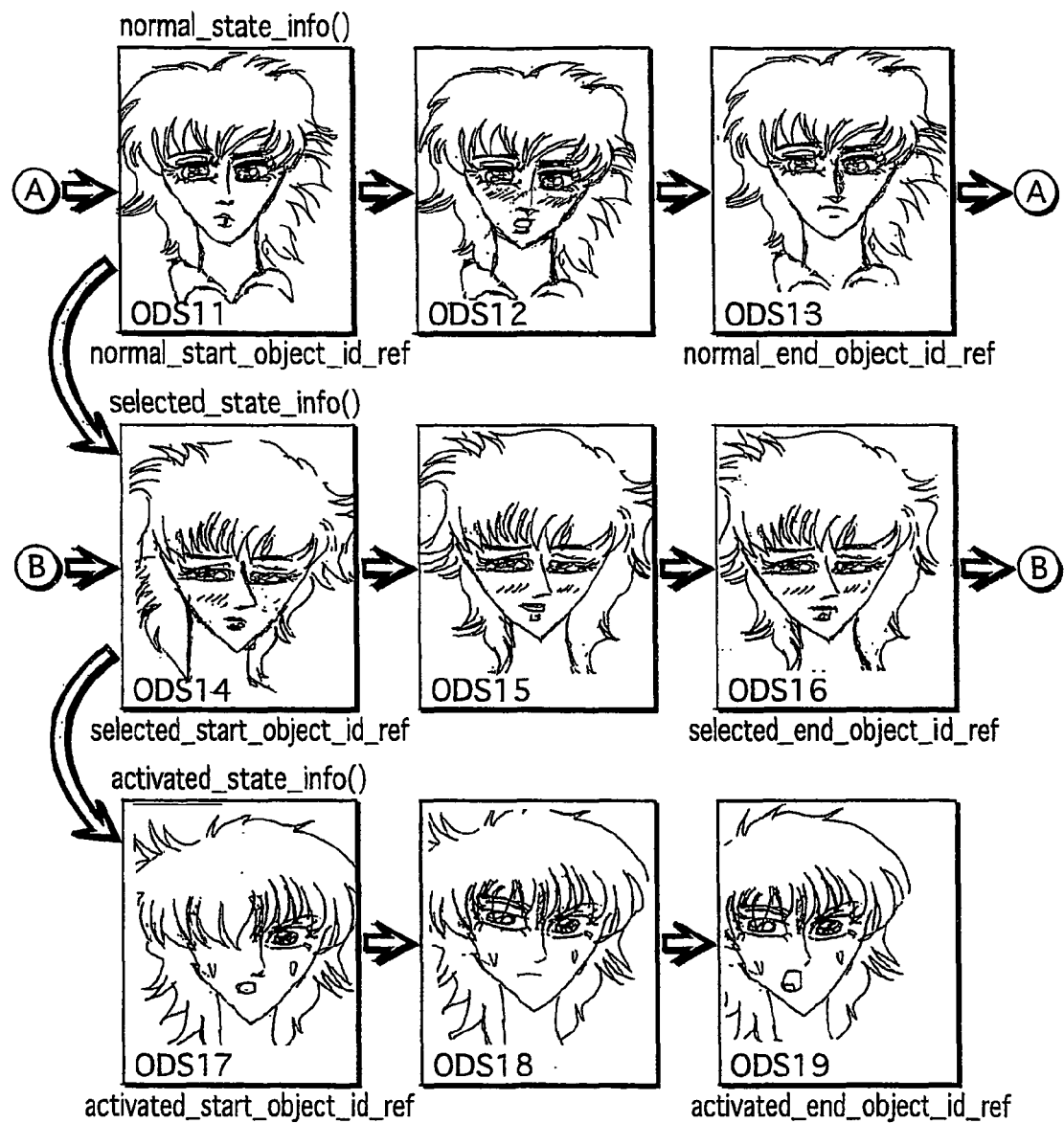
FIG. 19 is a view showing graphical images derived from ODSs 11-19.

Now, a description is given to the graphical images of the buttons O-A, O-B, O-C, and O-D. A $DS_n$ provided with the ICS shown in FIG. 18 includes ODSs 11-19 corresponding to the graphical images shown in FIG. 19. The normal_start_object_id_ref and normal_end_object_id_ref fields in the button_info(0) specify the ODSs 11 and 13, respectively. Thus, the normal state of the button O-A is presented in animation using the sequence of the ODSs 11-13. Similarly, the selected_start_object_id_ref and selected_end_object_id_ref fields in the button_info(0) specify the ODSs 14 and 16, respectively. Thus, the selected state of the button O-A is presented in animation using the sequence of the ODSs 14-16. With this setting, when a user operation is made to put the button O-A to the selected state, the graphical image serving as the button O-A is changed from the one presented using the ODSs 11-13 to the one presented using the ODSs 14-16. Here, if the normal_repeat_flag field in the normal_state_info( ) structure is set to the value "1", the animated presentation of the ODSs 11-13 is repeated as indicated by "→(A)" and "→(A)" in the figure. Similarly, if the selected_repeat_flag field in the selected_state_info( ) structure is set to the value "1", the animated presentation of the ODSs 14-16 is repeated as indicated by "→(B)" and "→(B)" in the figure.

As above, a plurality of sets of ODSs that can be presented in animation are associated with the buttons O-A, O-B, O-C, and O-D. Thus, with the ICS referencing the ODSs, such a control is defined that a character image serving as a button changes its facial expression in response to user operations.

Figure 20:
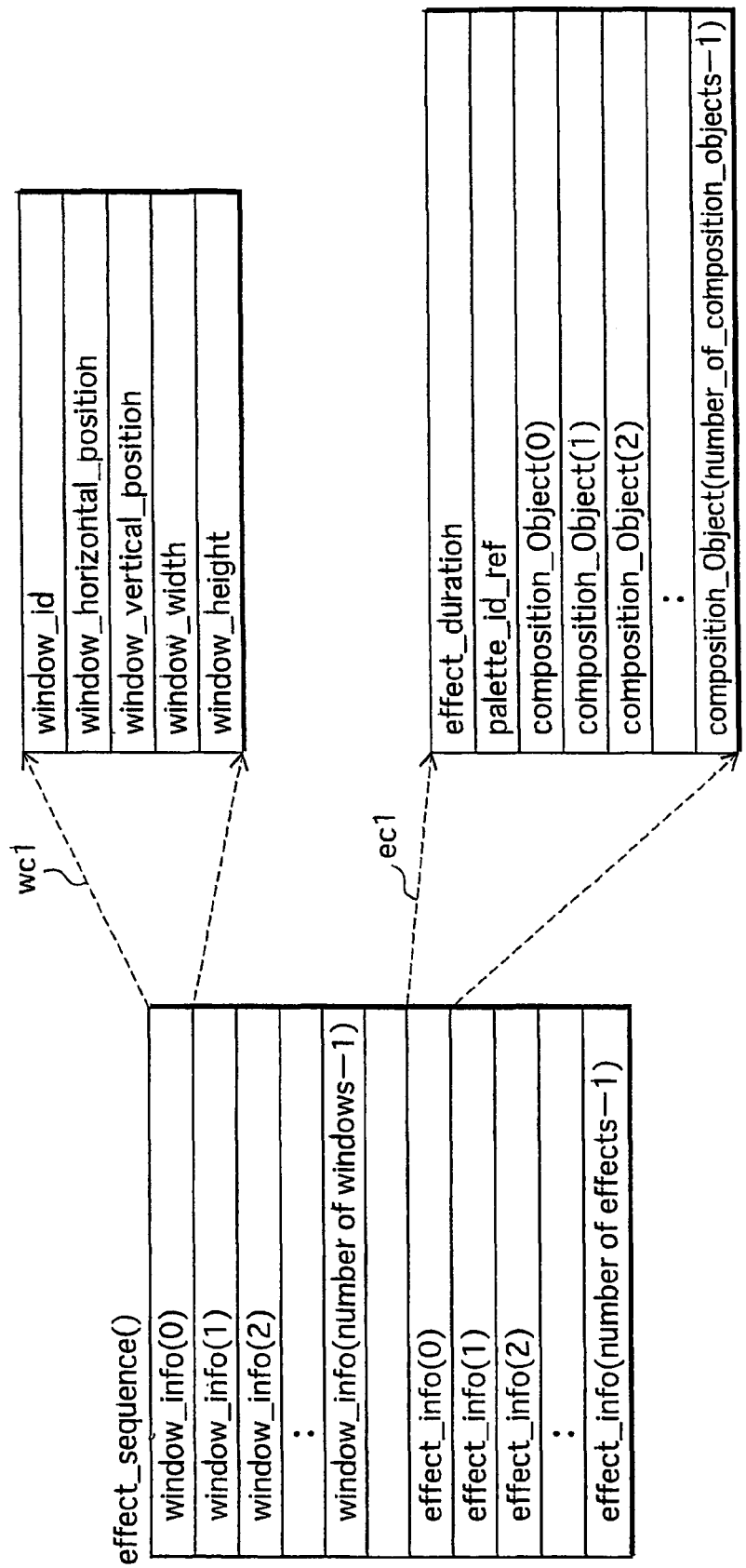
FIG. 20 is a view showing an effect_sequence structure.

This concludes the description of the button_info structure. Next, a description is given to animation effects. As shown in FIG. 16, the in-effects field and the out-effects field each specify an effect_sequence structure. FIG. 20 is a view showing an effect_sequence structure. As shown in the left half of the figure, the effect_sequence structure is composed of: window_info(0), (1), (2) . . . (number_of_windows−1); and the effect_info(0), (1), (2) . . . (number_of_effects−1).

The animation effect is presented by updating display compositions at fixed intervals. Each effect_info structure is a piece of information defining one display composition. Arrows ec1 indicate that the internal structure of effect_info is excerpted to be shown in detail. As shown in the figure, the effect_info structure is composed of: the effect_duration field showing the above-mentioned fixed interval, i.e. a time period for which the associated display composition is to be presented; the pallet_id_ref field specifying a pallet used for the associated display composition; and the composition_object (0), (1), (2) . . . (number_of_composition_object−1) specifying the details of the display composition.

Each window_info structure defines a window or an area on the graphics plane within which the display compositions are rendered. As indicated by arrows wc1, the window_info is excerpted to be shown in detail. As shown in the figure, the window-info is composed of the following fields: "window_id" uniquely identifying a widow on the graphics plane; "window_horizontal_position" specifying the horizontal position of the top left pixel of the window; "window_vertical_position" specifying the vertical position of the top left pixel of the window; "window_width" specifying the width of the window; and "window_height" specifying the height of the window.

Now, a description is given to values that may be set in each of the window_horizontal_position, window_vertical_position, window_width, and window_height fields. These fields are set to the value corresponding to the coordinates within the two-dimensional graphics plane having the height and width defined by the video_height and video_width fields.

Since the window_horizontal_position field shows the horizontal address of the pixel on the graphics plane, this field takes on a value from "1" to the video_width value. Similarly, since the window_vertical_position shows the vertical address of the pixel on the graphics plane, this field takes on a value from "1" to the video height value.

Since the window_width field shows the width of a window on the graphics plane, this field takes on a value from "1" to the value calculated by subtracting the window_horizontal_position value from the video_width value. Similarly, since the window_height field shows the height of window on the graphics plane, this field takes on a value from "1" to the value calculated by subtracting the window_vertical_position value from the video height value.

As above, the window_info is provided with window_horizontal_position, window_vertical_position, window_width, window_height fields defining the size and position of a window on the graphics plane.

Now, a description is given to the constraint on the window size for realizing the framework for presenting display compositions of graphics at a rate of 24 frames per second. This frame rate corresponds to the video frame rate applied to the video stream playback. With this framework, the graphics objects are presented in detailed synchronization with the video stream. To realize the framework, the window must be cleared and rendered at the video frame rate. Here, a consideration is given to the required transfer rate from the object buffer to the graphics plane.

First, a constraint on the window size is examined. Let Rc denote the transfer rate from the object buffer to the graphics plane. In the worst-case scenario, the clearing and rendering of the window need to be performed at Rc. In other words, the clearing and rendering need to be performed at half of Rc (Rc/2).

Thus, the following equation needs to be satisfied.

$$(\text{Window Size}) \times (\text{Frame Rate}) \approx Rc/2$$

When the frame rate is 24, then RC is expressed in the following equation.

$$Rc = (\text{Window Size}) \times 2 \times 24$$

When the total number of pixels of the graphics plane is 1920×1080 and the bit length of an index per pixel is 8 bits, the total capacity of the graphics plane is 2 Mbytes (≈1920×1080×8).

When Rc is 128 Mbps and the window size is 1/A of the graphics plane, the following equation is satisfied.

$$128,000,000 = 1920 \times 1080 \times 1/A \times 8 \times 2 \times 24$$

$$1/A \approx 0.16 (= 128,000,000/(1920 \times 1080 \times 8 \times 2 \times 24))$$

Thus, by restricting the window size to 16% of the entire graphics plane, the synchronization between animation effects with the video stream is-guaranteed as long as the animation effects are rendered at the transfer rate of 128 Mbps.

Suppose, for example, the effect_duration showing the rate of clearing and rendering a window is ½ or ¼ of the video frame rate. In this case, the window size can be as large as 32% or 64% of the entire graphics plane even if Rc is the same. That is to say, the effect_sequence structure has a feature that the effect_duration is determined to be longer for a larger window size, and shorter for a smaller window size. This concludes the description of the window size. Next, a description is given to the position of window. As mentioned above, the position and the size of a window are fixed throughout an Epoch.

The position and the size of a window are fixed throughout the duration of an Epoch for the following reason. When the position or size of a window is changed, the write address of the graphics plane needs to be changed, which incurs overhead. The overhead inevitably reduces the transfer rate from the object buffer to the graphics plane.

There is a constraint on the number of graphics objects allowed to be rendered in one window at a time. The number of graphics objects is restricted in order to reduce overhead incurred at the time of transferring decoded graphics objects. To be more specific, the overhead referred herein is incurred at the time of setting addresses of edge parts of the graphics objects. This overhead increases if the number of edge parts is greater.

If there is no restriction on the number of graphics objects that can be displayed in one window, the overhead is incurred unlimitedly when transferring graphics objects to the graphics plane, which increases fluctuations in transfer load. On the other hand, if the number of graphics objects in one window is limited to two, the transfer rate Rc can be set on an assumption that the number of instances of overhead is at most four. Hence a minimum standard for the transfer rate Rc can be determined easily.

Figure 21:
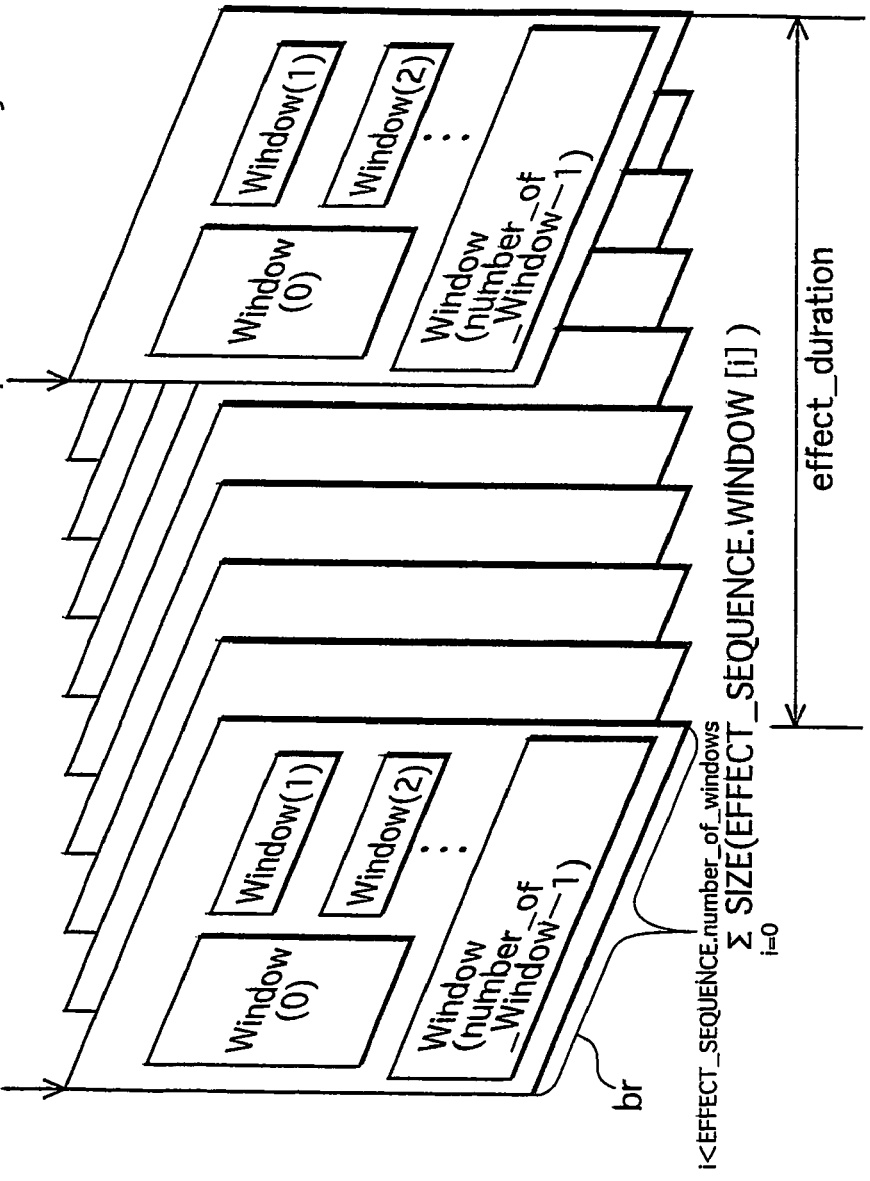
FIG. 21A is a view schematically illustrating how an effect_duration is determined.
FIG. 21B shows an equation for calculating the effect_duration.

Turning now to the effect_info structure, the effect_duration is determined depending on the window size. Now, a description is given to how the effect_duration is determined. FIG. 21A is a view schematically illustrating how the effect_duration is determined. In the figure, the $(j+1)^{th}$ display composition is presented after a plurality of video frames from the presentation of the $j^{th}$ display composition. The number of the plurality of video frames is the effect_duration. In order to calculate the effect_duration, the total size of data to be rendered for presentation of each display composition must be known. Here, the effect_sequence is provided with windows of the number that is indicated by the number_of_windows field value. Thus, the total size of data needed to be rendered for presentation of the $j^{th}$ display composition is equal to the total size of the windows (0) through (number_of_windows−1), as indicated by the brace br.

As above, the $j^{th}$ display composition is provided with the windows (0) through (number_of_windows−1). Thus, the total data size of the windows is divided by the transfer rate of the playback apparatus (128 Mbps) and further multiplied by the time accuracy of PTS (90 KHz), so that the result is expressed in 90 KHz. The resulting value is the duration for which the $j^{th}$ display composition of the effect_sequence is presented. FIG. 21B shows the equation for calculating the effect_duration.

Note that in this specification, the operator "ceil( )" represents a divide that returns a value rounded up to an integer.

Figure 22:
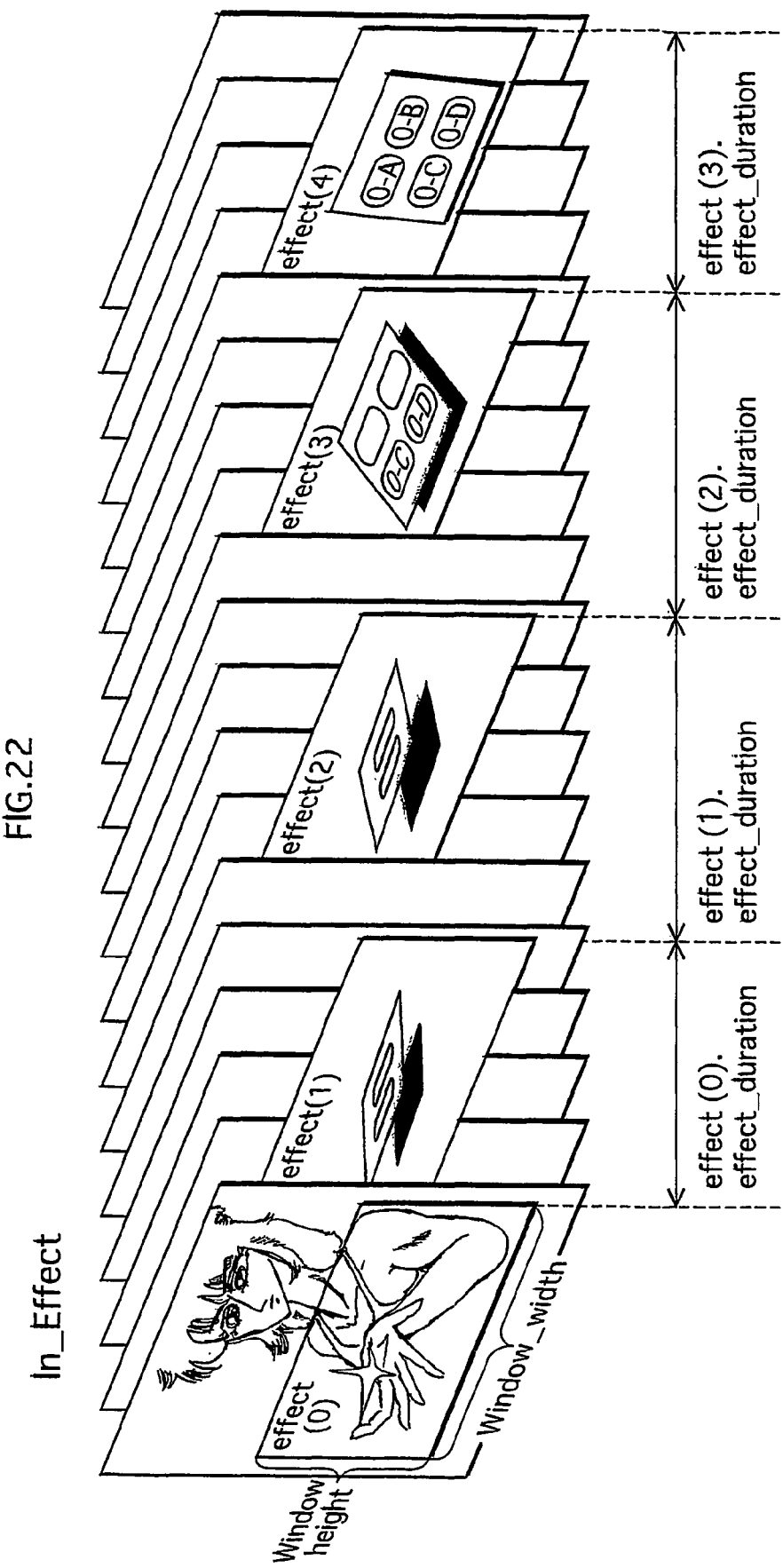
FIG. 22 is a view showing a specific example of an in-effect animation.
Figure 23:
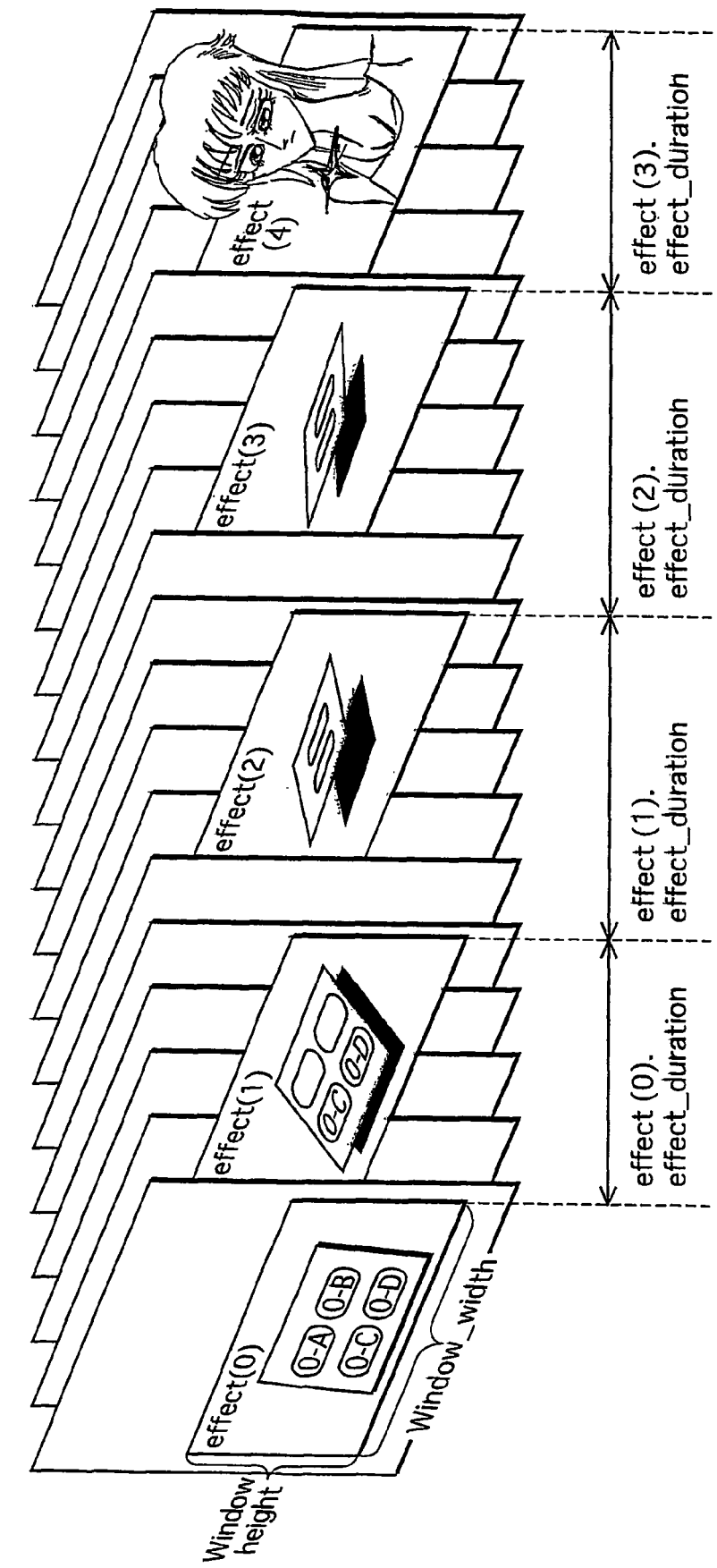
FIG. 23 is a view showing an out-effect animation presented in accordance with the window_width, window_height, and effect_duration field values.

FIG. 22 is a view showing a specific example of an in-effect animation. The in-effect animation presents an image such that a flash of light appears on the palm of hand of the character image on screen and a menu gradually rises up after the flash of light disappears. The size of graphics data is the-largest within the in-effect at the time when the menu is fully shown on screen (effect (4)). Thus, the window_width and window_height of a window are determined based on the data size of the effect (4). Suppose, the window size determined herein is about 50% of the entire graphics plane. This window size is nearly three times as large as the above-mentioned window size of 16% of the graphics plane. Consequently, the effect_duration for this in-effect is determined to be longer in order to allow the display composition to be duly updated at the rate of 128 Mbps. Each effect_duration of the effects (0), (1), (2), and (3) is set to be relatively long. According to this setting, each display composition is rendered for every three video frames, so that it is ensured that the in-effect animation is seamlessly presented. The same scheme applies to an out-effect animation. FIG. 23 is a view showing the out-effect animation for which window_width, window_height, and effect_duration field values are determined in the manner described above.

As described above, according to the second embodiment, the window_info defines an area in the graphics plane for rendering, and the effect_info defines a duration at intervals of which the rendering area is updated. Thus, the duration may be adjusted to be longer when the rendering area is set to be larger, and shorter when the rendering area is set to be smaller. With this setting, the seamless presentation of animation effects is ensured as long as the playback apparatus transfers graphics data at a fixed transfer rate.

Third Embodiment

Figure 24:
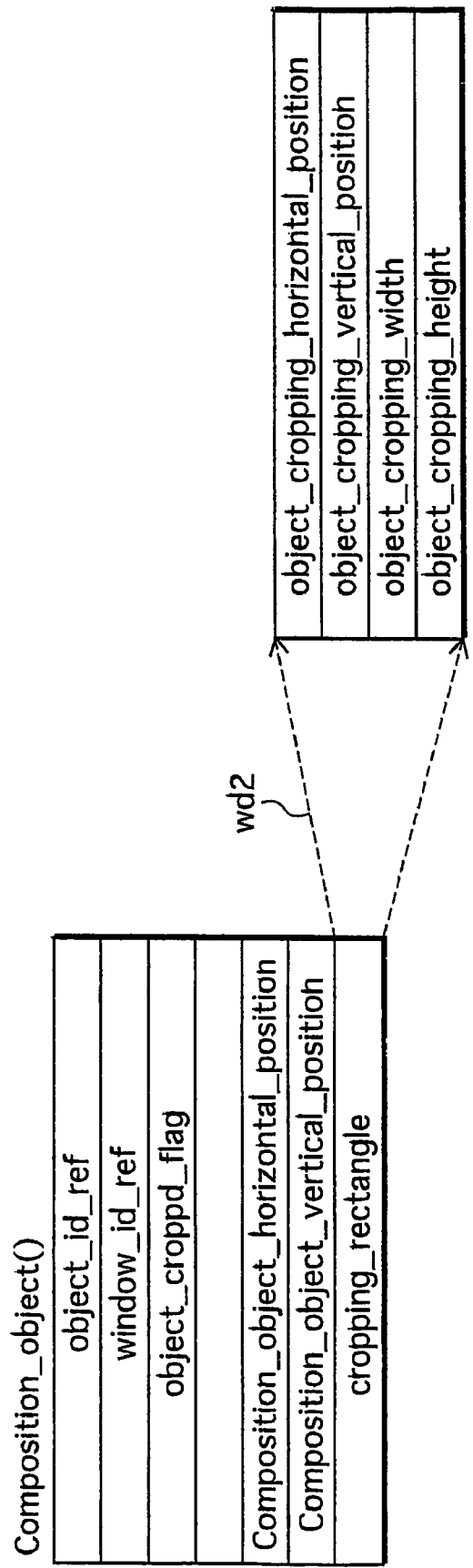
FIG. 24 is a view showing the internal structure of an arbitrary composition_object(i) in detail.

A third embodiment of the present invention relates to an improvement on the presentation of animation effects, such as Scroll, Wipe-In/Out, and Cut-In/Out. The structure for achieving the animation effects lies in the composition_object structures shown in FIG. 20. FIG. 24 is a view showing the internal structure of an arbitrary composition_object (i) in detail. As shown in the figure, the composition_object (i) is composed of the following fields: "object_id_ref"; "window_id_ref", "object_cropped_flag"; "composition_object_horizontal_position"; "composition_object_vertical_position", and "cropping_rectangle_info(1), (2) ... (n)".

The object_id_ref field shows a reference value for a graphics object identifier (object_id). The reference value corresponds to the object_id identifying the graphics object that is used for generating a display composition according to the composition_object (i).

The window_id_ref field shows a reference value for a window identifier (window_id). The reference value corresponds to the window_id identifying the window in which the display composition according to the composition_object (i) is rendered.

The object_cropped_flag field shows a flag indicating whether the graphics object cropped on the object buffer is to be presented or not to be presented. When this field is set to "1", the graphics object cropped on the object buffer is presented. On the other hand, when this field is set to "0", the cropped graphics object is not presented.

The composition_object_horizontal_position field shows the horizontal position of the top left pixel of the graphics object on the graphics plane.

The composition_object_vertical_position field shows the vertical position of the top left pixel of the graphics object on the graphics plane.

The cropping_rectangle structure is valid when the object_cropped_flag field is set to "1". In FIG. 24, arrows wd2 indicate that the internal structure of cropping_rectangle is excerpted to be shown in detail. As shown in the figure, the cropping_rectangle structure is composed of the following fields: "object_cropping_horizontal_position"; "object_cropping_vertical_position"; "object_cropping_width"; and "object_cropping height".

The object_cropping_horizontal_position field shows the horizontal position of the top left corner of the cropping rectangle. The cropping rectangle defines the region of the graphics object to be cropped.

The object_cropping_vertical_position field shows the vertical position of the top left corner of the cropping rectangle.

The object_cropping_width field shows the width of the cropping rectangle.

The object_cropping_height field shows the height of the cropping rectangle.

This concludes the description of the structure of composition_object. Next, a description is given to a specific example of the composition_object structure.

Figure 25:
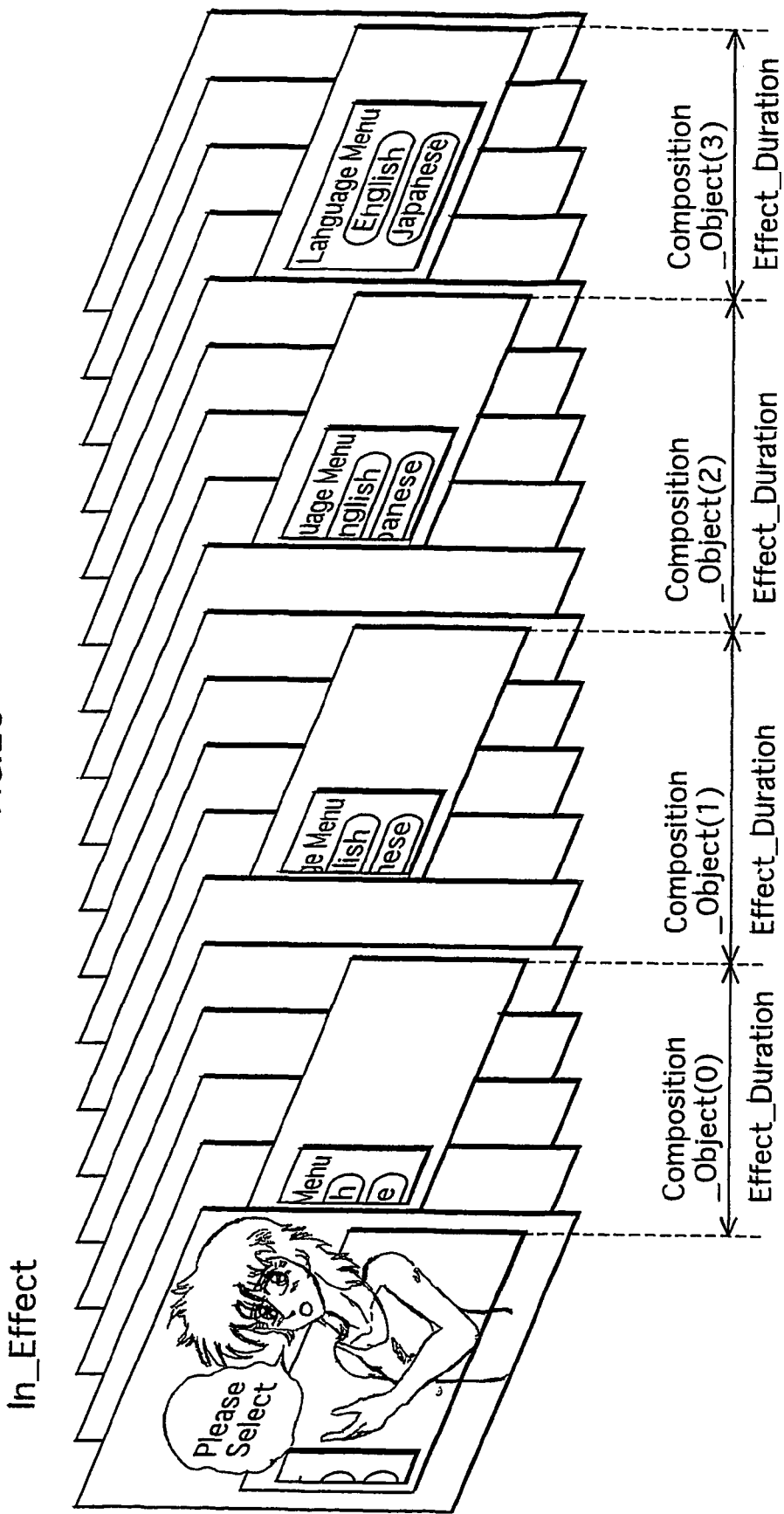
FIG. 25 is a view showing a specific example of an in-effect presenting a Right-Scroll animation effect.

FIG. 25 is a view showing a specific example of an in-effect presenting a Right-Scroll animation effect. The in-effect animation of this example presents an image such that a language selection menu gradually appears from the right edge of the screen. For this in-effect animation, composition_object(0), composition_object(1), composition_object(2), and composition_object(3) are allocated to points t0, t1, t2, and t3, respectively. Furthermore, the ICS and the effect_info structure associated with each of the DSs are defined to include the following window_info structures and composition_object structures.

Figure 26:
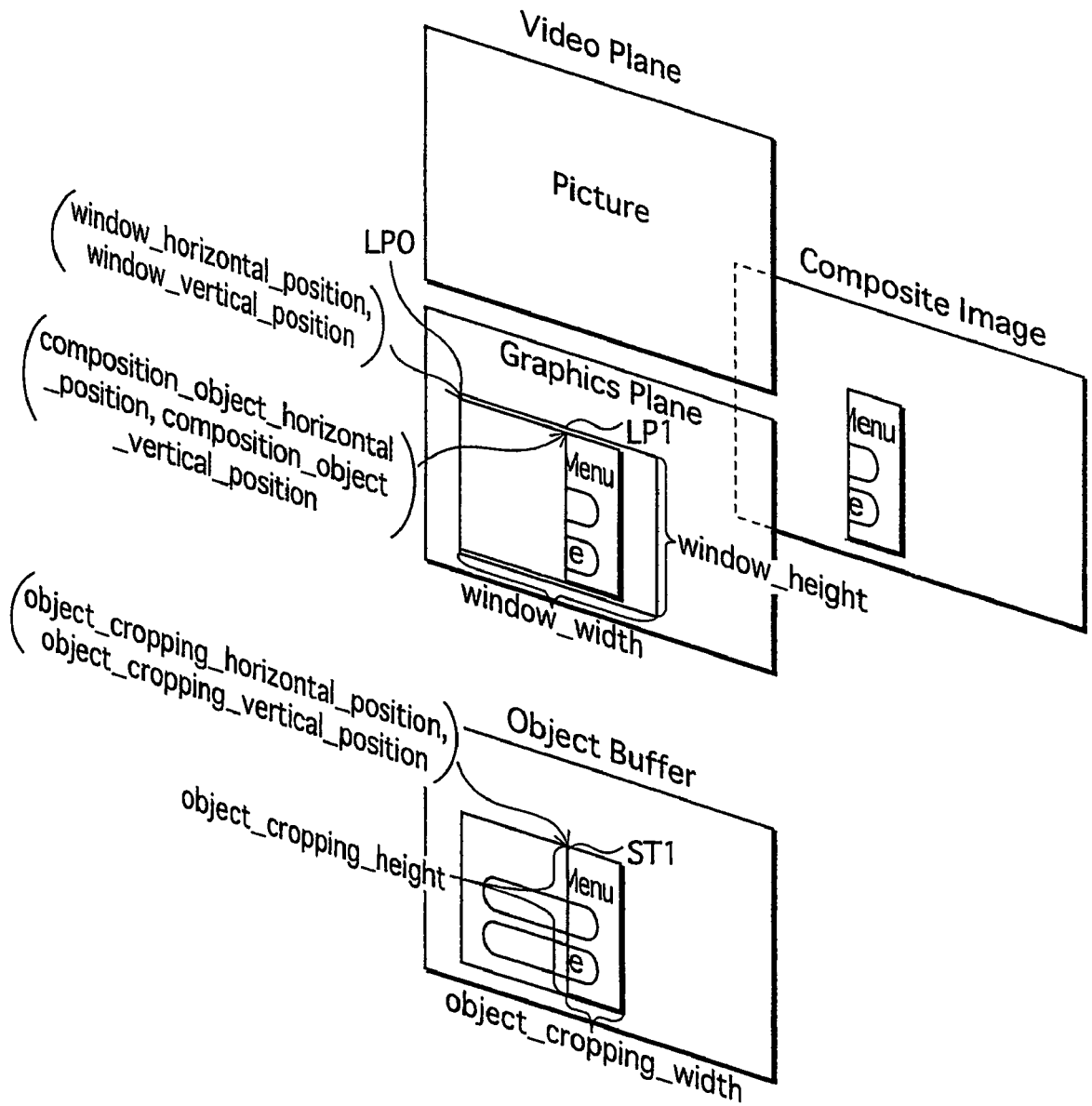
FIG. 26 is a view showing an example of the composition_objects(0) structure realizing the in-effect shown in FIG. 25.

Now, a description is given to the setting of each composition_object structure. FIGS. 26-29 each illustrate an example setting of the composition_object structure. FIG. 26 is a view showing an example of the composition_object(0) structure.

In the figure, the window_horizontal_position and window_vertical_position fields specify the coordinates of the top left pixel LP0 of a window on the graphics plane. The window_width and window_height fields specify the width and height of the window.

As shown in the figure, the object_cropping_horizontal_position and object_cropping_vertical_position fields specify a reference point ST1 used for determining a region of the graphics object to be cropped. The reference point ST1 is addressed based on the coordinate system which has an origin at the top left corner of the graphics object on the object buffer. The region having the length and width specified by the object_cropping_width and object_cropping_height fields from the reference point ST1 is determined as the cropping rectangle (solid-line box in the figure). The cropped part of the graphics object is rendered on the graphics plane at the position having the top left pixel LP0 specified by the composition_object_horizontal_position and composition_object_vertical_position fields. In this example, about ¼ of the language selection menu from the right is rendered within the window on the graphics plane. As a result, the right one-quarter of the language selection menu is presented as a composite image overlaid on the video.

Figure 27:
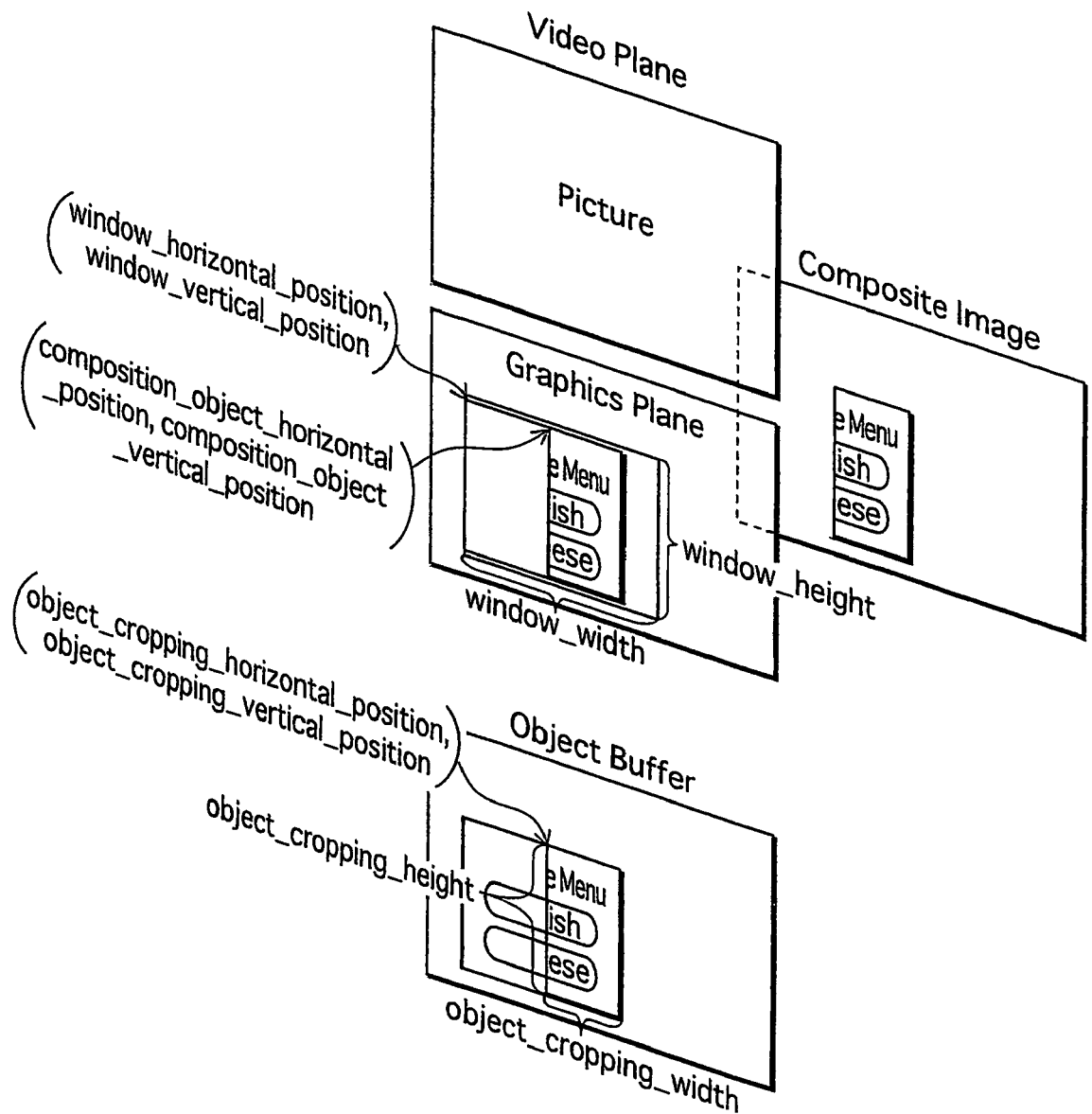
FIG. 27 is a view showing an, example of the composition_object(1) structure realizing the in-effect shown in FIG. 25.
Figure 28:
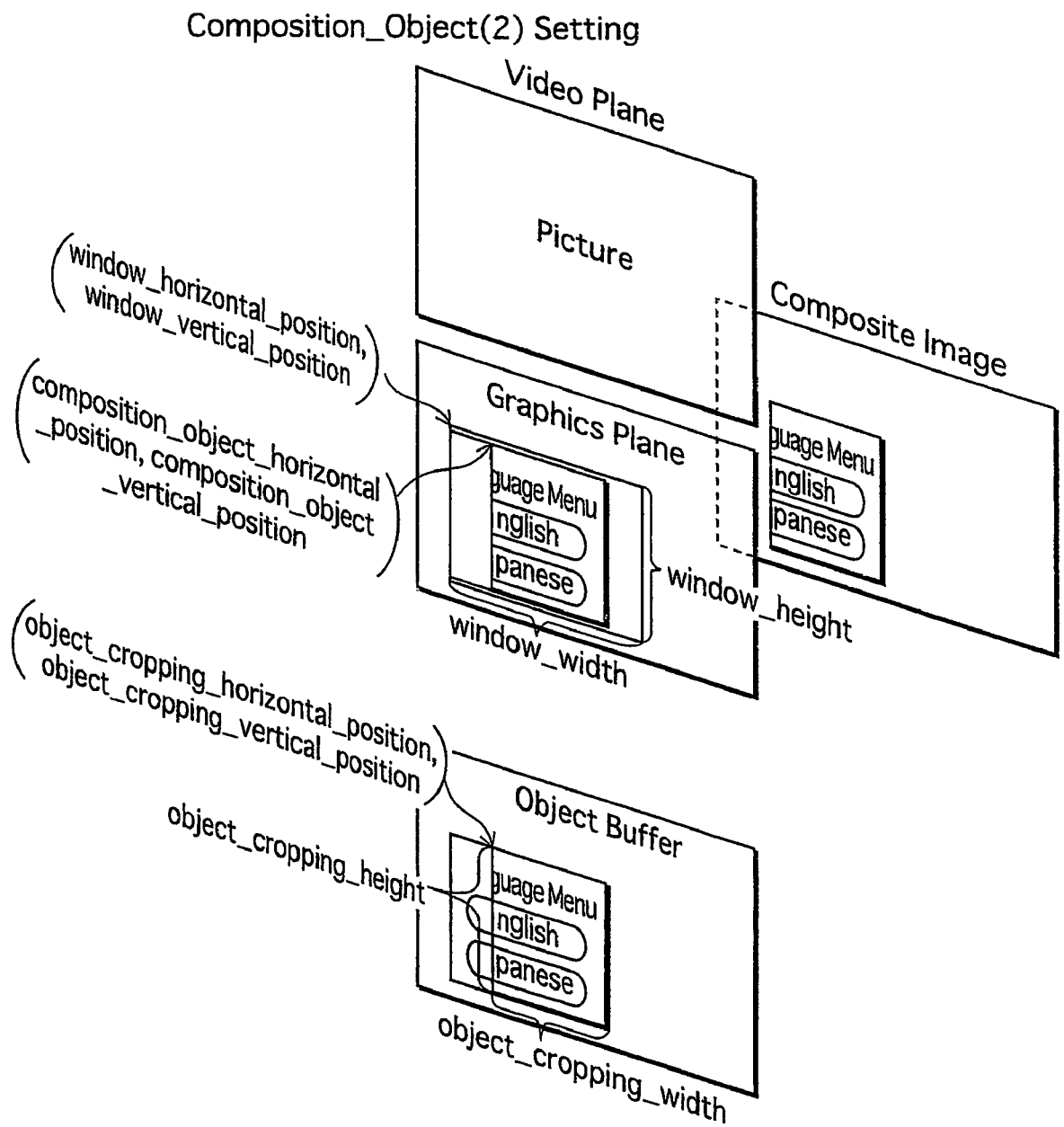
FIG. 28 is a view showing an example of the composition_object(2) structure realizing the in-effect shown in FIG. 25.
Figure 29:
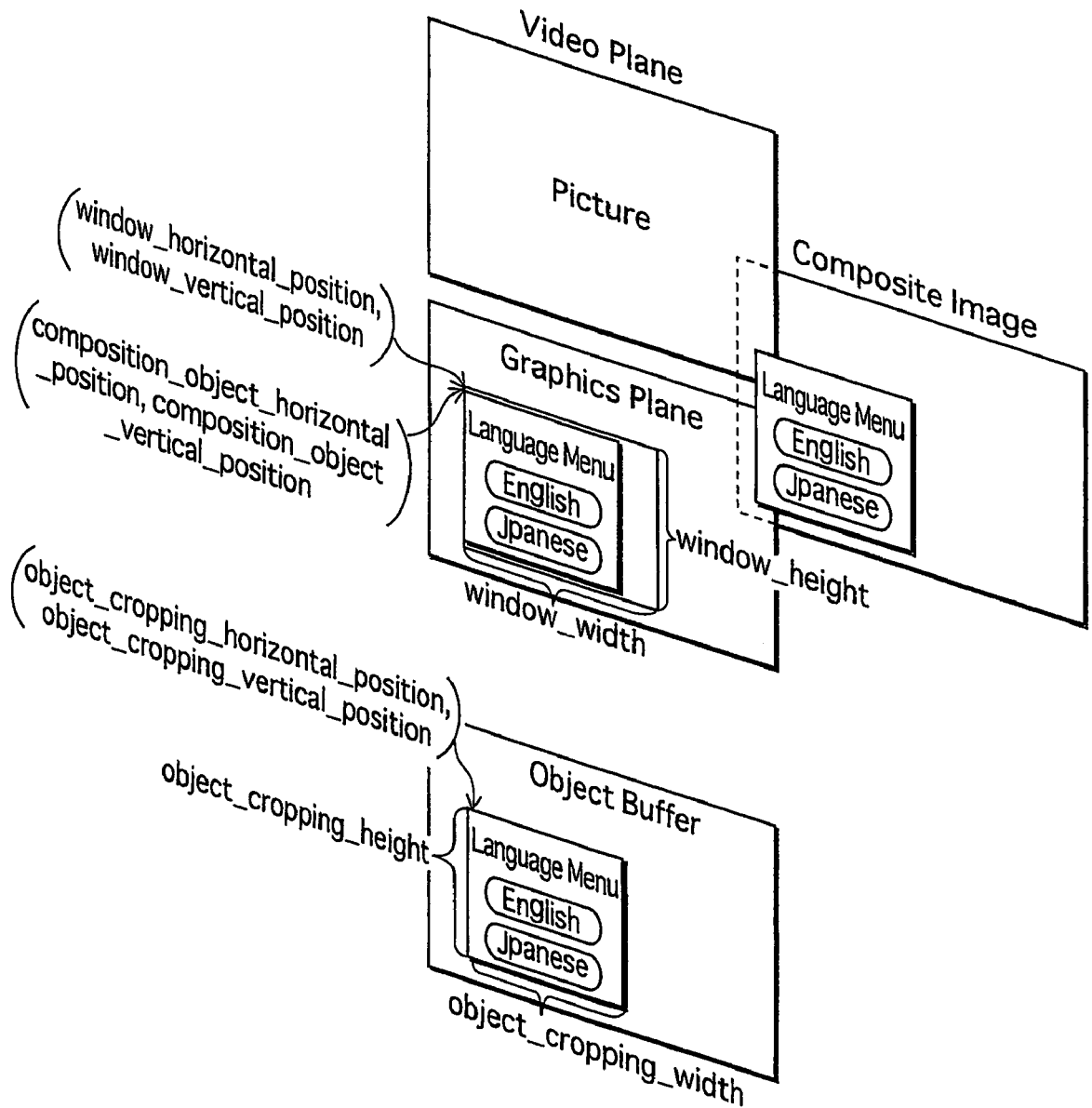
FIG. 29 is a view., showing an example of the composition_object(3) structure realizing the in-effect shown in FIG. 25.

FIGS. 27, 28, and 29 are views showing examples of the composition_object structured (1), composition_object structure (2), and composition_object structure (3), respectively. The window_info structure shown in each of the figures is identical with the one shown in FIG. 26. Thus, the description is omitted. The composition_object(1) structure shown in FIG. 27, however, differs from the one shown in FIG. 26. In FIG. 27, the object_cropping_horizontal_position and object_cropping_vertical_position fields specify the coordinates of the top left pixel of about a right half, rather than ¼, of the language selection menu stored on the object buffer. The object_cropping_height and object_cropping_width fields specify the height and width of the right half of the language selection menu. Similarly, in FIG. 28, the respective fields of the composition_object (2) structure together specify about ¾ of the language selection menu from the right. In FIG. 29, the respective fields of the composition_object(3) structure together specify the entire part of the language selection menu. By rendering the cropped part of the graphics object as shown in FIGS. 27, 28, and 29 to the graphics plane, the right half of the language selection menu, the ¾ of the language selection menu from the right, and the entire language selection menu are overlaid on the video.

As described above, according to the third embodiment of the present invention, with the composition_object structures, an animation effect is easily defined as desired. For example, it is easily defined that a graphics object stored on the object buffer is rendered so as to make a gradual appearance on screen or gradual disappearance from the screen.

Fourth Embodiment

A fourth embodiment of the present invention relates to an improvement made through optimizing the order of ODSs within a DS. As described above, the ODSs within a DS are referenced by the interactive_composition so as to present an in-effect or out-effect animation or one state of a button. The order of ODSs within a DS is determined depending on whether the ODSs are used for an in-effect animation, an out effect animation, or a button state.

Specifically, the ODSs within a DS are grouped into (1) ODSs used for presentation of an in-effect animation for Page[0], (2) ODSs used for presentation of the normal state of a button, (3) ODSs used for presentation of the selected state of a button, (4) ODSs used for presentation of the activated state of a button, (5) ODSs used for presentation of an in-effect for Page [0] and an in-effect and out-effect animations for Page[1] onward. That is to say, ODSs associated with the same presentation is put into the same group. The group of ODSs associated with the in-effect is referred to as an "in-effect group". The group of ODSs associated with each button state is referred to as a "button-state group". The groups of ODSs associated with the out-effect of Page[0], in-effects and out-effects of Page[1] onward are referred to as a "remain group".

Those groups of ODSs are arranged in the following order: in-effect group→normal-state group→selected-state group→activated-state group→remain group. In this way, the order of ODSs within a DS is determined based on the presentation targets with which the ODSs are associated.

Figure 30:
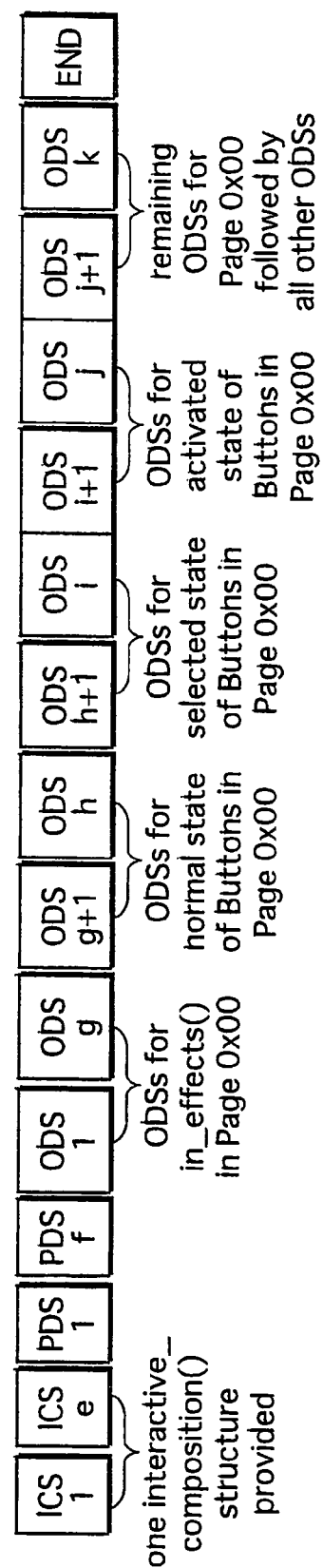
FIG. 30 is a view showing the order of ODSs within the $DS_n$.

Next, a description is given specifically to the order of ODSs within a $DS_n$. FIG. 30 is a view showing the order of ODSs within the $DS_n$.

In the figure, $ODS_1$-$ODS_g$ belong to a group of ODSs associated with the in-effect for Page[0] (in-effect group).

$ODS_{g+1}$-$ODS_h$ are a group of ODSs associated with the normal state of buttons (ODSs for Normal state).

$ODS_{h+1}$-$ODS_i$ belong to a group of ODSs associated with the selected state of the buttons (ODSs for Selected state).

$ODS_{i+1}$-$ODS_j$ belong to a group of ODSs associated with the activated state of the buttons (ODSs for Activated state).

$ODS_{j+1}$-$ODS_k$ belong to a group of ODSs associated with the out-effect of Page[0] and ODSs associated with the in-effects and out-effects of pages from Page[1] onward (remain group).

The groups of ODSs are arranged in the following order: in-effect group→normal-state group→selected-state group→activated-state group→remain group. This order is determined so that ODSs needed for the first presentation of interactive display are read first, whereas ODSs needed only after a display update are read later.

Next, a description is given to the order of ODSs when there is a multiple-reference. The term "multiple-reference" used herein means that the same object_id is referenced by two or more pieces of normal_state_info, selected_state_info, and activated_state_info within an ICS. For example, with the multiple references, a specific graphics object used to render a button in the normal state is commonly used to render another button in the selected state. In other words, the graphics object is shared, so that the number of ODSs can be reduced. Here, a problem arises as to which button-state group an ODS having the multiple-reference belongs.

Specifically, when one ODS is associated with one button in the normal state as well as another button in the selected state, it needs to be determined whether the ODS belongs to the button-state group for the normal state or the button-state group for the selected state.

In such a case, the ODS placed in the button-state group that first appears in the ICS.

For example, if an ODS is referenced by both the normal-state and selected-state groups, the ODS is placed in the normal-state group (N-ODSs) but not in the selected-state group (S-ODSs). Also, if an ODS is referenced by both the selected-state and activated-state groups, the ODS is placed in the selected-state group (S-ODSs) but not in the activated-state group (A-ODSs). In this manner, each ODS referenced by two or more different state_info structures, the ODS appears only once in the DS and placed in the first one of the button-state groups.

The same applies to the ODSs associated with animation effects. If a graphics object is commonly used in the in-effect and the out-effect for Page[0], the graphics object appears only once in the DS and placed in the in-effect group. Similarly, if a graphics object is commonly used in the in-effect for Page[0] and the in-effect or out-effect for Page[1] onward, the graphics object appears only once in the DS and placed in the in-effect group. This concludes the description of the order of ODSs where there is a multiple-reference to an ODS.

Because of possible multiple-references to ODSs as described above, the $DS_n$ may not contain all the ODS groups mentioned above. For example, the $DS_n$ may not contain the selected-state group ODSs due to a multiple-reference. Furthermore, the $DS_n$ may not contain the in-effect group ODSs. This is also because an in-effect is not essential to the presentation of interactive display.

Now, a description is given to the order of ODSs within the button-state group for the selected state (S-ODSs). Among the S-ODSs, which ODSs should be placed at the beginning depends on whether a default selected button is determined statically or dynamically. The default selected button is statically determined if the default_selected_button_id_ref field in the interactive_composition is set to a valid value other than "00". This valid value specifies the button to be selected as default. In the case where the default_selected_button_id_ref field value is valid and that ODSs associated with the specified default selected button are not present in the N-ODSs, the ODSs are placed at the beginning of S-ODSs.

On the other hand, if the default_selected_button_id_ref field is set to "00", a different button is dynamically selected as default depending on the state of playback apparatus.

The default_selected_button_id_ref field is set to the value "00" in the case, for example, where an AV Clip into which the DS is multiplexed serves as a merge point of a plurality of playback paths. In such a case, a different button needs to be selected as default depending on which playback path has been taken. Thus, it is not necessary to place specific ODSs at the beginning of S-ODSs.

Figure 31:
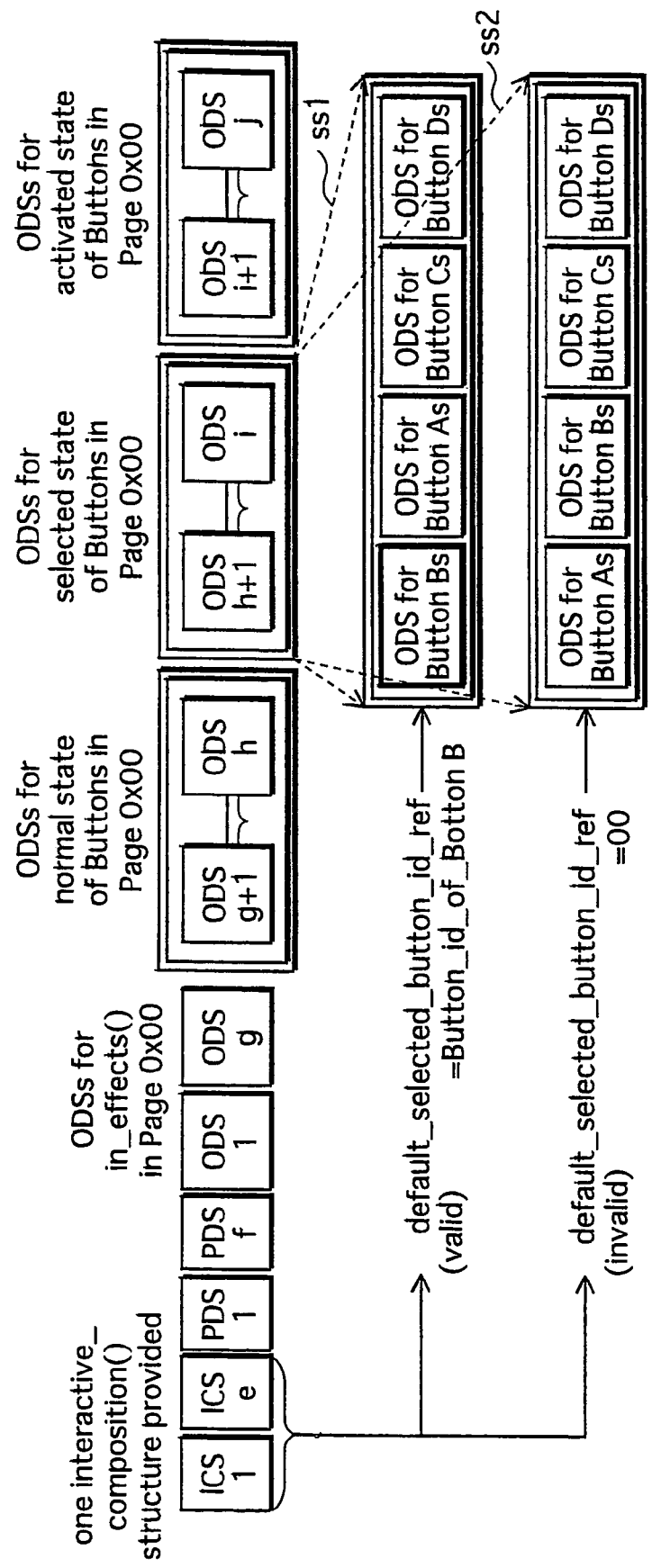
FIG. 31 is a view showing how the order of ODSs within S-ODSs differs between the cases where the default_selected_button_id_ref field is set to "00" and to the valid value specifying a button B.

FIG. 31 is a view showing how the order of ODSs within S-ODSs differs between the cases where the default_selected_button_id_ref field is set to "00" and to the valid value specifying the button B. In the figure, arrows ss1 indicate the order of ODSs within S-ODSs in the case where the default_selected_button_id_ref field specifies the button_id identifying the button B. Arrows ss2 indicate the order of ODSs within S-ODSs in the case where the default_selected_button_id_ref field is set to "00". As shown in the figure, in the case where the default_selected_button_id_ref field specifies the button B, the ODSs associated with the selected state of button B (ODSs for Button B) are placed at the beginning of the S-ODSs, followed by the ODSs associated with the other buttons (ODSs for Buttons A, C, and D). On the other hand, in the case where the default_selected_button_id_ref field is set to "00", the ODSs associated with the selected state of button A are placed at the beginning of the S-ODSs. As described above, the order of ODSs within S-ODSs differs depending on whether the default_selected_button_id_ref field value is valued or not.

According to the fourth embodiment, the ODSs within an DS are arranged in the order of appearance in the DS. Thus, the display composition containing a number of graphics elements can be smoothly presented.

Fifth Embodiment

In the first embodiment, how to allocate DSs to the time axis of AV Clip playback is described. In a fifth embodiment of the present invention, a description is given to how to set PTS and DTS values.

First of all, a description is given to a mechanism of effecting synchronous control based on the DTS and PTS within an ODS.

The DTS shows a time, with the time accuracy of 90 KHz, at which decoding of the associated ODS needs to be started. The PTS shows a deadline for completing the decoding.

The decoding of ODS can not be completed instantly, and takes a certain duration. In order to explicitly show the start and end times of decoding the ODS, the DTS and PTS show the decoding start time and decoding deadline.

The PTS value shows the deadline by which decoding of the associated ODS needs to be completed and the resulting uncompressed graphics object needs to be available on the object buffer of the playback apparatus.

The decoding start time of an arbitrary $ODS_j$ belonging to a $DS_n$ is shown by $DTS(DS_n[ODS_j])$ with the time accuracy of 90 KHz. Thus, the decoding deadline of the ODSJ is determined by a sum of the $DTS(DS_n[ODS])$ value and a maximum time which may be taken for the decoding.

Here, let SIZE ($ODS_n[ODS_j]$) denotes the size of the $ODS_j$ after decompression, and Rd denotes the decoding rate for $ODS_j$, then the maximum time taken for the decoding is ceil(SIZE($DS_n[ODS_j]$))

By converting this maximum time to the accuracy of 90 KHz and adding the result to the DTS of the $ODS_j$, the decoding deadline to be shown by the PTS is calculated with the accuracy of 90 KHz.

The PTS of the $ODS_j$ belonging to the $DS_n$ can be expressed by the following equation.

$$PTS(DS[ODS_j])=DTS(DS_n[ODS_j])+90,000\times ceil(SIZE(DS_n[ODS_j])/Rd)$$

In addition, the relation between two adjacent ODSs ($ODS_j$ and $ODS_{j+1}$) needs to satisfy the following equation.

$$PTS(DS_n[ODS_j]) \leq DTS(DS_n[ODS_{j+1}])$$

This concludes the description of the PTS and the DTS of an ODS. Next, a description is given to the PTS within an ICS. The ICS needs to be loaded to the composition buffer of the playback apparatus before the decoding start time of the first ODS within the $DS_n$ (i.e. before the time shown by $DTS(DS_n[ODS_1])$) and also before the first presentation of the $DS_n$ becomes valid (i.e. The time shown by $PTS(DS_n[PDS_1])$). Thus, the following equations need to be satisfied.

$$DTS(DS_n[ICS]) \leq DTS(DS_n[ODS_1])$$

$$DTS(DS_n[ICS]) \leq PTS(DS_n[PDS_1])$$

Next, a description is given to the PTS within the ICS of the $DS_n$. The $PTS(DS_n[ICS])$ value is set to satisfy the following equation.

$$PTS(DS_n[ICS]) \geq PTS(DSn[ICS]) + \text{DECODEDURATION} + \text{TRANSFERDURATION}$$

The DECODEDURATION shows the time taken for decoding graphics objects needed for the first presentation of the $DS_n$(ICS). The decoding start time is equal to the DTS (ICS) value at the earliest. Here, let LASTODSPTS denote the PTS associated with the graphics object of which decoding is completed at the latest among graphics objects needed for the first presentation of $DS_n$(ICS), then the DECODEDURATION is equal to $LASTODSPTS(DS_n) - DTS(DS_n[ICS])$.

The LASTODSPTS value takes on a different value depending on the default_selected_button_id_ref setting and the order of ODSs within the DS. FIGS. 32A, 32B, 33A, 33B, and 33C show different ODS orders to illustrate LASTODSPTS setting using the DTS of an ODS.

Figure 32A:
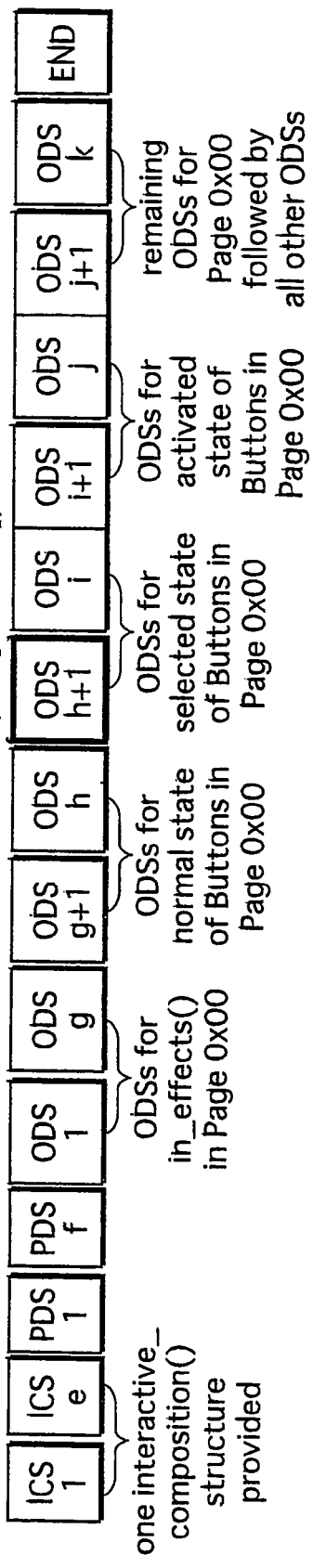
FIG. 32A is a view showing a LASTODSPTS in the case where the default selected button is statically determined.

FIG. 32A shows the case where the default selected button is statically determined, i.e. where the default_selected_button_id_ref field is set to a non-zero value. In this case, the LASTODSPTS takes on the PTS value of the first ODS within the S-ODSs (i.e. the value of $PTS(DS_n[ODS_{h+1}])$). In the figure, the $ODS_{h+1}$ is enclosed within the solid line box.

Figure 32B:
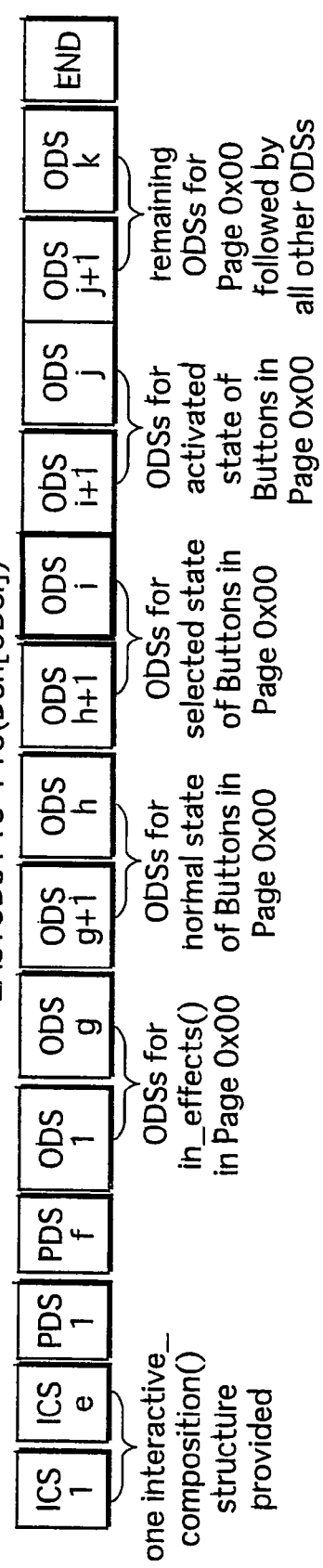
FIG. 32B is a view showing a LASTODSPTS in the case where the default selected button is dynamically determined.

FIG. 32B shows the case where the default selected button is determined dynamically, i.e. where the default_selected_button_id_ref is set to "00". In this case, the LASTODSPTS takes on the PTS value of the last ODS among the S-ODSs (i.e. the value of $PTS(DS_n[ODS_i])$). In the figure, the $ODS_i$ is enclosed within the solid line box.

FIG. 33A shows a DS that includes no ODS associated with the selected state. In this case, the LASTODSPTS takes on the PTS value of the last ODS among the N-ODSs (i.e. the value of $PTS(DS_n[ODS_h])$). In the figure, the $ODS_h$ is enclosed within the solid line box.

FIG. 33B shows a DS that includes no ODS associated with the normal state. In this case, the LASTODSPTS takes on the PTS value of the last ODS among the in-effect ODSs (i.e. the value of $PTS(DS_n[ODS_g])$). In the figure, the $ODS_g$ is enclosed within the solid line box.

FIG. 33C shows a DS that includes no ODS at all. In this case, the LASTODSPTS takes on the DTS value specified in the ICS of the $DS_n$ (i.e. the value of $DTS(DS_n[ICS])$). In the figure, the ICS is enclosed within the solid line box.

Note that the above description applies to the case where the $DS_n$ is not an Epoch Start DS. If the $DS_n$ is an Epoch Start DS, a different description is applied.

In the case of an Epoch Start DS, the graphics plane may be cleared entirely. The time taken for clearing the graphics plane may be longer than the time calculated by LASTODSPTS $(DS_n) - DTS(DS_n[ICS])$. According to a target decoder model for the BD-ROM, the graphics decoding and the graphics plane clearing are performed by different processing units (the graphics processor performs the decoding). Thus, the graphics decoding and the plane clearing are performed in parallel. Even if the decoding is completed for graphics data necessary for presentation of the first display composition, the graphics date can not be rendered to the graphics plane unless the plane has been cleared. Thus, the DECODEDURATION needs to set to the value equal to the plane clear duration. Suppose the graphics plane has the width and height equal to the video_width and video_height field values, respectively. Furthermore, the transfer rate between the object buffer and the graphics plane is 128 Mbps. In order to clear the entire graphics plane, the playback apparatus is required to overwrite the graphics plane having the size of 8×video_width×video_height at the transfer rate of 128 Mbps. Expressing the duration taken for this overwriting in 90 KHz, the time taken for clearing the graphics plane (referred to as "PLANECLEARTIME") is calculated in the following equation.

$$\text{PLANECLEARTIME} = \text{ceil}((90000 \times 8 \times DS_n[ICS].\text{video\_width} \times DS_n[ICS].\text{video\_height})/128{,}000{,}000)$$

FIG. 34A shows an algorithm for obtaining the DECODEDURATION value from the value calculated by $LASTODSPTS(DS_n) - DTS(DS_n[ICS])$ and the value of PLANECLERATIME. In the algorithm, the larger one of the $LASTODSPTS(DS_n) - DTS(DS_n[ICS])$ value and the PLANECLERATIME value is determined as the DECODEDURATION value.

As shown in the figure, if the composition_state field of the $DS_n$(ICS) indicates that the $DS_n$ is not an epoch start DS (if($DS_n$(ICS) . composition_state==EPOCH_START) else), the value of $LASTODSPTS(DS_n) - DTS(DS_n[ICS])$ is determined as the DECODEDURATION value (return ($LASTODSPTS(DS_n) - DTS(DS_n[ICS])$)). On the other hand, if the composition_state field of the $DS_n$ (ICS) indicates that the $DS_n$ is an epoch start DS (if($DS_n$(ICS). composition_state==EPOCH START)), the larger one of the $LASTODSPTS(DS_n) - DTS(DS_n[ICS])$ value and the PLANECLERATIME value is determined as the DECODEDURATION value (return(max($LASTODSPTS(DS_n) - DTS(DS_n[ICS])$))).

Figure 34B:
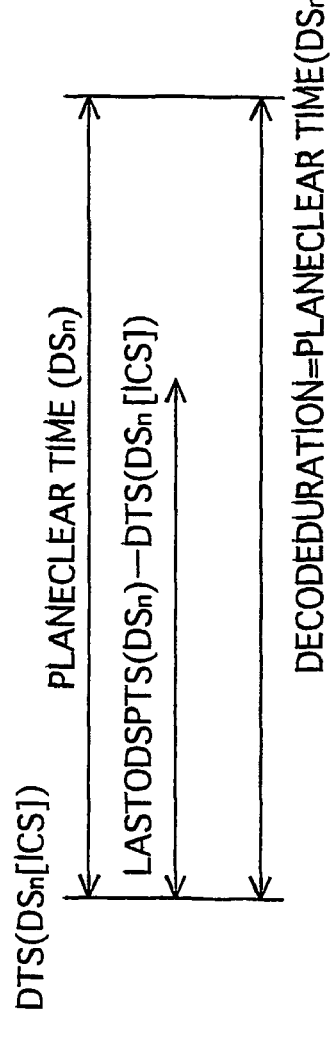
FIGS. 34B and 34C are views showing examples of how to calculate the DECODEDURATION value.
Figure 34C:
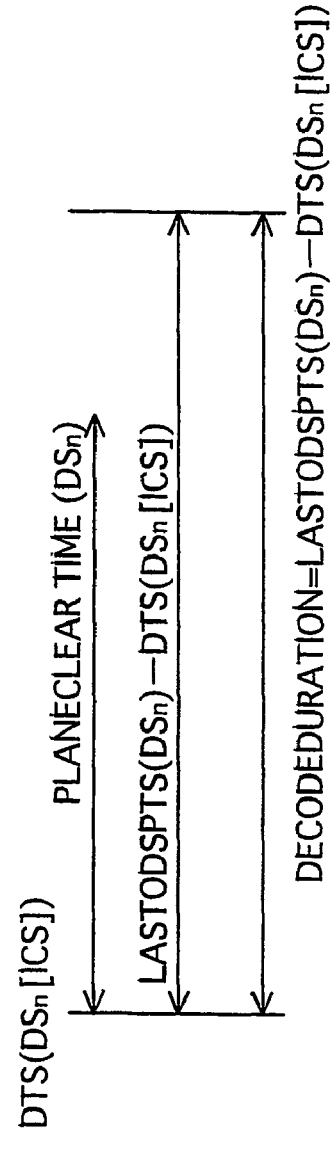

FIGS. 34B and 34C are views showing examples of DECODEDURATION setting depending on whether or not the PLANECLEARTIME value is larger than the $LASTODSPTS(DS_n) - DTS(DS_n[ICS])$ value. If the PLANECLEARTIME value is larger than the $LASTODSPTS(DS_n) - DTS(DS_n[ICS])$ value, the PLANECLEARTIME is determined as the DECODEDURATION value, as shown in FIG. 34B. On the other hand, if the PLANECLEARTIME value is smaller than the $LASTODSPTS(DS_n) - DTS(DS_n[ICS])$ value, the $LASTODSPTS(DS_n) - DTS(DS_n[ICS])$ value is determined as the DECODEDURATION value, as shown in FIG. 34C.

The TRANSFERDURATION shows the time taken for transferring graphics data needed for presentation of the first display composition from the object buffer to the graphics plane. The first display composition within a DS differs depending on whether an in-effect is provided for the DS and whether the default selected button is determined statically or dynamically. Thus, the TRANSFERDURATION also differs depending on the first display composition. If the first display composition is associated with an in-effect, the time taken for transferring the uncompressed graphics needed for the presentation of the in-effect is determined as the TRANSFERDURATION.

Here, the in-effect defined by the $DS_n[ICS]$ is for introducing Page[0] and rendered in windows of the number that is indicated by the number_of_window field value. Thus, the total size of graphics data needed for the first display composition of the in-effect is equal to the total size of the windows (0) through (number_of_windows−1). Thus, to calculate the time taken for transferring graphics data needed for presentation of the first display composition within the in-effect sequence (EFFECTTD), the total window size is divided by the transfer rate of the playback apparatus (128 Mbps). To express the result in the time accuracy of the PTS (90 KHz), the result is further multiplexed by 90 KHz. The equation for calculating the EFFECTTD ($DS_n$) is shown in FIG. 35A.

On the other hand, if the $DS_n$ is not provided with any in-effect, the first display composition for presentation of the $DS_n[ICS]$ is Page[0] of the Multi-Page menu. If the default selected button is statically specified, Page[0] of the Multi-Page menu is presented as soon as uncompressed data needed for the selected state of the default selected button and the normal state of the other buttons is transferred from the object buffer to the graphics plane.

Here, Page[0] of the Multi-Page menu associated with the $DS_n(ICS)$ includes the buttons of the number indicated by the number_of_button field value. Thus, the data size needed for presentation of the first display composition is calculated as follows. First, the total size is calculated for the graphics data associated with the normal state of all the buttons on the page, which are specified by $DS_n(ICS).Page[0].Buttons$ from (0) through (number_of_Button−1). Then, to the thus calculated total size, the size of graphics data associated with the selected state of the default selected button of Page [0] (SBSIZE ($DS_n$, $DS_n[ICS].PAGE[0].default\_selected\_button\_id\_ref$)) is added. Further, from the resulting value, the size of graphics data associated with the normal state of the default selected button (NBSIZE($DS_n$,$DS_n[ICS].PAGE[0].default\_selected\_button\_id\_ref$)) is subtracted to obtain the data size needed for presentation of the first display composition.

The thus calculated data size needed for presentation of the first display composition is divided by the transfer rate of the playback apparatus (128 Mbps), and multiplied by 90 KHz for expressing the result in the time accuracy of PTS (90 KHz). Then, the transfer duration taken for presentation of the first page is calculated. FIG. 35B shows the equation for calculating the PAGDEFAULTTD($DS_n$) in the case where no in-effect is provided and the default selected button is statically determined.

In the case where the default selected button is dynamically determined, the equation shown in FIG. 35B is not applicable because it is not known which of the buttons on Page[0] is selected as default. Thus, the TRANSFERDURATION needs to be calculated for the worst case. The worst case is where the button with the largest size is selected as default among the buttons defined by the $DS_n(ICS).Page[0]$. Among the buttons of $DS_n(ICS).Page[0]$, the button with the largest size is denoted as LRG{button: button ∈ $DS_n[ICS].PAGE[0]$.Button}.

Then, the data size needed to be transfer in the above-mentioned worst case (the maximum data size) is calculated as follows. First, the total size of all the buttons on Page[0] (Page[0].Buttons from (0) through (number_of_Button−1)) is calculated. To the thus calculated total size, the size of the button LRG (BSIZE ($DS_n$, LRG{button: button ∈ $DS_n[ICS]$.PAGE[0].Button})) is added. Further, from the resulting value, the size of graphics data associated with the normal state of the button LRG (NBSIZE ($DS_n$, LRG{button: button ∈ $DS_n[ICS].PAGE[0].Button$})) is subtracted to obtain the maximum data size.

The maximum data size calculated in the above manner is divided by the transfer rate of the playback apparatus (128 Mbps), and further multiplied by 90 KHz for expressing the result in the time accuracy of PTS (90 KHz). Then, the transfer duration taken for presentation of the-first page of the Multi-Page menu is calculated. FIG. 35C shows the equation for calculating the PAGENODEFAULTTD ($DS_n$) in the case where no in-effect is provided and the default selected button is dynamically determined.

FIG. 36 is a view showing an algorithm for selectively determining one of the EFFECTTD, PAGEDEFAULTTD, and PAGENODEFAULTTD as the TRANSFERDURATION. As shown in the figure, if at least one in-effect is provided (if($DS_n[ICS].PAGE[0].IN\_EFFECTS.number\_of\_effects$ ! =0)), the EFFECTTD is determined as TRANSFERDURATION (return EFFECTTD($DS_n$)). If no in-effect is provided for introducing Page[0] and no default selected button is statically specified ($DS_n[ICS].PAGE[0].default\_selected\_button\_id\_ref$==0xFFFF), the PAGEDEFAULTTD is determined as the TRANSFERDURATION (return PAGENODEFAULTTD ($DS_n$)). If no in-effect is provided for introducing Page [0] and the default selected button is statically determined, the PAGEDEFAULTTD is determined as the TRANSFERDURATION (return PAGEDEFAULTTD (DSn)).

As described above, according to the fifth embodiment of the present invention, the DTS and PTS values of an ICS are optimally determined in accordance with the data size of ODSs. Thus, the interactive control is smoothly performed without delay.

Sixth Embodiment

Figure 37:
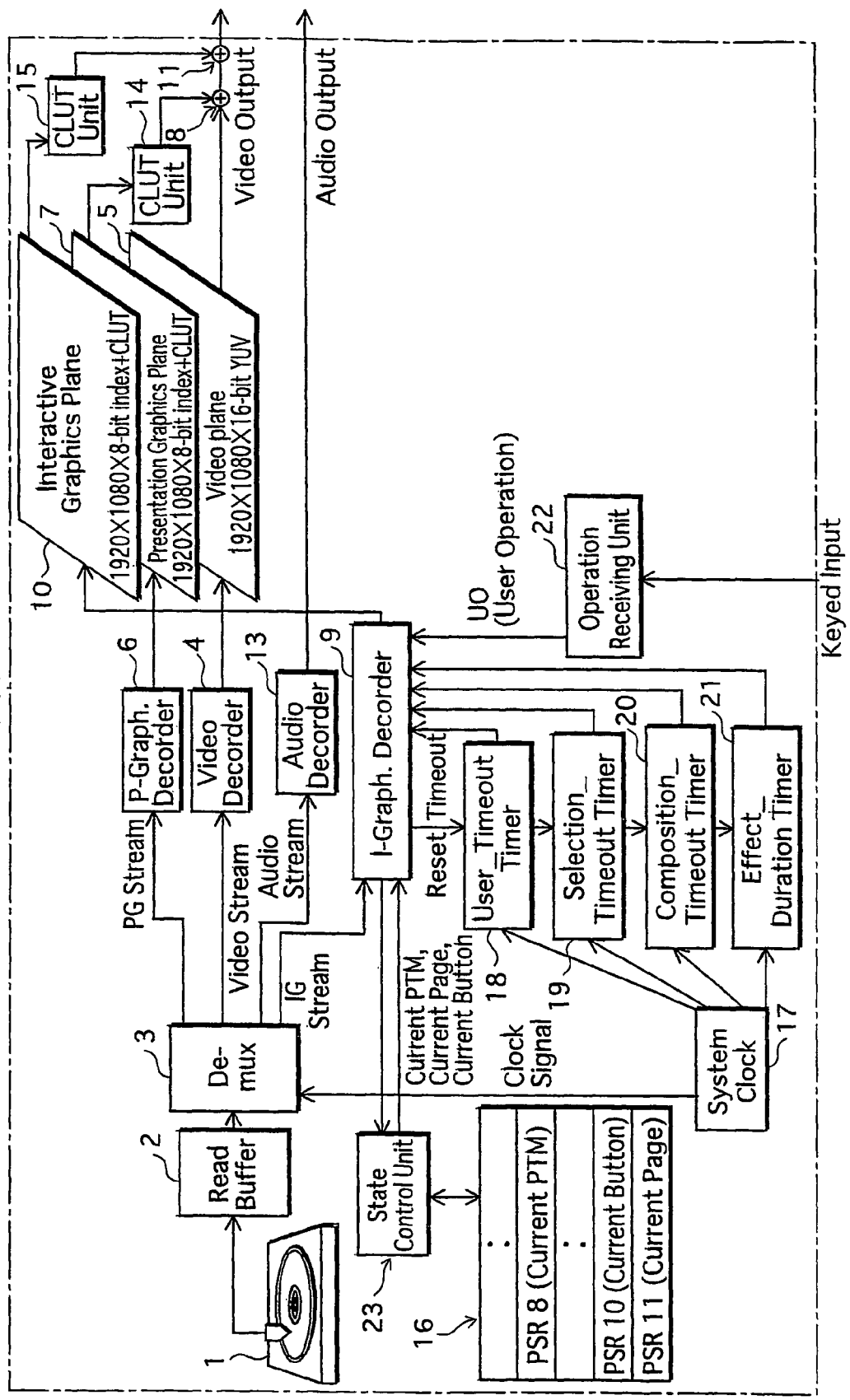
FIG. 37 is a view showing the internal structure of a playback apparatus according to the present invention.

A sixth embodiment of the present invention relates to the playback apparatus used for playback of the BD-ROMs described in the first to fifth embodiments. FIG. 37 is a view showing the internal structure of the playback apparatus. The playback apparatus according to the sixth embodiment is industrially manufactured based on the internal structure shown in FIG. 37. The playback apparatus is mainly composed up of two parts that are a system LSI and a drive device. The playback apparatus can be industrially manufactured by mounting these parts on a cabinet and substrate of the apparatus. The system LSI is an integrated circuit including various processing units for achieving the functions of the playback apparatus.

The playback apparatus manufactured in the above manner is composed of a BD drive 1, a read buffer 2, a demultiplexer (De-MUX) 3, a video decoder 4, a video plane 5, P-Graphics decoder 6, a presentation plane 7, an adder 8, an I-Graphics decoder 9, an interactive graphics plane 10, an adder 11, an audio decoder 13, CLUT (Color Lookup Table) units 14 and 15, a PRS set 16, a system clock 17, a user_timeout timer 18, a selection_timeout timer 19, a composition_timeout timer 20, an effect_duration timer 21, an operation receiving unit 22, and a state control unit 23.

The BD drive 1 performs loading, reading, and ejecting of the BD-ROM. The BD drive 1 makes access to the BD-ROM 100.

The read buffer is a FIFO (first-in first-out) memory. Accordingly, TS packets read from the BD-ROM are removed from the read buffer 2 in the same order as they arrive.

The De-MUX 3 reads TS packets from the read buffer 2 and converts them to PES packets. Among the resulting PES packets, PES packets having a predetermined stream PID are outputted to one of the video decoder 4, the audio decoder 13, the P-Graphics decoder 6, and the I-Graphics decoder 9.

The video decoder 4 decrypts PES packets received from the De-MUX 3, and rendered the resulting uncompressed picture data to the video plane 5.

The video plane 5 is a plane memory for storing uncompressed picture data. The term "plane" refers to a memory area of a playback apparatus for storing one screen of pixel data. With provision of multiple planes, the playback apparatus can add the stored data on each plane pixel by pixel to produce one video output, whereby a plurality of graphics images are overlaid as one composite image. The resolution of the video plane 5 is 1920×1080. Picture data is stored on the video plane 5 as 16-bit pixel data expressed in YUV values.

The P-Graphics decoder 6 decodes a graphics stream read from the BD-ROM or HD, and renders the resulting uncompressed graphics to the presentation graphics plane 7. As the graphics stream is decoded and rendered, subtitles appear on screen.

The presentation graphics plane 7 is a memory having an area for storing one screen of uncompressed graphics. The resolution of this plane is 1920×1080, and uncompressed graphics are stored on the presentation graphics plane 7 as 8-bit-pixel data expressed in index color. By converting the index color using the CLUT (Color Lookup Table), the uncompressed graphics stored on the presentation graphics plane 7 are presented.

The adder 8 overlays the uncompressed picture data (i) with the contents stored on the presentation graphics plane 7.

The I-Graphics decoder 9 decodes an IG stream read from the BD-ROM or HD, and renders the resulting uncompressed graphics to the interactive graphics plane 10.

To the interactive graphics plane 10, uncompressed graphics data decoded by the I-Graphics decoder 9 is rendered.

The adder 11 overlays the data on the interactive graphics plane 10 with the output of the adder 8 (i.e. with the interim video data maid by overlaying uncompressed picture data and the contents stored on the presentation graphics plane 7) to make the final video output.

The audio decoder 13 decodes PES packets received from the De-MUX 3 to output uncompressed audio data.

The CLUT unit 14 converts index colors of the uncompressed graphics stored on the presentation graphics plane 7 to Y, Cr, and Cb values.

The CLUT unit 15 converts index colors of the uncompressed graphics stored on the interactive graphics plane 10 to Y, Cr, and Cb values.

The PSR set 16 is a set of registers provided within the playback apparatus. The set of registers include 64 player status registers (PSRs) and 4,096 general purpose registers (GPRs). The 64 player status registers represent the current status of the playback apparatus. Specifically, the PSRs 5-8 represent the current playback point. The PRS 8 takes on a value ranging from 0 to 0xFFFFFFFF representing the current playback point (current PTM: Presentation Time) in 45 KHz. The PSR 11 represents the page_id of the currently active page (current page). The PSR 10 represents the button in the selected state (current button) on the current page.

The system clock 17 generates clock signals. The De-MUX 3 performs the conversion of PES packet in synchronism with the clock signals.

The user_timeout timer 18 is set to the value of user_time_out_duration field at the time specified by the PTS(DS$_n$ [ICS]). When the user_time_out_duration field value is set, the timer 18 starts to count down toward zero in system clock ticks. The timer 18 is reset back to the user_time_out_duration field value each time a user operation is received. If no user operation is received before the timer 18 reaches zero, the timer 18 times out.

The selection timeout timer 19 is set to the value of selection_time_out_pts field at the time specified by the PTS(DS$_n$ [ICS]). When the selection_time_out_pts field value is set, the timer 19 starts to count down toward zero in system clock ticks. The timer 19 is reset back to the selection_time_out_pts field value each time a user operation is received. If no user operation is received before the timer 19 reaches zero, the timer 19 times out. When the timer 19 times out, it is known that the valid interaction period shown in FIG. 9 has ended.

The composition_timeout timer 20 is set to the value of composition_time_out_pts field at the time specified by the DTS(DS$_n$[ICS]). When the composition_time_out_pts field value is set, the timer 20 starts to count down toward zero in system clock ticks. The timer 20 is not reset even if a user operation is received. When the timer 20 reaches to zero, i.e. the timer 20 times out, it is known that the Epoch END has been reached.

The effect_duration timer 21 is set to the value of effect_duration field at the time specified by the DTS(DS$_n$[ICS]) if the DS$_n$ is an Epoch Start DS. When the effect_duration field value is set, the timer 21 starts to count down toward zero in system clock ticks. The timer 21 is not reset even if a user operation is received. When the timer 21 reaches zero, i.e. the timer 21 times out, it is known a next display composition of the animation effect needs to be displayed.

The operation receiving unit 22 receives a user operation made on the remote controller or the front panel of the playback apparatus, and outputs information representing the received user operation (the information is hereinafter referred to as "UO") to the I-Graphics decoder 9.

The state control unit 23 sets desired values to the PSRs according to the instructions from the I-Graphics decoder 9. Such instructions may be given by way of (i) direct addressing or (ii) indirect addressing. In the case of direct addressing, the I-Graphics decoder 9 outputs an immediate value to be set to an appropriate register of the PSR set 16. In the case of indirect addressing, the I-Graphics decoder 9 outputs a notification of a change in the playback apparatus status or in the user preferences. On receiving such a notification, the status controller 23 determines the value to be set to reflect the change, and sets the thus determined value to an appropriate register of the PSR set 16. The status controller 23 determines the value by performing a "procedure when playback condition is changed" or "procedure when change is requested". Hereinafter, a description is given to the procedures performed for setting the PSR 11 (current page) and the PSR 10 (current button).

Figure 38A:
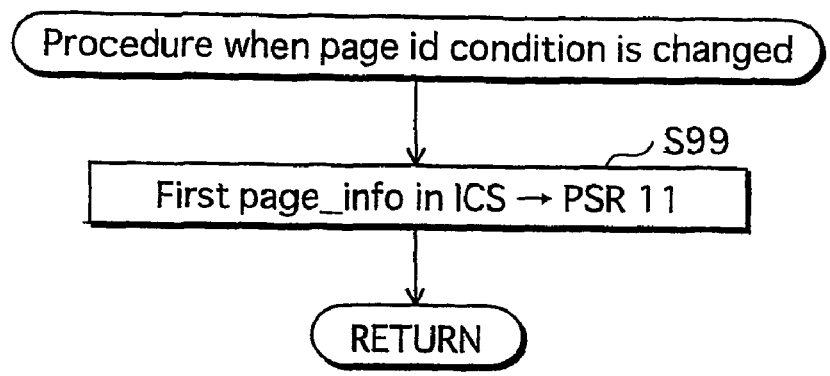
FIG. 38A is a flowchart of "procedure when playback condition is changed", preformed with respect to a PSR 11.

FIG. 38A is a flowchart of the "procedure when playback condition is changed", preformed with respect to the PSR 11. This procedure is performed to set the first page_info structure within an ICS to the PSR 11 (step S99).

Figure 38B:
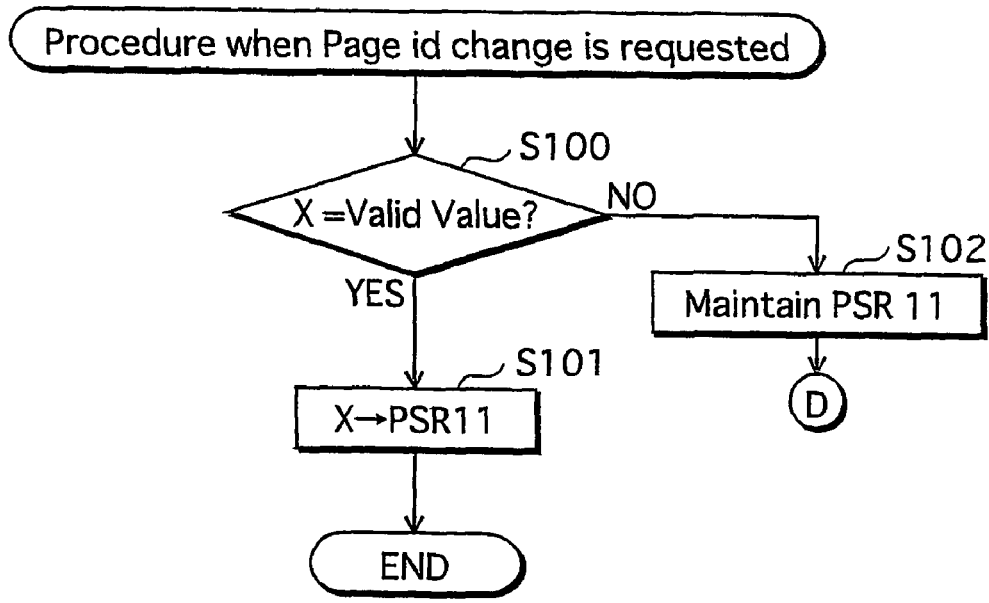
FIG. 38B is a flowchart of "procedure when change is requested", preformed with respect to the PSR 11.

FIG. 38B is a flowchart of the "procedure when change is requested", preformed with respect to the PSR 11. Suppose that a user operation is received and a page having the page number X is requested to be presented. In response to the user operation, the status controller 23 judges whether X is a valid value (step S100). If X is a valid value, the PSR 11 is set to the value of X (step S101). If X is invalid, the PSR 11 remains unchanged (step S102).

The value of PSR 11 changes as described above. Turning now to the PSR 10, a description is given to the "procedure when playback condition is changed" and to the "procedure when change is requested".

Figure 39A:
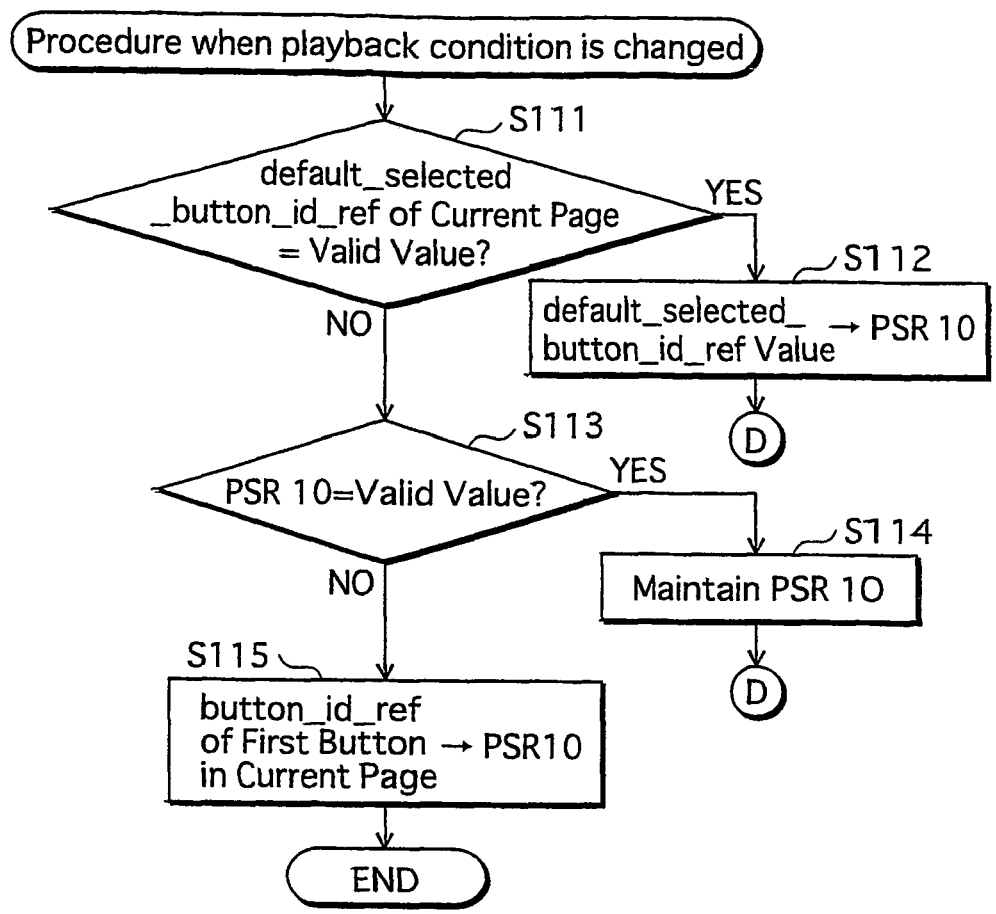
FIG. 39A is a flowchart of "procedure when playback condition is changed", performed with respect to a PSR 10.

FIG. 39A is a flowchart of the "procedure when playback condition is changed", performed with respect to the PSR 10.

First, the status controller 23 judges whether the default_selected_button_id_ref field value associated with the current page is valid (step S111). If the judgment in the step S111 results in YES, the default selected_button_id_ref field value is set to the PSR 10 (step S112)

If the default_selected_button_id_ref field value is invalid, it is then judged whether the PSR 10 holds a valid value (step S113). If the PSR 10 is valid, the PSR 10 remains unchanged so that the currently held value is maintained (step S114). On the other hand, if the PSR 10 is invalid, the PSR 10 is set to the button_id_ref field value identifying the first button_info structure of the current page (step S115).

Figure 39B:
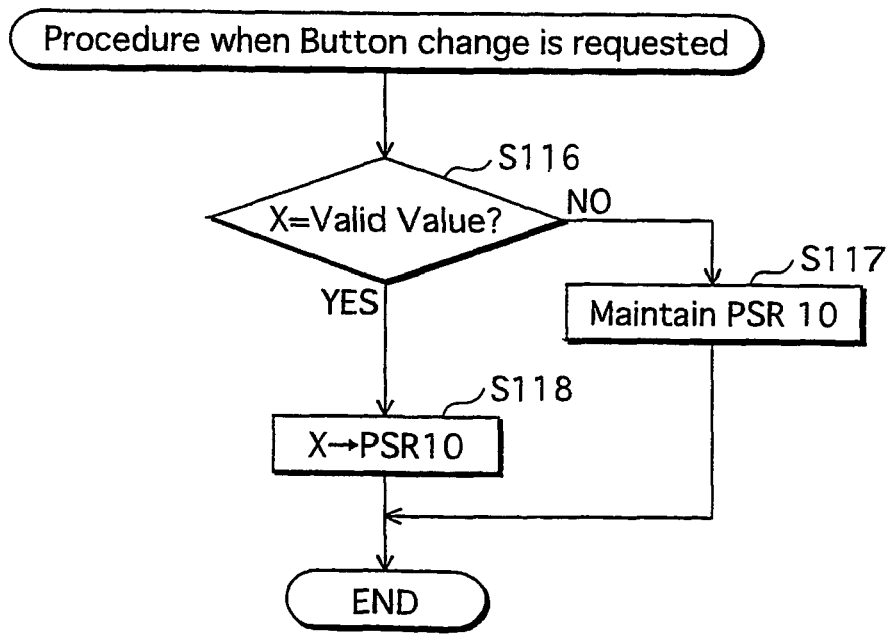
FIG. 39B is a flowchart of "procedure when change is requested", performed with respect to the PSR 10.

FIG. 39B is a flowchart of the "procedure when change is requested", performed with respect to the PSR 10. Suppose that a user operation is made and a button having the button number X is requested to be selected. In response to the user operation, the status controller 23 judges whether X is a valid button_id field value (step S116). If X is a valid value, the PSR 10 is set to the value of X (step S118). If X is an invalid value, the PSR 10 remains unchanged and thus the currently held value is maintained (step S117). With the above-described procedures, the PSRs 10 and 11 are ensured to hold current values at all times. This concludes the description about the internal structure of playback apparatus.

<Internal Structure of I-Graphics Decoder 9>

Figure 40:
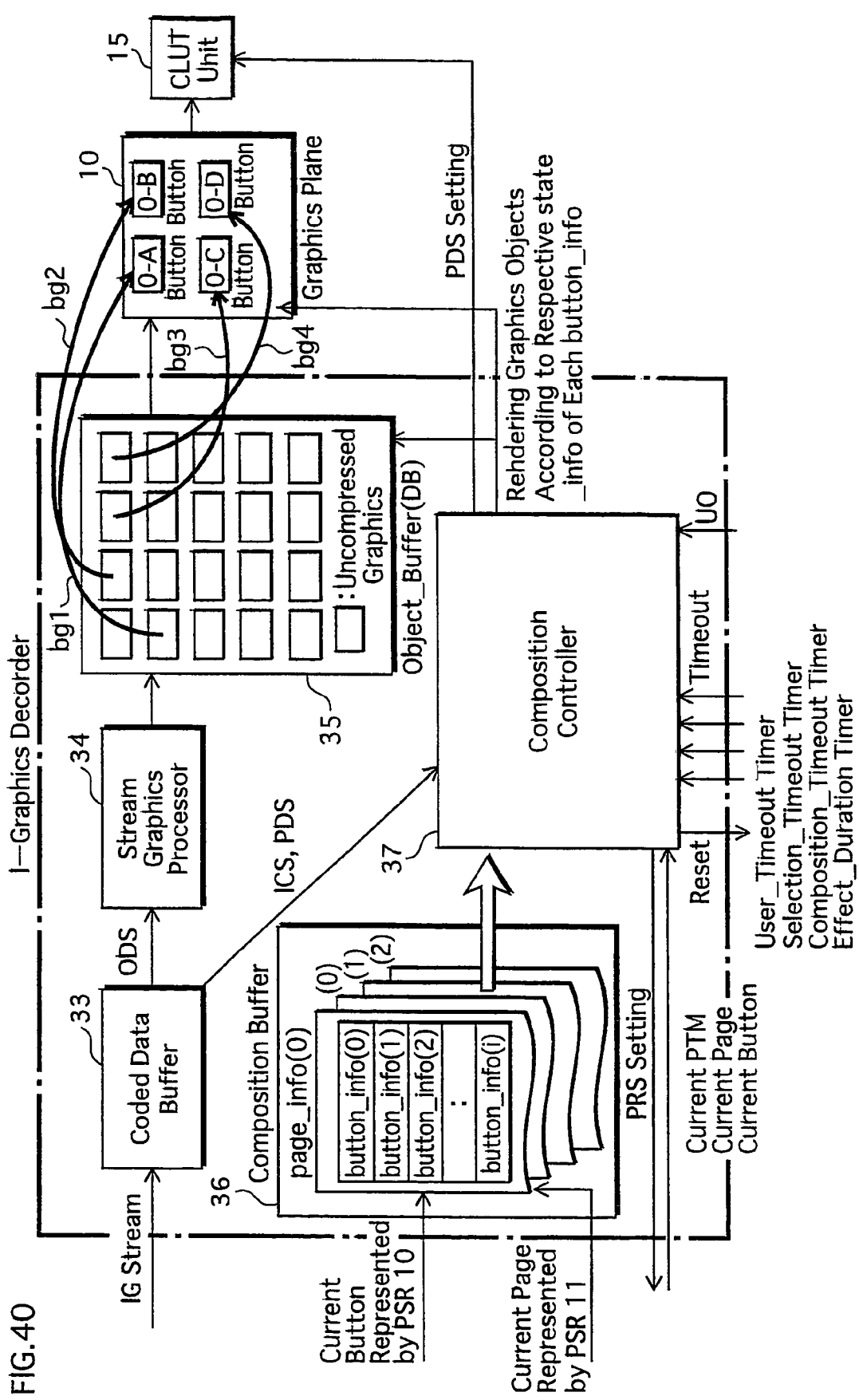
FIG. 40 is a view illustrating the internal structure of an I-Graphics decoder 9.

Next, a description is given to the internal structure of I-Graphics decoder 9, with reference to FIG. 40. As shown in the figure, the I-Graphics decoder is composed of a coded data buffer 33, a stream graphics processor 34, an object buffer 35, a composition buffer 36, and a graphics controller 37.

The coded data buffer 33 is a buffer for temporally storing an ICS, a PDS, and an ODS along with their DTS and PTS.

The stream graphics processor 34 decodes an ODS and outputs the resulting uncompressed graphics objects to the object buffer 35.

The object buffer 35 is a buffer for storing a plurality of uncompressed graphics objects (represented by the boxes in the figure), which are decoded by the stream graphics processor 34.

The composition buffer 36 is a memory for storing an ICS. The composition buffer 36 supplies to the graphics controller 37, the page_info structures provided within the ICS and the button_info structures provided within each page_info structure.

The graphics controller 37 decodes an ICS stored in the composition buffer 37 and assembles a display composition based on the decoded ICS. That is, the graphics controller 37 reads graphics-objects from the object buffer 15 with reference to the page_info structure identified by the value of PSR 11 (current page_info structure), and renders the read graphics objects to the interactive graphics plane 10. The graphics objects read herein are a sequence of graphics objects specified by the normal_start_object_id_ref field value through the normal_end_object_id_ref field value of each button_info structure associated with the current page. With respect to the button_info structure specified by the PSR 10, a sequence of graphics objects specified by the selected_start_object_id_ref field value through the selected_end_object_id_ref field value is read from the object buffer 15. In FIG. 40, arrows bg1, bg2, bg3, and bg4 schematically represent the rendering of graphics objects performed by the graphics controller 37. As a result of the rendering, a page including the buttons O-A, O-B, O-C, and O-D is stored on the interactive graphics plane 10 and overlaid with the video.

This concludes the rough description of procedures to be performed by the graphics controller 37. Furthermore, the graphics controller 37 updates the display composition in response to the changes in the value of PSR 10 or PSR 11, the timeout of the timers 18-21, or a user operation received by the composition timeout timer 20. The procedures performed by the graphics controller 37 are shown in FIGS. 41-47 in detail.

Figure 41:
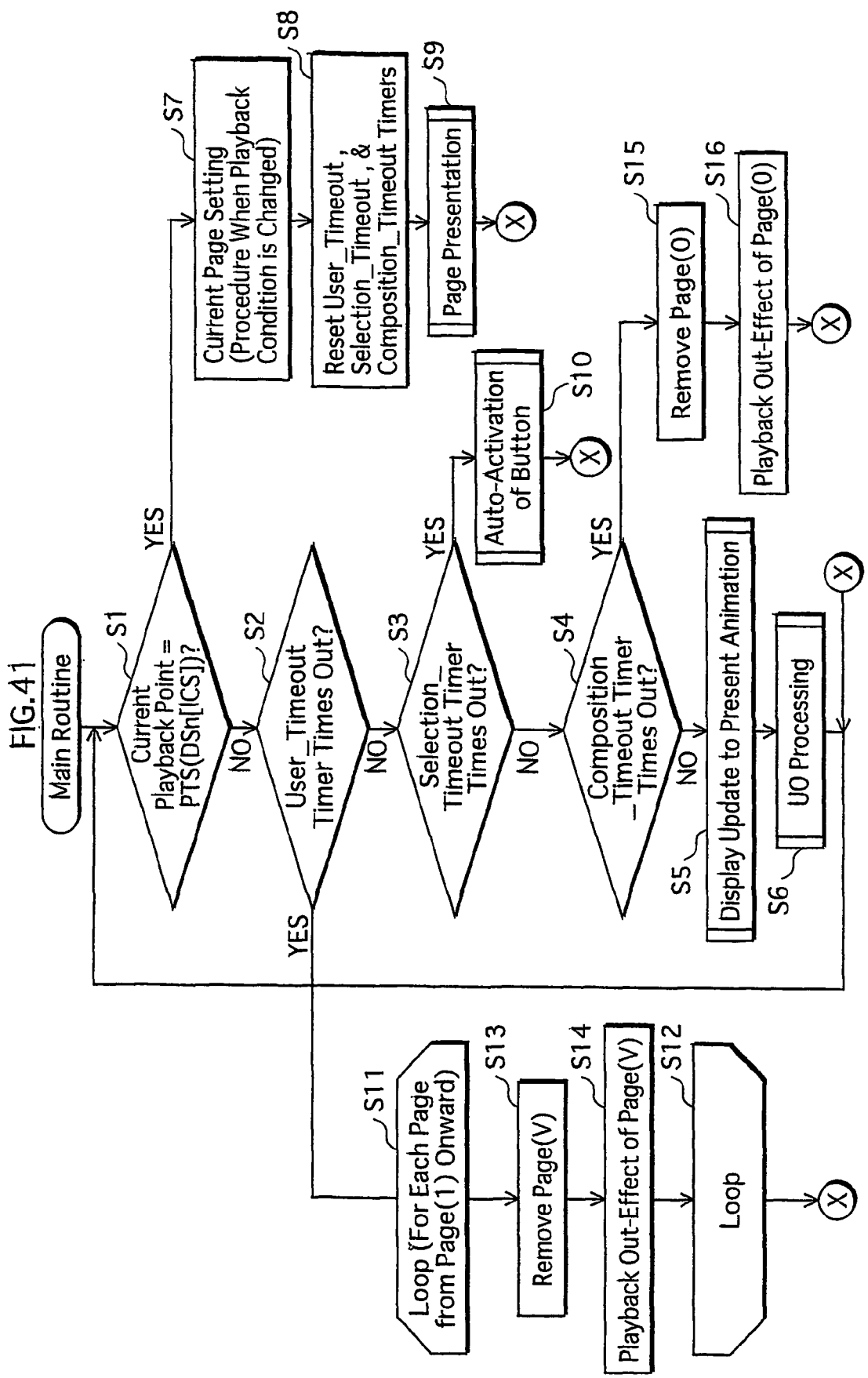
FIG. 41 is a flowchart of the main routine of the procedure performed by a graphics controller 37.
Figure 42:
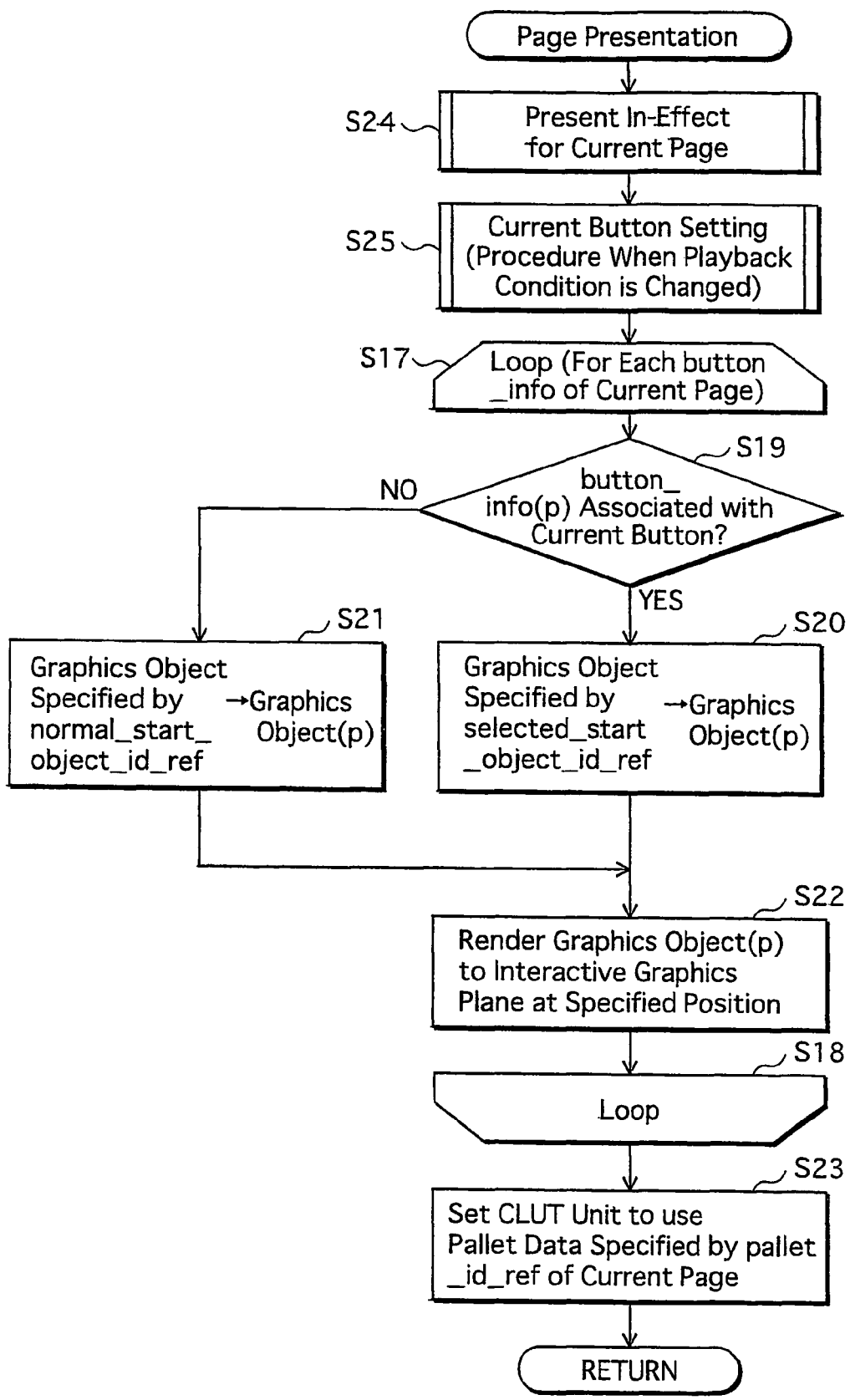
FIG. 42 is a flowchart of the procedure for the first presentation.

FIG. 41 is a flowchart of the main routine of the procedure performed by the graphics controller 37. In the main routine, steps S1-S6 form a loop. In each iteration of the loop, judgments are made as to whether specific events have occurred (steps S1-S4), a display composition of the Multi-Page menu is updated to a subsequent display composition for animated presentation (step S5), and processing is performed according to a user operation (UO processing) (step S6). If any of the judgments in the steps S1-S4 results in YES, corresponding steps are performed and the processing returns to the main routine.

In the step S1, the judgment is made as to whether the current playback point has reached the point specified by the PTS(DS$_n$[ICS]). If the judgment in the step S1 results in YES, the above described "procedure when playback condition is changed" is performed. As a result, Page [0], which is the 1$^{st}$ page of the Multi-Page menu, is set as the current page (step S7). Then, the user_timeout timer 18, the selection_timeout timer 19, and the composition_timeout timer 20 are all reset (step S8), and the current page is presented on screen (step S9). The processing then goes back to the step S1 for the next loop iteration.

In the step S2, the judgment is made as to whether the user_timeout timer 18 has timed out. If the judgment in the step S2 results in YES, a loop of steps S11-S14 is performed. In each iteration of the loop, an arbitrary Page[j] of the Multi-Page menu is removed from the screen (step S13), followed by playback of an out-effect animation provided for Page [j] (step S14). The loop is repeated for each page from Page[0] onward, defined within the ICS (steps S11 and S12).

In the step S3, the judgment is made as to whether the selection_timeout timer 19 has timed out. If the judgment in the step S3 results in YES, a button on the current page is automatically activated (auto-activate: steps S10). Then, the processing returns the step S1 for the next loop iteration.

In the step S4, the judgment is made as to whether the composition_timeout timer 20 has timed out. If the judgment in the step S4 results in YES, Page[0], which is the first page of the Multi-Page menu, is removed from the screen (step S15), followed by playback of the out-effect animation provided for Page[0] (step S16). Then, the processing returns to the step S1 for the next loop iteration.

Now, a description is given to the first presentation of the multi-page menu. The first presentation is carried out through steps S15-S23 shown in FIG. 42, after the state control information 23 performs the above-described "procedure when playback condition is changed" to set Page[0] as the current page. In the step S24, the in-effect animation for the current page is executed. In the step S25 that follows, a current button setting procedure is performed. The current button is specified by the PSR 10. Thus, in the step S25, the "procedure when playback condition is changed" is performed with respect to the PSR 10, so that the current button is determined. Then, the processing moves onto the steps S17-S22.

The steps S17 and S22 form a loop which is repeated for each button_info structure provided in the current page (steps S17 and S18). The button_info structure to be processed in the current iteration of the loop is designated as button_info (p).

In the step S19, a judgment is made as to whether the button_info (p) is associated with the current button. If the judgment in the step S19 results in YES, the step S20 is performed next. If not, the step S21 is performed next.

In the step S21, among the graphics objects on the object buffer 35, one specified by the normal_start_object_id_ref field value is designated as the graphics object (p).

In the step S20, among the graphics objects on the object buffer 35, one specified by the selected_start_object_id_ref field value is designated as the graphics object (p).

Once the graphics object (p) is designated in the step S20 or S21, the graphics object (p) is rendered to the interactive graphics plane 10 at the position specified by the button_horizontal_position and button_vertical_position field values (step S22). By repeating the above steps for each button_info structures provided in the current page, among a plurality of graphics objects associated with each button state, the first graphics object is rendered for each button to the interactive graphics plane 10. After repeating the above steps, the CLUT unit 15 is set so as to present the current page using the pallet data specified by the pallet_id_ref field value of the current page (step S23). This concludes the description of the flowchart shown in FIG. 42.

Figure 43:
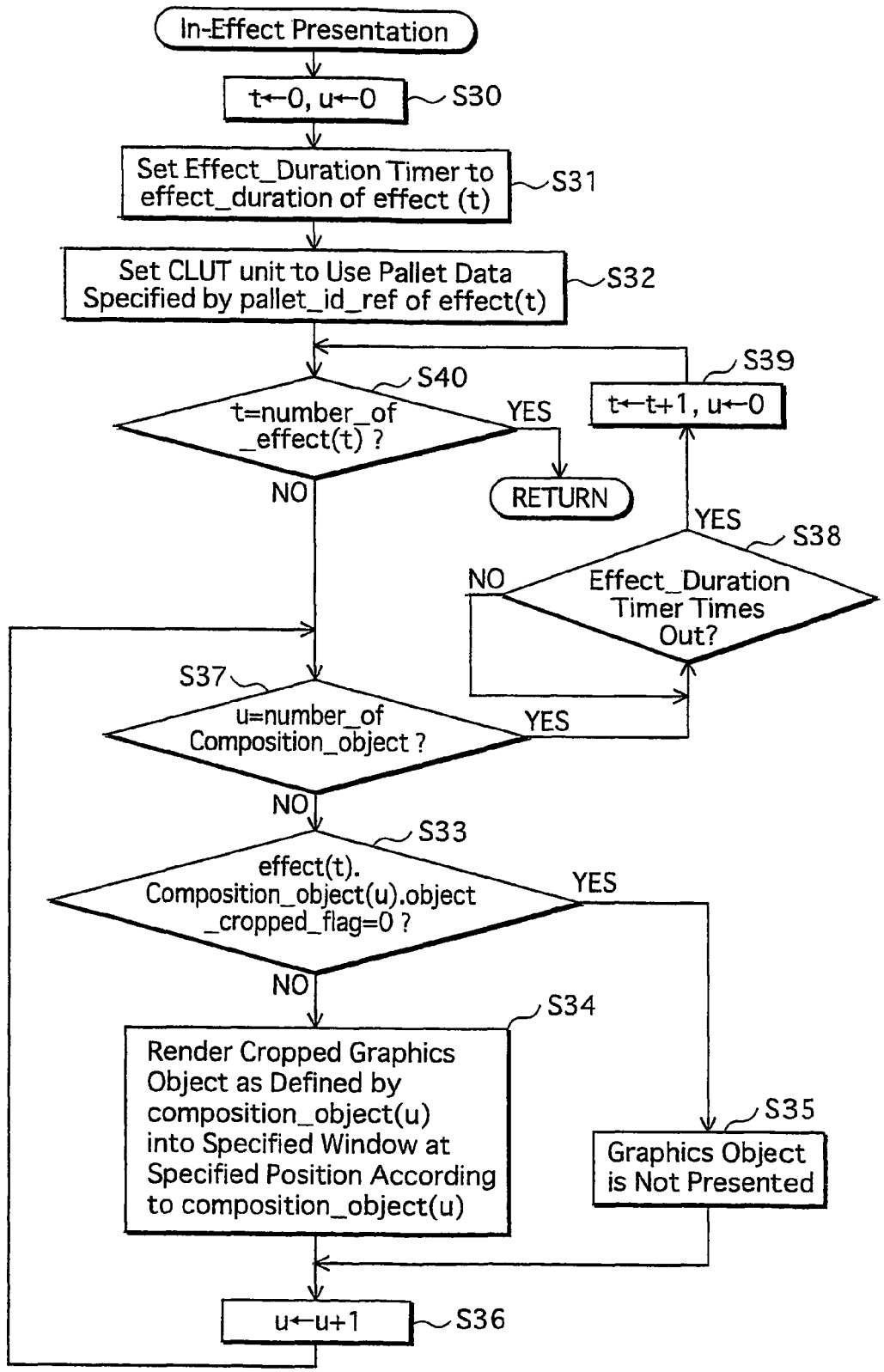
FIG. 43 is a flowchart of the procedure for playback of an in-effect animation.

FIG. 43 is a flowchart of the procedure for playback of an in-effect animation. In the flowchart, a variable t denotes an arbitrary one of display compositions within the effect_sequence defined for the in-effect. In addition, a variable u denotes an arbitrary one of a composition_object out of composition_objects used for the effect (t). As shown in the flowchart, first of all, the variables t and u are initialized to "0" (step S30). Then, the effect_duration_timer 21 is set to the value of the effect (t).effect_duration field (step S31), and the CLUT units 14 and 15 are set so as to use the pallet data identified by the effect (t).pallet_id_ref field value for presentation (step S32). Then, a loop of steps S33-S40 is performed. The loop is a two-level loop. The first-level loop (steps S33-S37) uses the variable u as a control variable, whereas the second-level loop (step S33-S40) uses the variable t as a control variable.

In the first-level loop, a judgment is made as to whether the object_cropped_flag field provided within the composition_object (u) structure associated with the effect (t) is set to "0" (step S33). If the field is set to "0", no graphics object is presented on screen for composition_object(u) (step S35). If the field is set to "1", on the other hand, the object is cropped according to the object_cropping_horizontal_position, object_cropping_vertical_position, cropping_width, and cropping_height fields of the composition_object(u). The cropped part of the graphics object is then rendered within the window identified by the window_id_ref field of the composition_object(u), at the position specified by the composition_object_horizontal_position and the composition_object_vertical_position fields within the composition_object (u) (step S34). Then, the variable u is incremented by "1". The first-level loop is repeated until the variable u is equal to the number_of_composition_object field value.

In the second-level loop, for each iteration of the first-level loop (steps S33-S37), the following steps are performed. After the effect_duration times out (step S38), the variable t is incremented by "1", and the variable u is initialized to "0" (steps S39). The second-level loop is repeated until the variable t is equal to the number_of_effect (t) field value (step S40). This concludes the description of the procedure for playback of In-effect. Note that no description is given to the procedure for playback of an out-effect, because it is basically the same to the above-described procedure.

Immediately after playback of the in-effect, a current page is presented and the first display is updated for animated presentation. The first display composition of the current page is presented by rendering to the interactive graphics plane 10, the graphics objects associated with the normal_start_object id_ref and the selected_start_object_id_ref field values provided in each button_info structure. Each button is presented in animation by updating the button image on the interactive graphics plane 10 for each iteration of the loop in the main routine. Each button image is updated by overwriting the interactive graphics plane 10 with an arbitrary one of a sequence of graphics objects (qth graphics object) associated with the button. That is to say, each button is presented in animation by rendering a sequence of graphics objects associated with the normal_state_info and selected_state_info fields provided within each button_info structure, one by one to the interactive graphics plane 10. Note that the variable q is used to specify individual graphics objects associated with the normal state info and selected state info fields provided within each button_info structure.

Figure 44:
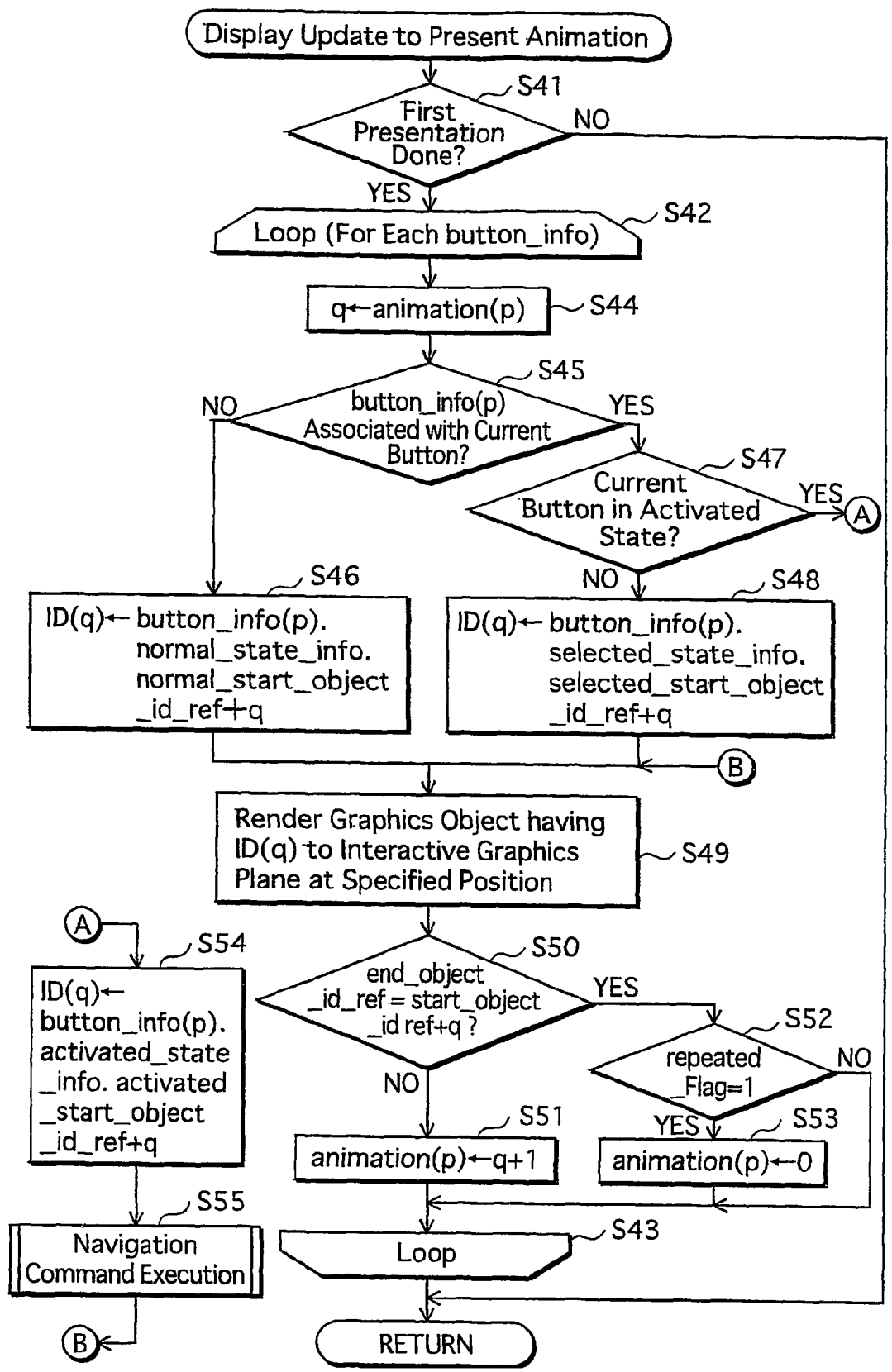
FIG. 44 is a flowchart of the display update procedure for presentation buttons in animation.

Now, with reference to FIG. 44, a description is given to the procedure for display update for animated presentation.

In a step S41, a judgment is made as to whether the first display composition has been presented. If the first display composition is not yet presented, the processing returns to the main routine without performing any operation. If the first display composition has been presented, on the other hand, steps S42-S53 are performed. The steps S41-S55 form a loop in which the steps S44-S55 are repeated for each button_info structure in the ICS (steps S42 and S43).

In the step S44, the variable q is set to the value of variable animation (p) corresponding to the button_info(p) structure. As a result, the variable q represents the current frame number of the button_info(p).

In the step S45, a judgment is made as to whether the button_info(p) corresponds to the button currently in the selected state (i.e. the current button).

If the button_info(p) does not correspond to the current button, the variable q is added to the normal_start_object_id_ref in the button_info(p) to obtain an ID(q) (step S46).

If the button_info(p) corresponds to the current button, the step S47 is performed.

In the step S47, a judgment is made as to whether the current button is in the activated state. If the judgment in the step S47 results in YES, the variable q is added to the activated_start_object_id_ref field value in the button_info(p) to obtain an ID(q) (step S54). Then, one of the navigation commands associated with the button_info(p) is executed (step S55).

On the other hand, if the current button is not in the activated state, the variable q is added to the selected_start_object_id_ref field value in the button_info(p) to obtain an ID(q) (step S48).

Once the ID(q) is obtained, among the graphics objects stored on the object buffer 35, the one identified by the ID(q) is rendered to the interactive graphics plane 10. The rendering position on the interactive graphics plane 10 is specified by the button_horizontal_position and the button_vertical_position fields provided in the button info(p).

Through the loop iteration, the $q^{th}$ one of the graphics objects associated with the selected (or activated) state of the current button is rendered to the interactive graphics plane 10.

In the step S50, a judgment is made as to whether the sum of the normal_start_object_id_ref field value and the variable q has reached the normal_end_object_id_ref field value. If the sum has not reached the normal_end_object_id_ref field value, the variable q is incremented by "1" and the incremented variable q is set as the variable animation (p) (step S51). On the other hand, if the sum has reached the normal_end_object_id_ref field value, a judgment is made as to whether the repeat_flag field is set to "1" (step S52). If the repeat_flag field is set to "1", the variable animation (p) is initialized to "0" (step S53) The above steps are repeated for each button_info structure within the ICS (steps S42 and S43), and then processing returns to the main routine.

Through the above-described steps of S41-S53, each button image presented on screen is updated with a new graphics object each time the main routine is performed. Thus, by repeating the main routine, the buttons images are presented in animation. When presenting the buttons in animation, the graphics controller 37 adjusts the duration for presenting each graphics object so as to maintain the animation_frame_rate_code. This concludes the description of the procedure for animated presentation.

Figure 45:
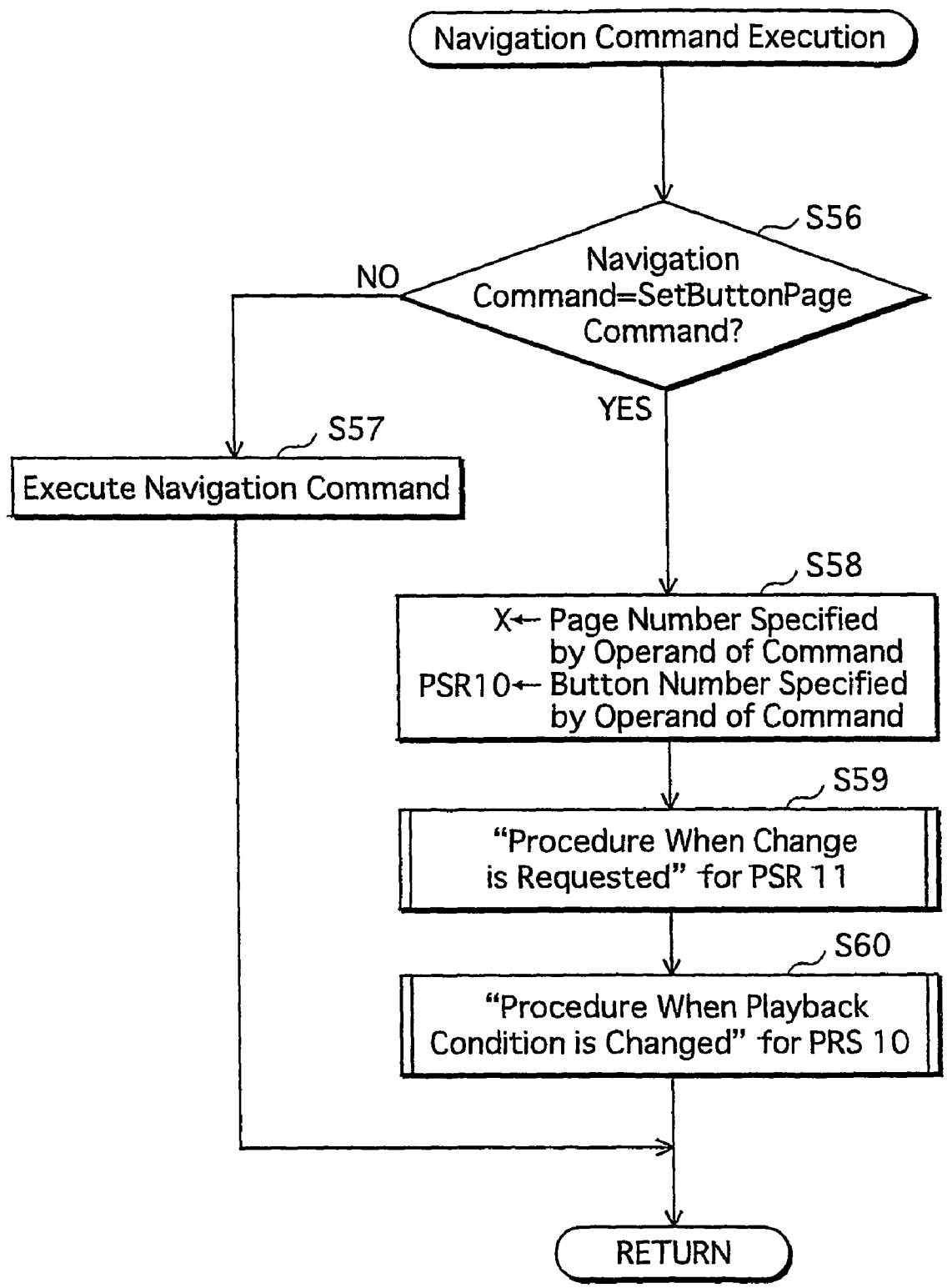
FIG. 45 is a flowchart, of the procedure for executing a navigation command.

In the step S47 described above, if it is judged that the current button is in the activated state, a navigations command associated with the current button needs to be executed in the step S55. FIG. 45 is a flowchart of the procedure for executing a navigation command. First, a judgment is made as to whether the navigation command is a SetButtonPageCommand (step S56). If the navigation command is not a SetButtonPageCommand, the navigation command is simply executed (step S57). On the other hand, if the navigation command is a SetButtonPageCommand, instructions are given to the state control unit 23 so as to designate the page number specified by the operand of the navigation command as the page number X as well as to set the button number specified by the operand of the navigation command to the PSR 10 (step S58). Then, the state control unit 23 executes the "procedure when change is requested", with respect to the PSR 11 (step S59). As mentioned above, the PSR 11 holds a value representing the currently presented page (i.e. the current page). Thus, by performing the "procedure when change is requested" with respect to the PSR 11, the current page is determined. Then, the state control unit 23 performs the "procedure when playback condition is changed", with respect to the PSR10 (step S60). This concludes the description of the flowchart shown in FIG. 45.

Figure 46:
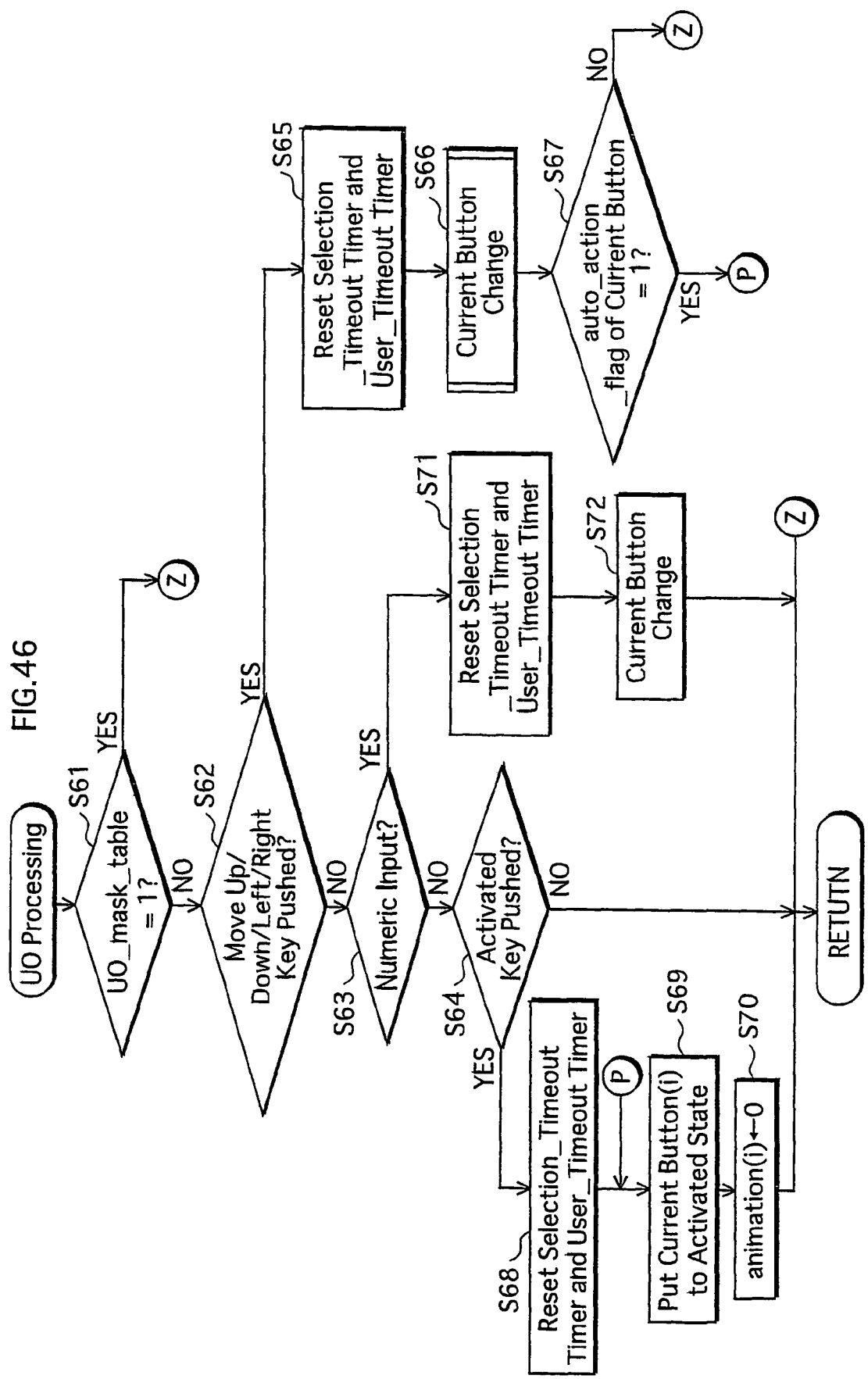
FIG. 46 shows the procedure for processing a UO.

This concludes the description of the procedure for executing a navigation command. As stated above, a navigation command is executed when an associated button is activated. The button state changes are presented through the following procedure in response to a user operation (UO). FIG. 46 shows the procedure for processing a UO. As shown in the flowchart, judgments are made in steps S61-S64 as to whether specific events have occurred. An occurrence of each event requires specific steps to be performed. The processing then returns to the main routine. Specifically, in the step S61, a judgment is made as to whether the UO_mask_table field is set to "1". If the field is set to "1", the processing returns to the main routine without performing any step.

In the step S62, the judgment is made as to whether any of the Move Up, Down, Left, and Right keys on the remote controller is pushed. At a push of any of the keys, the user_timeout timer 18 and the selection_timeout timer 19 are reset (step S65). Then, another button is designated as the new current button (step S66), followed by the judgment as to whether the auto_action_flag of the newly designated current button is set to "01" (step S67). If the auto_action_flag is not set to "01", the processing returns to the main routine. On the other hand, if the auto_action_flag is set to "01", the current button (i) is activated (step S69). Then, the variable animation (i) is set to "0" (step S70).

In the step S63, the judgment is made as to whether a numeric input is made. If a numeric input is made, the user_timeout timer 18 and the selection_timeout timer 19 are reset (step S71), and another button is designated as the new current button (step S72). The processing then returns to the main routine.

In the step S64, a judgment is made as to whether an activate key on the remote controller is pushed. At a push of the activate key, the user_timeout timer 18 and the selection_timeout timer 19 are reset (step S68), and then the current button (i) is activated (step S69). After the button state transition, the variable animation (i) is set to "0" (step S70). Note that the step S66 of designating a new current button described above is performed by calling a subroutine shown in FIG. 47. Now, a description is given to the subroutine, with reference to the figure.

Figure 47:
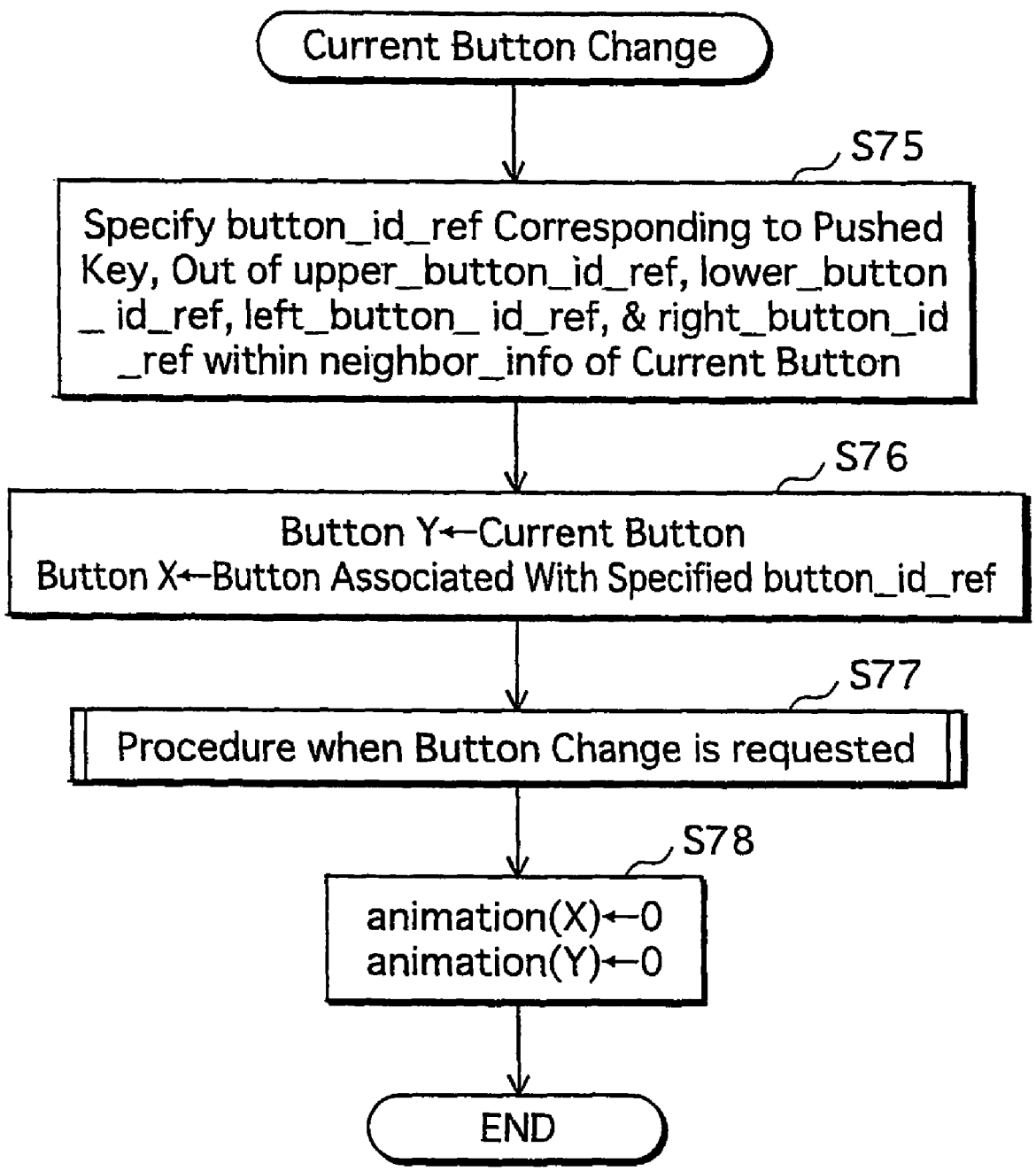
FIG. 47 is a flowchart of the current button change procedure.

FIG. 47 is a flowchart of the current button change procedure. First, it is determined which of upper_button_id_ref, lower_button_id_ref, left_button_id_ref, and right_button_id_ref fields within the neighbor_info associated with the current button corresponds to the pushed key (step S75)

Here, let a button (Y) denote the current button, and let a button X denote the button specified by the one of upper_button_id_ref, lower_button_id_ref, left_button_id_ref, and right_button_id_ref fields (step S76). Then, the state control unit 23 performs the "procedure when change is requested" with respect to the PSR 10 (step S77). As a result, the PSR 10 is set to the value X.

Thereafter, the variables animation (X) and animation (Y) are set to "0" (step S78), and returns to the main routine.

As described above, in the UO processing, a button is activated in response to a UO. Yet, the button state transition to the activated state is made also when the selection_time_out_pts times out. Now, with reference to FIG. 48, a description is given to the procedure for auto-activation of a button upon timeout of the selection_time_out_pts.

Figure 48:
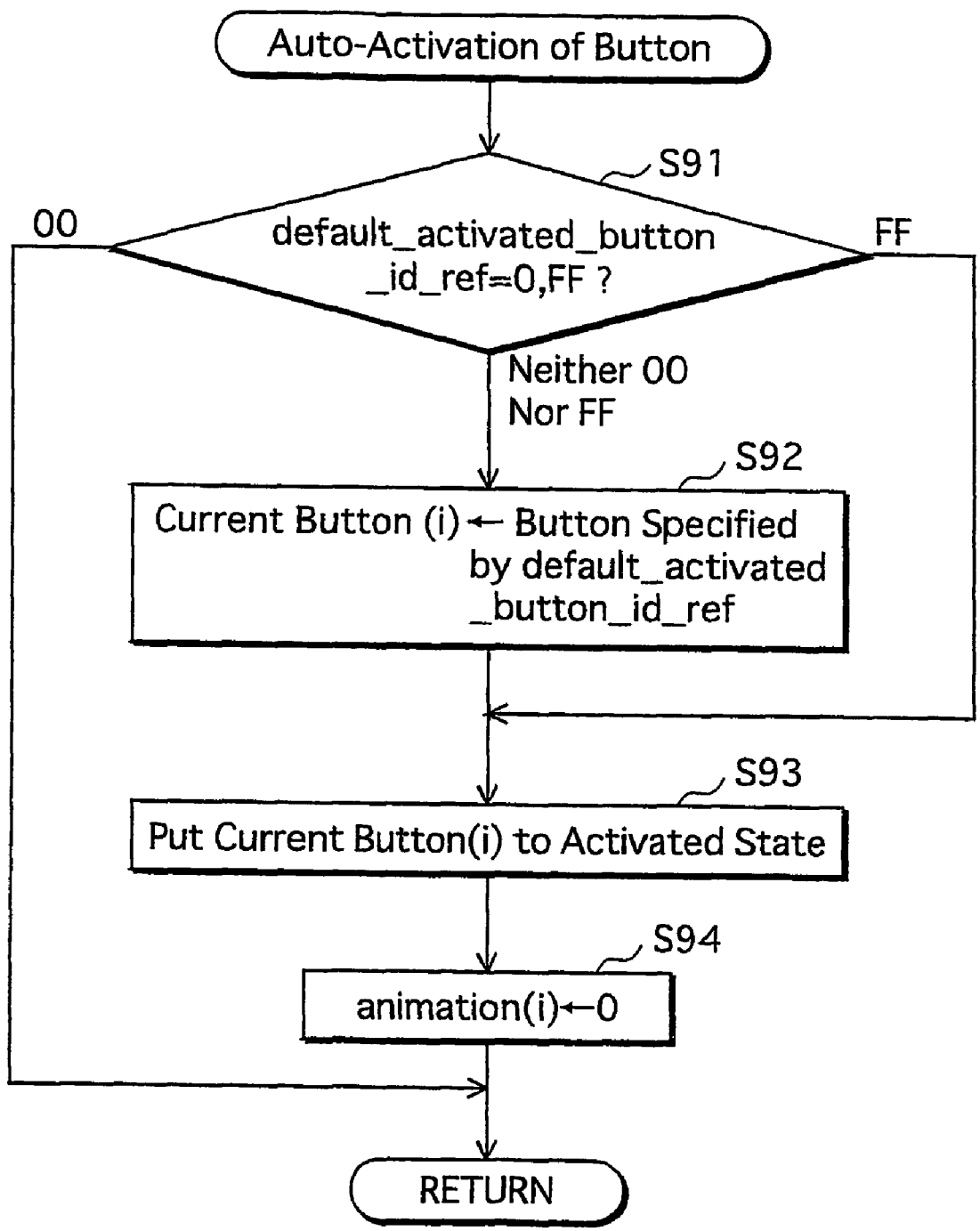
FIG. 48 is a flowchart of the procedure for auto-activation of a button.

FIG. 48 is a flowchart of the procedure for auto-activation of a button. First, a judgment is made as to whether the default_activated_button_id_ref field is set to "00" or "FF" (step S91). If the field is set to "00", the processing returns to the main routine without performing any step. On the other hand, if the default_activated_button_id_ref is set to "FF", the current button (i) is activated (step S93). Thereafter, the variable animation (i) corresponding to the current button (i) is set to "0" (step S94), and returns to the main routine.

If the default_activated_button_id_ref field value is neither "00" nor "FF", the button specified by the default_activated_button_id_ref field value is determined to be the new current button (i) (step S92). Thus, the button specified by the default_activated_button_id_ref field value receives the activated state (step S93). Thereafter, the variable animation (i) corresponding to the current button (i) is set to "0" (step S94), and returns to the main routine.

Through the above steps, the button in the selected state is automatically put into the activated state at an end of a predetermined duration. This concludes the description of the flowchart shown in FIG. 47.

<Turn On/Off of Graphics Display in Pop-Up U/I>

The description given above relates to the procedure performed by the I-Graphics decoder 9 in the case where the user_inderface_model shows the Always-On U/I. In the case where the Pop-Up U/I is used, the I-Graphics decoder 9 operates as follows. First, similarly to the Always-On U/I case, the I-Graphics decoder 9 performs the decoding to obtain decoded graphics objects on the object buffer 35. The I-Graphics decoder 9 then renders the graphics objects to the interactive graphics plane 10 by the time shown by the PTS (DS$_n$[ICS]). Up to this point, the I-Graphics decoder 9 operates in a similar manner to the case where Always-On U/I is used. Yet, the processing performed thereafter differs in that the graphics controller 37 does not overlay the page stored on the interactive graphics plane 10, and thus the page is not presented. That is to say, graphics controller 37 "turns off" the page by not outputting the data stored on the interactive graphics plane 10 to the CLUT unit 15. With the page not presented on screen (i.e. turned off), the graphics controller 37 waits for a user operation for Pop-Up_on. In response to a user operation for Pop-Up_on, the graphics controller 37 outputs the graphics data stored on the interactive graphics plane 10 to the CLUT unit 15 where the graphics data is overlaid with the video data. As a result, the page is "turned on" or presented on screen. As above, the graphics controller 37 turns on and off the graphics display to realize Pop-Up display.

In the operations performed thereafter, there is no difference between the Always On U/I and the Pop-Up U/I. When any of the buttons on the main page is activated, a navigation command associated with the activated button is executed. When the selection_timeout timer 19 times out, the current button on the main page is automatically activated and a sub page is presented on screen.

When a user operation is made for Pop-Up_off, the graphics controller 37 tunes off all on-screen pages, thereby leaving no page presented on screen.

If no user operation is made for a certain period of time, the user_timeout timer 18 counts down toward zero. When the user_timeout timer 18 times out, the graphics controller 37 also turns off all on-screenpages, thereby leaving no page presented on screen. The turn on and turn off procedures described above are performed to realize the state transition shown in FIG. 12A.

As above, through the turn on and the turn off operations, Pop-Up U/I is implemented.

As described above, the sixth embodiment of the present invention realizes the industrial production of playback apparatuses supporting the BD-ROM having the data structures as described in the first to fifth embodiments. This helps for widespread use of the BD-ROMs according to the first to fifth embodiments.

Seventh Embodiment

Figure 49:
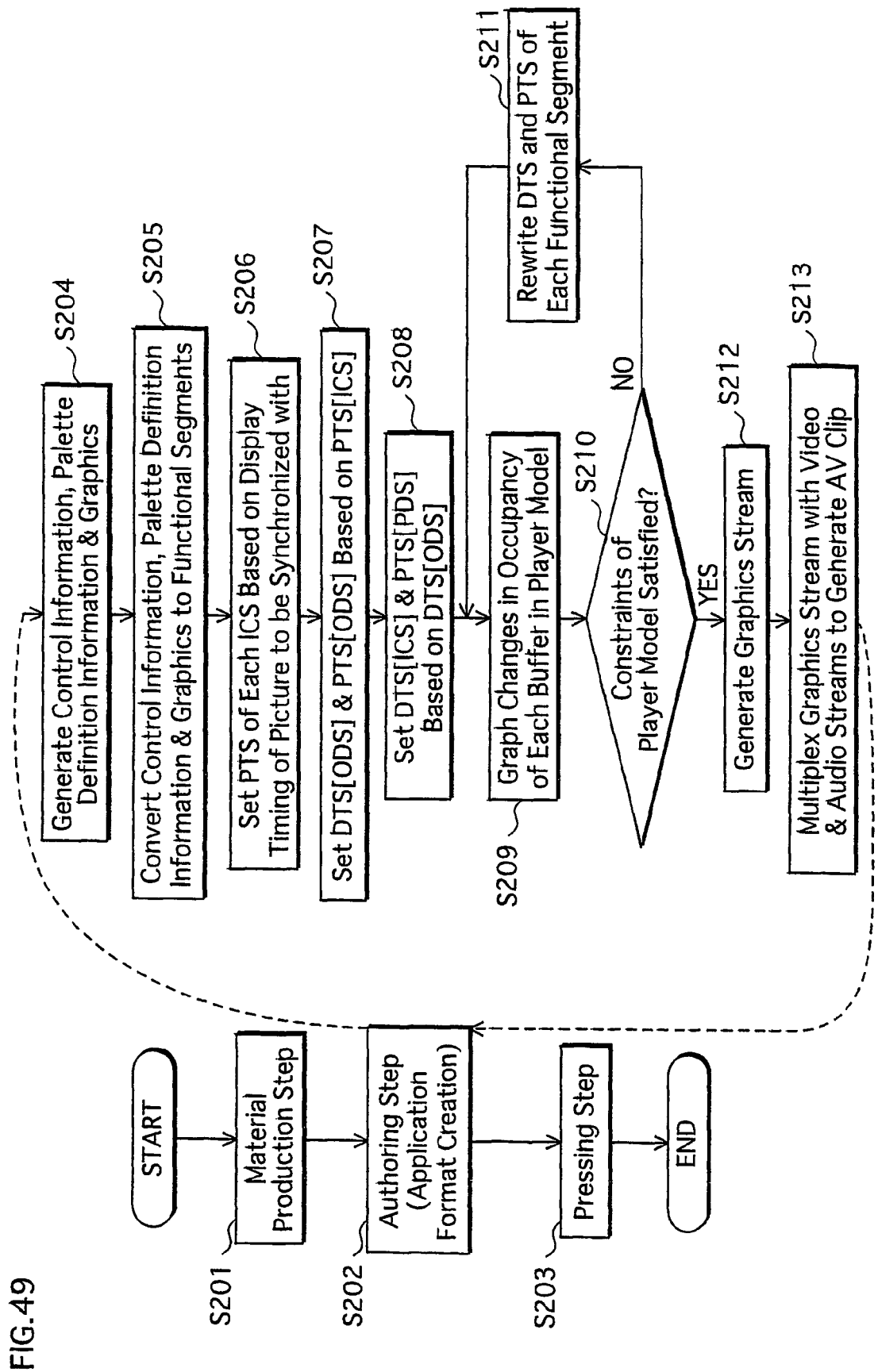
FIG. 49 is a flowchart of the manufacturing process of the BD-ROMs according to the first to fifth embodiments.

A seventh embodiment of the present invention relates to a manufacturing process of the BD-ROM. FIG. 49 is a flowchart of the manufacturing process of the BD-ROMs according to the first to fifth embodiments.

The manufacturing process includes a material production step of recording video, audio, and the like (step S201), an authoring step of creating an application format using an authoring device (step S202), and a pressing step of creating an original master of the BD-ROM and performing stamping and bonding to complete the BD-ROM (step S203).

The BD-ROM authoring step includes the following steps S204-S213.

Now, a description is given to the steps S204-S213. In the step S240, control information, palette definition information, and graphics are generated. In the step S205, the control information, the palette definition information, and the graphics are converted to functional segments. In the step S206, a PTS of each ICS is set based on the display timing of a picture to be synchronized with. In the step S207, a DTS[ODS] and a PTS[ODS] are set based on the PTS[ICS]. In the step S208, a DTS[ICS] and a PTS[PDS] are set based on the DTS[ODS].

In the step S209, changes in occupancy of each buffer in the player model are graphed. In the step S210, a judgment is made as to whether the graphed changes satisfy the constraints of the player model. If the judgment results in the negative, the DTS and PTS of each functional segment are rewritten in the step S211. If the judgment results in the affirmative, a graphics stream is generated in the step S212, and the graphics stream is multiplexed with a video stream and an audio stream, which are separately generated, to form an AV Clip in the step S213. After this, the AV Clip is adapted to the Blue-ray Disc Read-Only Format, to complete the application format.

(Modifications)

Though the present invention has been described by way of the above embodiments, the present invention is not limited to those specific embodiments. The present invention may be embodied with any of the modifications (A) to (L) below. The invention recited in each of the claims of this application includes extension and generalization of the above embodiments and their modifications below. The degree of extension and generalization depends upon the state of the art in the technical field of the present invention at the time when the present invention was made.

(A) The above embodiments describe the case where the BD-ROM is used as the recording medium. Main features of the present invention, however, lie in a graphics stream recorded on the recording medium, which does not rely on physical characteristics of BD-ROMs. Therefore, the present invention is applicable to any recording medium that is capable of recording a graphics stream. Examples of such a recording medium include: an optical disc such as a DVD-ROM, a DVD-RAM, a DVD-RW, a DVD-R, a DVD+RW, a DVD+R, a CD-R, or a CD-RW; a magneto-optical disk such as a PD or an MO; a semiconductor memory card such as a CompactFlash card, a SmartMedia card, a Memory Stick card, a MultiMediaCard, or a PCMCIA card; a magnetic disk such as a flexible disk, SuperDisk, Zip, or Clik!; a removable hard disk drive such as ORB, Jaz, SparQ, SyJet, EZFley, or Microdrive, and a nonremovable hard disk drive.

(B) The above embodiments describe the case where the playback apparatus decodes an AV Clip on the BD-ROM and outputs the decoded AV Clip to the television. As an alternative, the playback apparatus may be equipped with only a BD drive, with the remaining construction elements being provided in the television. In this case, the playback apparatus and the television can be incorporated in a home network connected with an IEEE 1394 connector. The above embodiments describe the case where the playback apparatus is connected to the television, but the playback apparatus may instead be integrated with a display device. Also, the playback apparatus may include only the system LSI (integrated circuit) which carries out an essential part of the processing. The playback apparatus and the integrated circuit are both an invention described in this specification. Accordingly, regardless of whether the playback apparatus or the integrated circuit is concerned, an act of manufacturing a playback apparatus based on the internal structure of the playback apparatus described in the sixth embodiment is an act of practicing the present invention. Also, any act of assigning with charge (i.e. for sale) or without charge (i.e. as a gift), leasing, and importing the playback apparatus is an act of practicing the present invention. Likewise, an act of offering for assignment or lease of the reproduction apparatus using storefront displays, catalogs, or brochures is an act of practicing the present invention.

(C) Information processing using the programs shown in the flowcharts is actually realized using hardware resources. Accordingly, the programs which describe the procedure steps shown in the flowcharts are themselves an invention. The above embodiments all relate to the case where the programs are incorporated in the playback apparatus, but the programs can be used independently of the playback apparatus. Acts of practicing the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(D) The time elements of the steps which are executed in a time series in each of the flowcharts can be regarded as the necessary elements of the present invention. This being so, a playback method shown by these flowcharts is an invention if the processing shown in each flowchart is carried out by performing the steps in a time series so as to achieve the intended aim and the intended effect, it is considered as an act of practicing the playback method of the present invention.

(E) When recording an AV Clip on the BD-ROM, an extension header may be added to each TS packet in the AV Clip. The extension header is called a TP_extra_header, includes an arrival_time_stamp and a copy_permission_indicator, and has a data length of 4 bytes. TS packets with TP_extra_headers (hereafter "EX TS packets") are grouped in units of 32 packets, and each group is written to three sectors. One group made up of 32 EX TS packets has 6,144 bytes (=32×192), which is equivalent to a size of three sectors that is 6144 bytes (=2048×3). The 32 EX TS packets contained in the three sectors are called an "Aligned Unit".

In a home network connected with an IEEE 1394 connector, the playback apparatus transmits an Aligned Unit in the following manner. The reproduction apparatus removes a TP_extra_header from each of the 32 EX TS packets in the Aligned Unit, encrypts the body of each TS packet according to the DTCP Specification, and outputs the encrypted TS packets. When outputting the TS packets, the playback apparatus inserts an isochronous packet between adjacent TS packets. A position where the isochronous packet is inserted is based on a time shown by an arrival_time_stamp of the TP_extra_header. The playback apparatus outputs a DTCP_descriptor., as well as the TS packets. The DTCP_descriptor corresponds to a copy_permission_indicator in the TP_extra_header. With the provision of the DTCP_descriptor indicating "copy prohibited", it is possible to prevent, when using the TS packets in the home network connected via the IEEE 1394 connector, the TS packets from being recorded to other devices.

(F) The above embodiments relate to the case where an AV Clip of the Blu-ray Disc Read-Only Format is used as a digital stream, but the present invention may also be embodied with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, a Dolby AC-3 audio stream, an MP3 audio stream, an MPEG-AAC audio stream, or a dts audio stream.

(G) The movie described in the above embodiments may be one obtained by encoding an analog image signal broadcast by analog broadcasting. Also, the movie may be stream data-made up of a transport stream broadcast by digital broadcasting.

Alternatively, an analog/digital image signal recorded on a videotape may be encoded to obtain content. Also, an analog/digital image signal directly captured by a video camera may be encoded to obtain a content. A digital work distributed by a distribution server is applicable too.

(H) Graphics objects described in the above embodiments is run-length encoded raster data. Run-length encoding is used for compression/encoding of graphics objects, because the run-length encoding is suitable for compression and decompression of subtitles. Subtitles have the property that a continuous length of the same pixel value in a horizontal direction is relatively long. Therefore, by performing compression using run-length encoding, a high compression rate can be attained. In addition, run-length encoding reduces a load for decompression, and is therefore suitable for realizing decoding by software. Nevertheless, the use of run-length encoding for graphics objects is not essential to the present invention. For example, graphics objects maybe PNG data. Also, graphics objects may be vector data instead of raster data. Further, graphics objects may be transparent patterns.

(I) The transfer rate Rc may be determined so that clearing and rendering of the graphics plane complete within a vertical blanking time. Suppose the vertical blanking time is 25% of 1/29.93 seconds. Then Rc is determined to be 1 Gbps. By determining Rc in this way, graphics can be displayed smoothly, which achieves a significant effect on the practical use.

Also, writing in sync with line scan can be used together with writing within a vertical blanking time. This ensures smooth presentation if the transfer rate Rc is 256 Mbps.

(J) The above embodiments relate to the case where the playback apparatus is provided with the graphics plane. Alternatively, the playback apparatus may include a line buffer for storing uncompressed pixels of one line. Since conversion to an image signal is performed for each horizontal row (line), conversion to an image signal can equally be performed with the line buffer.

(K) In the case of a merge point of multiple playback paths, a different button needs to be selected as default depending on a playback path having been taken. Thus, it is desirable to define such playback control in the static scenario that a value unique to each playback path is stored to a register of the playback apparatus at the time when the playback path is actually taken. The playback procedure may be set to put the button specified by the register value to the selected state. In this way, a different button is put to the selected state depending on a playback path having been taken.

(L) The graphics plane described in the sixth embodiment preferably has a double buffer structure. If the graphics plane has a double buffer structure, even when large-sized graphics data needs to be rendered, which requires a time corresponding to several frames, each display composition may be instantaneously presented by switching between two buffers. Thus, a double buffer structure is effective when the menu of a full-screen size needs to be presented.

INDUSTRIAL APPLICABILITY

The playback apparatus according to the present invention is suitable for a personal use, for example in a home theater system. Since the above embodiments of the present invention disclose the internal structure, playback apparatuses having the internal structure can be produced on a large scale.

Thus, the playback apparatus according to the present invention is industrially usable in its quality and has industrial applicability.

The invention claimed is:

1. A non-transitory recording medium having recorded thereon a video stream and a graphics stream, wherein:
   the video stream represents a moving picture made up of a plurality of pictures;
   the graphics stream is used for overlaying a menu on the moving picture, and includes interactive control information and graphics data;
   the graphics data is used for generating both the menu and an effect presented for introducing or removing the menu;
   the interactive control information includes a plurality of pieces of composition information defining a sequence of display compositions of graphics constituting the effect;
   each piece of composition information shows (i) a bounding area on a graphics plane within which a respective display composition is rendered and (ii) a duration after which the display composition is replaced by a subsequent display composition to be rendered within the same bounding area; and
   the duration is determined based on a value calculated by dividing the size of the bounding area by a transfer rate of a playback apparatus.

2. The non-transitory recording medium according to claim 1, wherein:
   the graphics stream includes one or more pieces of pallet data;
   the interactive control information includes a plurality of pieces of page information each defining a page of the menu available for presentation; and
   each piece of page information includes a pallet ID uniquely identifying a piece of pallet data to be used for presentation of a respective page.

3. A non-transitory recording medium having recorded thereon a video stream and a graphics stream, wherein:
   the video stream represents a moving picture made up of a plurality of pictures;
   the graphics stream is used for overlaying a menu on the moving picture, and includes interactive control information and graphics data;
   the graphics data is used for generating both the menu and an effect presented for introducing or removing the menu;
   the interactive control information includes a plurality of pieces of composition information defining a sequence of display compositions of graphics constituting the effect;
   each piece of composition information shows (i) a bounding area on a graphics plane within which a respective display composition is rendered and (ii) a duration after which the display composition is replaced by a subsequent display composition to be rendered within the same bounding area; and
   when the effect is an in-effect to be presented preceding the menu, a set of graphics data associated with the in-effect is located in a string of the graphics data before a set of graphics data associated with the menu;
   the interactive control information is encapsulated in a packet; and
   a timestamp attached to the packet shows a time for starting playback of the in-effect.

4. A method for recording onto a non-transitory recording medium, comprising:
   generating application data using an authoring device; and
   recording the application data onto the recording medium, wherein:
   the application data includes a video stream and a graphics stream;
   the graphics stream is used for overlaying a menu on the moving picture, and includes interactive control information and graphics data;
   the graphics data is used for generating both the menu and an effect presented for introducing or removing the menu;
   the interactive control information includes menu information and time information showing a time period during which the menu is to be presented;
   the menu information includes button information and effect information;
   the effect information defines the effect for introducing or removing the menu and includes a plurality of pieces of composition information defining a sequence of display compositions of graphics constituting the effect;
   each piece of composition information shows (i) a bounding area on a graphics plane within which a respective display composition is rendered and (ii) a duration after which the display composition is replaced by a subsequent display composition to be rendered within the same bounding area, and
   the duration is determined based on a value calculated by dividing the size of the boundin area b a transfer rate of a playback apparatus.

* * * * *